US009693103B2

(12) United States Patent
Cronk et al.

(10) Patent No.: US 9,693,103 B2
(45) Date of Patent: Jun. 27, 2017

(54) METHODS AND APPARATUS FOR AUDIENCE DATA COLLECTION AND ANALYSIS IN A CONTENT DELIVERY NETWORK

(71) Applicant: Time Warner Cable Enterprises LLC, New York, NY (US)

(72) Inventors: Gary Cronk, Colts Neck, NJ (US); Craig Engel, Shamong, NJ (US); Justin Tidwell, Waxhaw, NC (US); Luis Roberto Anaya, Piscataway, NJ (US); Ramon Herrera, South Riding, VA (US); Cory Kin, Herndon, VA (US); Dipan Patel, Duluth, GA (US); Johnathan Saginaw, Washington, DC (US); Sohil Sami, Reston, VA (US)

(73) Assignee: TIME WARNER CABLE ENTERPRISES LLC, New York, NY (US)

( * ) Notice: Subject to any disclaimer, the term of this patent is extended or adjusted under 35 U.S.C. 154(b) by 323 days.

(21) Appl. No.: 14/304,791

(22) Filed: Jun. 13, 2014

(65) Prior Publication Data
US 2014/0366051 A1 Dec. 11, 2014

Related U.S. Application Data

(63) Continuation of application No. 12/877,062, filed on Sep. 7, 2010.
(Continued)

(51) Int. Cl.
*H04N 21/466* (2011.01)
*H04N 21/231* (2011.01)
(Continued)

(52) U.S. Cl.
CPC ..... *H04N 21/4667* (2013.01); *H04L 63/0421* (2013.01); *H04N 21/23109* (2013.01);
(Continued)

(58) Field of Classification Search
CPC ......... H04N 21/4667; H04N 21/23109; H04N 21/2408; H04N 21/251; H04N 21/254;
(Continued)

(56) References Cited

U.S. PATENT DOCUMENTS 5,528,284 A 6/1996 Iwami et al.
5,708,961 A 1/1998 Hylton et al.
(Continued)

FOREIGN PATENT DOCUMENTS

JP 2005519365 A 6/2005
JP 2005519501 A 6/2005
(Continued)

OTHER PUBLICATIONS

Cantor, et al., Bindings for the OASIS Security Assertion Markup Language (SAML) V2.0, OASIS Standard, Mar. 2005 (http://docs.oasis-open.org/security/saml/v2.0/).
(Continued)

*Primary Examiner* — William Goodchild
(74) *Attorney, Agent, or Firm* — Gazdzinski & Associates, PC

(57) ABSTRACT

Methods and apparatus for collection and processing of data relating to users of a content-delivery network. In one embodiment, the content delivery network is a cable or satellite or HFCu network, and the apparatus includes an architecture for routinely harvesting, parsing, processing, and storing data relating to the activities of the users (e.g., subscribers) of the network. In one variant, at least portions of the data are anonymized to protect subscriber privacy.

23 Claims, 44 Drawing Sheets

Related U.S. Application Data

(60) Provisional application No. 61/260,346, filed on Nov. 11, 2009.

(51) Int. Cl.
| | | |
|---|---|---|
| *H04N 21/254* | (2011.01) | |
| *H04N 21/258* | (2011.01) | |
| *H04N 21/24* | (2011.01) | |
| *H04N 21/25* | (2011.01) | |
| *H04N 21/45* | (2011.01) | |
| *H04N 21/81* | (2011.01) | |
| *H04L 29/06* | (2006.01) | |

(52) U.S. Cl.
CPC ....... *H04N 21/2408* (2013.01); *H04N 21/251* (2013.01); *H04N 21/254* (2013.01); *H04N 21/25808* (2013.01); *H04N 21/25866* (2013.01); *H04N 21/25883* (2013.01); *H04N 21/25891* (2013.01); *H04N 21/4532* (2013.01); *H04N 21/812* (2013.01)

(58) Field of Classification Search
CPC ....... H04N 21/25808; H04N 21/25866; H04N 21/25883; H04N 21/25891; H04N 21/4532; H04N 21/812; H04N 21/2347; H04N 21/4405; H04N 21/4408; H04L 63/0421; H04L 63/04; G06F 21/10; G06F 21/60
USPC ...................................................... 380/200
See application file for complete search history.

(56) References Cited

U.S. PATENT DOCUMENTS

| | | | |
|---|---|---|---|
| 5,719,938 | A | 2/1998 | Haas et al. |
| 5,758,257 | A | 5/1998 | Herz et al. |
| 5,796,423 | A | 8/1998 | Robbins et al. |
| 5,818,438 | A | 10/1998 | Howe et al. |
| 5,862,140 | A | 1/1999 | Shen et al. |
| 5,897,635 | A | 4/1999 | Torres et al. |
| 5,988,078 | A | 11/1999 | Levine |
| 6,029,045 | A | 2/2000 | Picco et al. |
| 6,052,145 | A | 4/2000 | Macrae et al. |
| 6,088,722 | A | 7/2000 | Herz et al. |
| 6,133,910 | A | 10/2000 | Stinebruner |
| 6,167,432 | A | 12/2000 | Jiang |
| 6,181,697 | B1 | 1/2001 | Nurenberg et al. |
| 6,198,744 | B1 | 3/2001 | Huggins et al. |
| 6,219,710 | B1 | 4/2001 | Gray et al. |
| 6,252,634 | B1 | 6/2001 | Yuen et al. |
| 6,259,701 | B1 | 7/2001 | Shur et al. |
| 6,389,538 | B1 | 5/2002 | Gruse et al. |
| 6,446,261 | B1 | 9/2002 | Rosser |
| 6,460,182 | B1 | 10/2002 | Buabbud |
| 6,463,585 | B1 | 10/2002 | Hendricks et al. |
| 6,486,907 | B1 | 11/2002 | Farber et al. |
| 6,487,721 | B1 | 11/2002 | Safadi |
| 6,519,062 | B1 | 2/2003 | Yoo |
| 6,523,696 | B1 | 2/2003 | Saito et al. |
| 6,539,548 | B1 | 3/2003 | Hendricks et al. |
| 6,608,837 | B1 | 8/2003 | Brodigan |
| 6,640,145 | B2 | 10/2003 | Hoffberg et al. |
| 6,694,145 | B2 | 2/2004 | Riikonen et al. |
| 6,697,376 | B1 | 2/2004 | Son et al. |
| 6,698,020 | B1 | 2/2004 | Zigmond et al. |
| 6,728,269 | B1 | 4/2004 | Godwin et al. |
| 6,760,537 | B2 | 7/2004 | Mankovitz |
| 6,785,904 | B1 | 8/2004 | Franken et al. |
| RE38,600 | E | 9/2004 | Mankovitz |
| 6,788,676 | B2 | 9/2004 | Partanen et al. |
| 6,788,775 | B1 | 9/2004 | Simpson |
| 6,799,326 | B2 | 9/2004 | Boylan et al. |
| 6,807,676 | B1 | 10/2004 | Robbins et al. |
| 6,873,622 | B1 | 3/2005 | Dodson et al. |
| 6,925,257 | B2 | 8/2005 | Yoo |
| 6,944,150 | B1 | 9/2005 | McConnell et al. |
| 7,003,670 | B2 | 2/2006 | Heaven et al. |
| 7,006,881 | B1 | 2/2006 | Hoffberg et al. |
| 7,009,972 | B2 | 3/2006 | Maher et al. |
| 7,027,460 | B2 | 4/2006 | Iyer et al. |
| 7,039,048 | B1 | 5/2006 | Monta et al. |
| 7,039,932 | B2 | 5/2006 | Eldering |
| 7,054,902 | B2 | 5/2006 | Toporek et al. |
| 7,068,639 | B1 | 6/2006 | Varma et al. |
| 7,085,287 | B1 | 8/2006 | Chapman |
| 7,099,308 | B2 | 8/2006 | Merrill et al. |
| 7,099,348 | B1 | 8/2006 | Warwick |
| 7,106,382 | B2 | 9/2006 | Shiotsu |
| 7,149,772 | B1 | 12/2006 | Kalavade |
| 7,174,126 | B2 | 2/2007 | McElhatten et al. |
| 7,174,127 | B2 | 2/2007 | Otten et al. |
| 7,174,385 | B2 | 2/2007 | Li |
| 7,185,353 | B2 | 2/2007 | Schlack |
| 7,188,085 | B2 | 3/2007 | Pelletier |
| 7,209,458 | B2 | 4/2007 | Ahvonen et al. |
| 7,213,036 | B2 | 5/2007 | Apparao et al. |
| 7,242,960 | B2 | 7/2007 | Van Rooyen et al. |
| 7,242,988 | B2 | 7/2007 | Hoffberg et al. |
| 7,254,608 | B2 | 8/2007 | Yeager et al. |
| 7,325,073 | B2 | 1/2008 | Shao et al. |
| 7,330,483 | B1 | 2/2008 | Peters, Jr. et al. |
| 7,359,375 | B2 | 4/2008 | Lipsanen et al. |
| 7,363,643 | B2 | 4/2008 | Drake et al. |
| 7,376,386 | B2 | 5/2008 | Phillips et al. |
| 7,383,243 | B2 | 6/2008 | Conkwright et al. |
| 7,444,655 | B2 | 10/2008 | Sardera |
| 7,457,520 | B2 | 11/2008 | Rosetti et al. |
| 7,486,869 | B2 | 2/2009 | Alexander et al. |
| 7,567,983 | B2 | 7/2009 | Pickelsimer et al. |
| 7,592,912 | B2 | 9/2009 | Hasek et al. |
| 7,602,820 | B2 | 10/2009 | Helms et al. |
| 7,650,319 | B2 | 1/2010 | Hoffberg et al. |
| 7,690,020 | B2 | 3/2010 | Lebar |
| 7,693,171 | B2 | 4/2010 | Gould |
| 7,716,668 | B2 | 5/2010 | Moore et al. |
| 7,721,314 | B2 | 5/2010 | Sincaglia et al. |
| 7,742,074 | B2 | 6/2010 | Minatogawa |
| 7,768,546 | B1 | 8/2010 | Boehringer, Jr. |
| 7,770,200 | B2 | 8/2010 | Brooks et al. |
| 7,809,942 | B2 | 10/2010 | Baran et al. |
| 7,873,660 | B1 | 1/2011 | Wong et al. |
| 7,889,765 | B2 | 2/2011 | Brooks et al. |
| 7,900,052 | B2 | 3/2011 | Jonas et al. |
| 7,954,131 | B2 | 5/2011 | Cholas et al. |
| 8,078,669 | B2 | 12/2011 | Ladd et al. |
| 8,099,757 | B2 | 1/2012 | Riedl et al. |
| 8,347,341 | B2 | 1/2013 | Markley et al. |
| 8,484,511 | B2 | 7/2013 | Engel et al. |
| 8,855,469 | B2 | 10/2014 | Maharajh et al. |
| 9,213,538 | B1 | 12/2015 | Ladd et al. |
| 9,215,423 | B2 | 12/2015 | Kimble et al. |
| 2001/0004768 | A1 | 6/2001 | Hodge et al. |
| 2001/0033583 | A1 | 10/2001 | Rabenko et al. |
| 2002/0007491 | A1 | 1/2002 | Schiller et al. |
| 2002/0024943 | A1 | 2/2002 | Karaul et al. |
| 2002/0027883 | A1 | 3/2002 | Belaiche |
| 2002/0032754 | A1 | 3/2002 | Logston et al. |
| 2002/0056125 | A1 | 5/2002 | Hodge et al. |
| 2002/0059619 | A1 | 5/2002 | Lebar |
| 2002/0066033 | A1 | 5/2002 | Dobbins et al. |
| 2002/0078444 | A1 | 6/2002 | Krewin et al. |
| 2002/0087976 | A1 | 7/2002 | Kaplan et al. |
| 2002/0123928 | A1 | 9/2002 | Eldering et al. |
| 2002/0144260 | A1 | 10/2002 | Devara |
| 2002/0147771 | A1 | 10/2002 | Traversat et al. |
| 2002/0152299 | A1 | 10/2002 | Traversat et al. |
| 2002/0166120 | A1 | 11/2002 | Boylan et al. |
| 2002/0178446 | A1 | 11/2002 | Sie et al. |
| 2002/0188744 | A1 | 12/2002 | Mani |
| 2002/0188869 | A1 | 12/2002 | Patrick |
| 2003/0002577 | A1 | 1/2003 | Pinder |
| 2003/0016627 | A1 | 1/2003 | Melampy et al. |

(56) References Cited

U.S. PATENT DOCUMENTS

| | | |
|---|---|---|
| 2003/0016701 A1 | 1/2003 | Hinson |
| 2003/0023983 A1 | 1/2003 | Pidgeon et al. |
| 2003/0028888 A1 | 2/2003 | Hunter et al. |
| 2003/0056217 A1 | 3/2003 | Brooks |
| 2003/0115267 A1 | 6/2003 | Hinton et al. |
| 2003/0126611 A1 | 7/2003 | Chernock et al. |
| 2003/0126618 A1 | 7/2003 | Wright |
| 2003/0149975 A1 | 8/2003 | Eldering et al. |
| 2003/0165241 A1 | 9/2003 | Fransdonk |
| 2003/0166401 A1 | 9/2003 | Combes et al. |
| 2003/0208767 A1 | 11/2003 | Williamson et al. |
| 2003/0213001 A1 | 11/2003 | Yuen et al. |
| 2003/0217137 A1 | 11/2003 | Roese et al. |
| 2003/0217365 A1 | 11/2003 | Caputo |
| 2003/0220100 A1 | 11/2003 | McElhatten et al. |
| 2003/0221191 A1 | 11/2003 | Khusheim |
| 2003/0225777 A1* | 12/2003 | Marsh ............... H04N 7/163 |
| 2004/0015398 A1* | 1/2004 | Hayward ............ G06Q 30/02 705/14.49 |
| 2004/0024880 A1 | 2/2004 | Elving et al. |
| 2004/0034877 A1 | 2/2004 | Nogues |
| 2004/0040035 A1 | 2/2004 | Carlucci et al. |
| 2004/0045032 A1 | 3/2004 | Cummings et al. |
| 2004/0045035 A1 | 3/2004 | Cummings et al. |
| 2004/0045037 A1 | 3/2004 | Cummings et al. |
| 2004/0133923 A1 | 7/2004 | Watson et al. |
| 2004/0137918 A1 | 7/2004 | Varonen et al. |
| 2004/0148625 A1 | 7/2004 | Eldering et al. |
| 2004/0158858 A1 | 8/2004 | Paxton et al. |
| 2004/0181800 A1 | 9/2004 | Rakib et al. |
| 2004/0226043 A1 | 11/2004 | Mettu et al. |
| 2004/0230994 A1 | 11/2004 | Urdang et al. |
| 2004/0250273 A1 | 12/2004 | Swix et al. |
| 2005/0022247 A1 | 1/2005 | Bitran et al. |
| 2005/0034171 A1 | 2/2005 | Benya |
| 2005/0049886 A1 | 3/2005 | Grannan et al. |
| 2005/0055220 A1 | 3/2005 | Lee et al. |
| 2005/0055685 A1 | 3/2005 | Maynard et al. |
| 2005/0060742 A1 | 3/2005 | Riedl et al. |
| 2005/0086334 A1 | 4/2005 | Aaltonen et al. |
| 2005/0086683 A1 | 4/2005 | Meyerson |
| 2005/0108763 A1 | 5/2005 | Baran et al. |
| 2005/0114900 A1 | 5/2005 | Ladd et al. |
| 2005/0125824 A1 | 6/2005 | Bienstock |
| 2005/0177855 A1 | 8/2005 | Maynard et al. |
| 2005/0187823 A1 | 8/2005 | Howes |
| 2005/0198686 A1 | 9/2005 | Krause et al. |
| 2005/0216933 A1 | 9/2005 | Black |
| 2005/0228725 A1 | 10/2005 | Rao et al. |
| 2005/0235307 A1 | 10/2005 | Relan et al. |
| 2005/0289618 A1 | 12/2005 | Hardin |
| 2006/0020786 A1 | 1/2006 | Helms et al. |
| 2006/0021004 A1 | 1/2006 | Moran et al. |
| 2006/0041905 A1 | 2/2006 | Wasilewski |
| 2006/0047957 A1 | 3/2006 | Helms et al. |
| 2006/0095940 A1 | 5/2006 | Yearwood |
| 2006/0117354 A1 | 6/2006 | Schutte et al. |
| 2006/0130099 A1 | 6/2006 | Rooyen |
| 2006/0130101 A1 | 6/2006 | Wessel Van Rooyen et al. |
| 2006/0130107 A1 | 6/2006 | Gonder et al. |
| 2006/0130113 A1 | 6/2006 | Carlucci et al. |
| 2006/0136964 A1 | 6/2006 | Diez et al. |
| 2006/0149624 A1 | 7/2006 | Baluja et al. |
| 2006/0149850 A1 | 7/2006 | Bowman |
| 2006/0156332 A1 | 7/2006 | Kendall |
| 2006/0161635 A1 | 7/2006 | Lamkin et al. |
| 2006/0168609 A1* | 7/2006 | Chen ............... H04H 60/64 725/9 |
| 2006/0171390 A1 | 8/2006 | La Joie |
| 2006/0171423 A1 | 8/2006 | Helms et al. |
| 2006/0187900 A1 | 8/2006 | Akbar |
| 2006/0206712 A1 | 9/2006 | Dillaway et al. |
| 2006/0209799 A1 | 9/2006 | Gallagher et al. |
| 2006/0218604 A1 | 9/2006 | Riedl et al. |
| 2006/0225118 A1 | 10/2006 | Rolls et al. |
| 2006/0233372 A1 | 10/2006 | Shaheen et al. |
| 2006/0248553 A1 | 11/2006 | Mikkelson et al. |
| 2006/0248556 A1 | 11/2006 | Yuen et al. |
| 2006/0251097 A1 | 11/2006 | Chapman et al. |
| 2006/0259927 A1 | 11/2006 | Acharya et al. |
| 2006/0287915 A1 | 12/2006 | Boulet et al. |
| 2006/0291506 A1 | 12/2006 | Cain |
| 2007/0019645 A1 | 1/2007 | Menon |
| 2007/0022459 A1 | 1/2007 | Gaebel, Jr. et al. |
| 2007/0022469 A1 | 1/2007 | Cooper et al. |
| 2007/0033531 A1 | 2/2007 | Marsh |
| 2007/0049245 A1 | 3/2007 | Lipman |
| 2007/0061023 A1 | 3/2007 | Hoffberg et al. |
| 2007/0067851 A1 | 3/2007 | Fernando et al. |
| 2007/0076728 A1 | 4/2007 | Rieger et al. |
| 2007/0094691 A1 | 4/2007 | Gazdzinski |
| 2007/0121678 A1 | 5/2007 | Brooks et al. |
| 2007/0124488 A1 | 5/2007 | Baum et al. |
| 2007/0136777 A1 | 6/2007 | Hasek et al. |
| 2007/0157262 A1 | 7/2007 | Ramaswamy et al. |
| 2007/0180230 A1 | 8/2007 | Cortez |
| 2007/0186228 A1 | 8/2007 | Ramaswamy et al. |
| 2007/0198839 A1 | 8/2007 | Carle et al. |
| 2007/0204314 A1 | 8/2007 | Hasek et al. |
| 2007/0209059 A1 | 9/2007 | Moore et al. |
| 2007/0217436 A1 | 9/2007 | Markley et al. |
| 2007/0219910 A1 | 9/2007 | Martinez |
| 2007/0245376 A1 | 10/2007 | Svendsen |
| 2007/0250880 A1 | 10/2007 | Hainline |
| 2007/0261116 A1 | 11/2007 | Prafullchandra et al. |
| 2007/0276926 A1 | 11/2007 | LaJoie et al. |
| 2007/0280298 A1 | 12/2007 | Hearn et al. |
| 2007/0288715 A1 | 12/2007 | Boswell et al. |
| 2008/0022012 A1 | 1/2008 | Wang |
| 2008/0059804 A1 | 3/2008 | Shah et al. |
| 2008/0066112 A1 | 3/2008 | Bailey et al. |
| 2008/0091805 A1 | 4/2008 | Malaby et al. |
| 2008/0091807 A1 | 4/2008 | Strub et al. |
| 2008/0098212 A1 | 4/2008 | Helms et al. |
| 2008/0112405 A1 | 5/2008 | Cholas et al. |
| 2008/0120667 A1 | 5/2008 | Zaltsman |
| 2008/0133551 A1 | 6/2008 | Wensley et al. |
| 2008/0155059 A1 | 6/2008 | Hardin et al. |
| 2008/0162353 A1 | 7/2008 | Tom et al. |
| 2008/0170551 A1 | 7/2008 | Zaks |
| 2008/0172287 A1* | 7/2008 | Tien ............... G06Q 10/0639 705/7.38 |
| 2008/0177998 A1 | 7/2008 | Apsangi et al. |
| 2008/0201386 A1 | 8/2008 | Maharajh et al. |
| 2008/0201731 A1 | 8/2008 | Howcroft |
| 2008/0209489 A1 | 8/2008 | Joyce et al. |
| 2008/0222684 A1 | 9/2008 | Mukraj et al. |
| 2008/0235746 A1 | 9/2008 | Peters et al. |
| 2008/0273591 A1 | 11/2008 | Brooks et al. |
| 2008/0279534 A1 | 11/2008 | Buttars |
| 2008/0282299 A1 | 11/2008 | Koat et al. |
| 2008/0306903 A1 | 12/2008 | Larson et al. |
| 2009/0083813 A1 | 3/2009 | Dolce et al. |
| 2009/0086643 A1 | 4/2009 | Kotrla et al. |
| 2009/0098861 A1 | 4/2009 | Kalliola et al. |
| 2009/0100459 A1 | 4/2009 | Riedl et al. |
| 2009/0100493 A1 | 4/2009 | Jones et al. |
| 2009/0133048 A1 | 5/2009 | Gibbs et al. |
| 2009/0150917 A1 | 6/2009 | Huffman et al. |
| 2009/0150926 A1 | 6/2009 | Schlack |
| 2009/0172776 A1 | 7/2009 | Makagon et al. |
| 2009/0185576 A1 | 7/2009 | Kisel et al. |
| 2009/0201917 A1 | 8/2009 | Maes et al. |
| 2009/0210912 A1 | 8/2009 | Cholas et al. |
| 2009/0217326 A1 | 8/2009 | Hasek |
| 2009/0225760 A1 | 9/2009 | Foti |
| 2009/0249615 A1 | 10/2009 | Liu et al. |
| 2009/0282241 A1 | 11/2009 | Prafullchandra et al. |
| 2009/0293101 A1 | 11/2009 | Carter et al. |
| 2010/0005527 A1 | 1/2010 | Jeon |
| 2010/0027560 A1 | 2/2010 | Yang et al. |
| 2010/0030578 A1 | 2/2010 | Siddique et al. |
| 2010/0042478 A1 | 2/2010 | Reisman |
| 2010/0083329 A1 | 4/2010 | Joyce et al. |

(56) References Cited

U.S. PATENT DOCUMENTS

| | | |
|---|---|---|
| 2010/0106846 A1 | 4/2010 | Noldus et al. |
| 2010/0115091 A1 | 5/2010 | Park et al. |
| 2010/0115113 A1 | 5/2010 | Short et al. |
| 2010/0122276 A1 | 5/2010 | Chen |
| 2010/0125658 A1 | 5/2010 | Strasters |
| 2010/0131973 A1 | 5/2010 | Dillon et al. |
| 2010/0138900 A1 | 6/2010 | Peterka et al. |
| 2010/0169977 A1 | 7/2010 | Dasher et al. |
| 2010/0211967 A1 | 8/2010 | Ramaswamy et al. |
| 2010/0211982 A1 | 8/2010 | Lee et al. |
| 2010/0218231 A1 | 8/2010 | Frink et al. |
| 2010/0280641 A1 | 11/2010 | Harkness et al. |
| 2010/0287209 A1 | 11/2010 | Hauser |
| 2010/0287609 A1 | 11/2010 | Gonzalez et al. |
| 2010/0313225 A1 | 12/2010 | Cholas et al. |
| 2011/0015989 A1 | 1/2011 | Tidwell et al. |
| 2011/0016479 A1 | 1/2011 | Tidwell et al. |
| 2011/0016482 A1 | 1/2011 | Tidwell et al. |
| 2011/0071841 A1 | 3/2011 | Fomenko et al. |
| 2011/0090898 A1 | 4/2011 | Patel et al. |
| 2011/0093900 A1 | 4/2011 | Patel et al. |
| 2011/0099017 A1 | 4/2011 | Ure |
| 2011/0103374 A1 | 5/2011 | Lajoie et al. |
| 2011/0110515 A1 | 5/2011 | Tidwell et al. |
| 2011/0126018 A1 | 5/2011 | Narsinh et al. |
| 2011/0138064 A1 | 6/2011 | Rieger et al. |
| 2011/0178943 A1 | 7/2011 | Motahari et al. |
| 2011/0213688 A1 | 9/2011 | Santos et al. |
| 2011/0219229 A1 | 9/2011 | Cholas et al. |
| 2011/0265116 A1 | 10/2011 | Stern et al. |
| 2011/0267952 A1 | 11/2011 | Ko et al. |
| 2012/0005527 A1 | 1/2012 | Engel et al. |
| 2012/0008786 A1 | 1/2012 | Cronk et al. |
| 2012/0011567 A1 | 1/2012 | Cronk et al. |
| 2012/0030363 A1 | 2/2012 | Conrad |
| 2012/0079518 A1 | 3/2012 | Wan et al. |
| 2012/0124606 A1 | 5/2012 | Tidwell et al. |

FOREIGN PATENT DOCUMENTS

| | | |
|---|---|---|
| JP | 2005339093 A | 12/2005 |
| JP | 2008015936 A | 1/2008 |
| JP | 2009211632 A | 9/2009 |
| JP | 2010502109 A | 1/2010 |
| JP | 2010079902 A | 4/2010 |
| JP | 2012505436 A | 3/2012 |
| JP | 2012523614 A | 10/2012 |
| WO | WO-2005015422 A1 | 2/2005 |
| WO | WO-2012021245 A1 | 2/2012 |

OTHER PUBLICATIONS

Denning, et al., Cryptography and Data Security, Addison-Wesley Publishing Company, ISBN 0-201-10150-5, 1982.

DLNA (Digital Living Network Alliance) protocols described in DLNA Networked Device Interoperability Guidelines Expanded, Mar. 2006 and subsequent expanded version dated Oct. 2006.

UTF-32, IBM, retrieved from http://publib.boulder.ibm.com/infocenter/iseries/v5r3/index.jsp?topic=%2Fnls%Frbagsutf32.htm on Aug. 28, 2013.

* cited by examiner

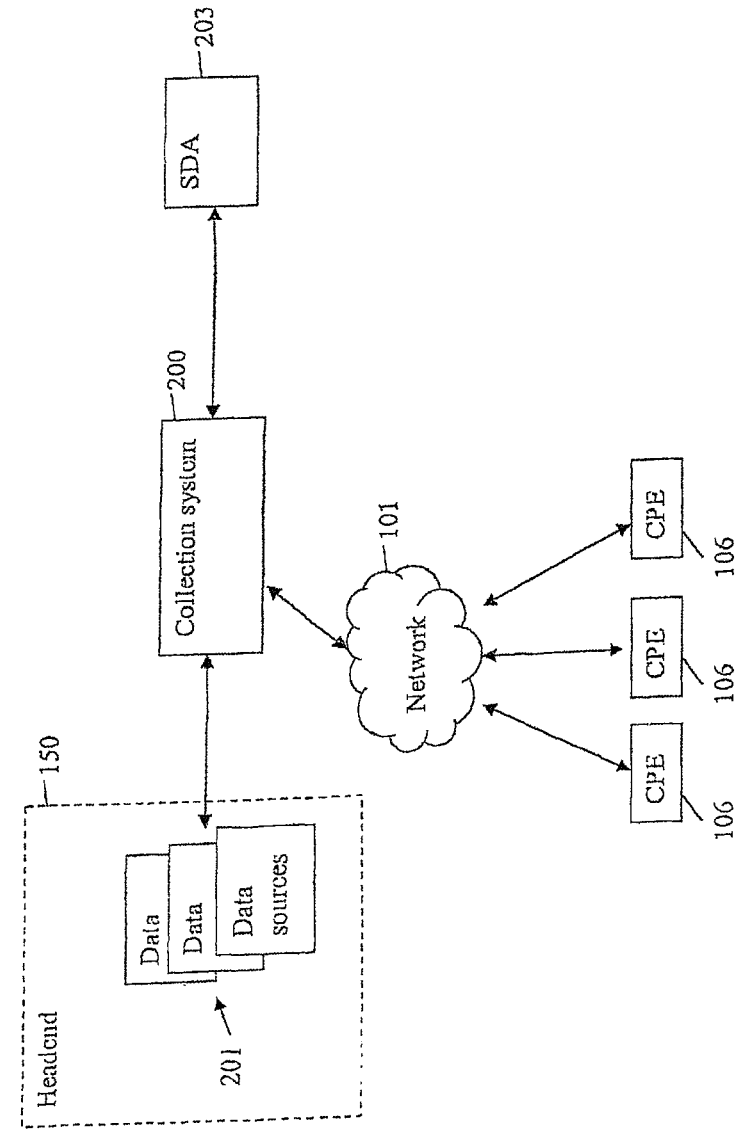

| STORAGE FIELD | SOURCE |
|---|---|
| TABLE_NAME | NAME OF THE TABLE |
| DATE | TIME IN WHICH A TRANSFER STARTED OF FINISHED |
| LOAD_STATUS | DESCRIBES THE STATUS OF THE LOAD. I FOR FOR IN PROGRESS, C FOR COMPLETED, T FOR TRANSFERRED |

| STORAGE FIELD | SOURCE |
|---|---|
| TABLE_NAME | NAME OF THE TABLE |
| DATE | TIME IN WHICH A FINISHED |
| TRANSFER_STATUS | C FOR COMPLETE OR E FOR ERROR |
| NUMBER_ROWS | NUMBER OF ROWS |

| E \ Downstream | A SDA | B Reports | C NCC |
|---|---|---|---|
| 1. SDV | Yes | Yes | Corr |
| 2. Advertisement Data | Yes | Yes | Yes |
| 3. EPG Data | Yes | Yes | Corr |
| 4. AS Data | Yes | No | Corr |
| 5. Subscriber Provisioning Feed | Yes | Corr | Corr |
| 6. Video On Demand | Yes | Yes | Yes |

FIG. 27

| STATE TRANSACTIONS | STATE TO | | | | | | | | | |
|---|---|---|---|---|---|---|---|---|---|---|
| | ACTIVE-PIP NON RECORDING | ACTIVE-PIP RECORDING | ZOMBIE | INIT | BACKGROUND-NON-RECORDING | NON-RESPONDER-SDV ERROR | BACKGROUND-RECORDING | INACTIVE | ACTIVE-MAIN-NON-RECORDING | ACTIVE-MAIN-RECORDING |
| ACTIVE-PIP NON RECORDING | PIP-OUT TO PIP-IN | PIP-OUT TO PIP-IN (R) | PIP-OUT | E-OUT | PIP-OUT TO B-IN | S-E-OUT | PIP-OUT TO B-OUT (R) | PIP-OUT | PIP-OUT TO IN | PIP-OUT TO IN (R) |
| ACTIVE-PIP RECORDING | PIP-OUT (R) TO PIP-IN | PIP-OUT (R) TO PIP-IN (R) | PIP-OUT (R) | E-OUT | PIP-OUT (R) TO B-IN | S-E-OUT | PIP-OUT (R) TO B-IN | PIP-OUT (R) | PIP-OUT (R) IN | PIP-OUT (R) TO IN (R) |
| ZOMBIE | PIP-IN | PIP-IN (R) | N/A | N/A | B-IN | N/A | B-IN | N/A | IN | IN (R) |
| INIT | PIP-IN | PIP-IN (R) | N/A | N/A | B-IN | N/A | B-IN | N/A | IN | IN (R) |
| BACKGROUND-NON-RECORDING | B-OUT & PIP-IN | B-OUT TO PIP-IN (R) | B-OUT | E-OUT | B-OUT TO B-OUT | S-E-OUT | B-OUT TO B-OUT | B-OUT | B-OUT TO IN | B-OUT TO IN (R) |
| NON-RESPONDER /SDV ERROR | PIP-IN | PIP-IN (R) | N/A | N/A | B-IN | N/A | B-IN | N/A | IN | IN (R) |
| BACKGROUND-RECORDING | B-OUT (R) TO PIP IN | B-OUT (R) TO PIP-IN (R) | B-OUT (R) | E-OUT | B-OUT (R) TO B-IN | S-E-OUT | B-OUT TO (R) B-IN | B-OUT (R) | B-OUT (R) TO IN | B-OUT (R) TO IN (R) |
| INACTIVE | PIP-IN | PIP-IN (R) | N/A | N/A | B-IN | N/A | B-IN | N/A | IN | IN (R) |
| ACTIVE-MAIN-NON-RECORDING | OUT TO PIP-IN | OUT TO PIP-IN (R) | OUT | E-OUT | OUT TO B-IN | S-E-OUT | OUT TO B-IN | OUT | OUT TO IN | OUT TO IN (R) |
| ACTIVE-MAIN-RECORDING | OUT (R) TO PIP-IN | OUT (R) TO PIP-IN (R) | OUT (R) | E-OUT | OUT (R) TO B-IN | S-E-OUT | OUT (R) TO B-IN | OUT (R) | OUT (R) TO IN | OUT (R) TO IN (R) |

FIG. 32

| KEY | DESCRIPTION |
|---|---|
| XXX | EVENT ONLY VALID IF FROM-TO INVOLVES CHANNEL CHANGE |
| IN | NORMAL TUNE IN EVENT (MAIN OUTPUT) |
| OUT | NORMAL TUNE-OUT EVENT (MAIN OUTPUT) |
| PIP-IN | PIP TUNE IN EVENT (PIP OUTPUT) |
| PIP-OUT | PIP TUNE-OUT EVENT (PIP OUTPUT) |
| B-IN | BACKGROUND TUNE IN EVENT (NEITHER MAIN OR PIP OUTPUT) |
| B-OUT | BACKGROUND TUNE-OUT EVENT (NEITHER MAIN OR PIP OUTPUT) |
| Z-OUT | TUNE-OUT DUE TO EITHER A MEASURED ZOMBIE OR FORCED ZOMBIE EVENT |
| E-OUT | TUNE-OUT GENERATED DUE TO AN ERROR EVENT RELATING TO STB CONNECTIVITY |
| S-E-OUT | TUNE-OUT GENERATED DUE TO AN SDV ERROR |
| (R) | INDICATES IS_REC FLAG |
| N/A | INVALID STATE INTERACTION - WILL NOT OCCUR, OR SHALL BE IGNORED |

*FIG. 32*
(CONTINUED)

METHODS AND APPARATUS FOR AUDIENCE DATA COLLECTION AND ANALYSIS IN A CONTENT DELIVERY NETWORK

PRIORITY AND RELATED APPLICATIONS

This application is a continuation of and claims priority to co-owned, co-pending U.S. patent application Ser. No. 12/877,062 of the same title filed on Sep. 7, 2010 which claims priority to commonly owned U.S. Provisional Patent Application Ser. No. 61/260,346 of the same title filed on Nov. 11, 2009, each of which is incorporated herein by reference in its entirety. This application is related to commonly owned U.S. Provisional Patent Application Ser. No. 61/256,903 filed on Oct. 30, 2009 and entitled "METHODS AND APPARATUS FOR PACKETIZED CONTENT DELIVERY OVER A CONTENT DELIVERY NETWORK", which is incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of Invention

The invention relates generally to the field of data manipulation and analysis. Specifically, in one exemplary aspect, the invention relates to computer-assisted methods and apparatus for collection and classification of data regarding an audience in a content delivery network, such as a cable television or satellite network.

2. Description of Related Technology

Content delivery and distribution networks may have a large number of disparate users. In many situations, it is desirable that the preferences and behaviors of these disparate users be known to the operators of the network (as well as the content sources which generate the content for distribution over the network). Moreover, in cases where the users are subscribers or customers of the delivery network (e.g., as in a cable television, satellite, Hybrid Fiber over Copper (HFCu), or similar network), revenue, profit, and subscriber retention/addition are also critical concerns, since these factors effectively keep the network operator (and to some degree content producers) commercially viable. Billing systems and other support systems have accordingly been set up within such networks in order to facilitate tracking of customers or subscribers in terms of subscription level, access privileges, account status (e.g., payments, delinquency), requests for changes in service, and other related functions.

Prior art implementations however, generally lack the ability to rapidly and accurately track user behavior, preferences, and activity (including user interaction with programs or applications), and analyze this data in a timely fashion so as to e.g., allow for "tailored" advertisement insertion, selection of content for delivery to the users. These prior art systems are also generally entirely reactive; i.e., do not incorporate real-time data to proactively adjust the delivery of content, advertisements, etc. in advance of a user's request or specified preference.

SUMMARY OF THE INVENTION

The present invention addresses the foregoing needs by providing, inter alia, methods and apparatus adapted to collect and analyze audience data.

In a first aspect of the invention, a method for the collection and analysis of data relating to the delivery of content is disclosed. In one embodiment, the content is delivered via a content delivery network (e.g., cable, satellite, HFCu, etc.), and the method comprises: receiving one or more content-related data elements; monitoring user interaction with the content to generate usage data records; processing the usage data records; and transmitting the one or more content-related data elements and the processed usage data records to an analysis entity. The analysis entity is configured to analyze the data elements and usage records, and generate one or more reports therefrom.

In one variant, the one or more reports are subsequently utilized for future content delivery decisions.

In a second aspect of the invention, a data acquisition and analysis hardware architecture for use in a content delivery network is disclosed.

In a third aspect of the invention, a data acquisition and analysis software architecture for use in a content delivery network is disclosed.

In a fourth aspect of the invention, a CPE with data acquisition and transmission capabilities for use with the above-referenced architecture is disclosed.

In a fifth aspect of the invention, a data analysis engine is disclosed.

In a sixth aspect of the invention, a database architecture for maintaining various types of user/content-related data is disclosed.

In a seventh aspect of the invention, a computer-readable apparatus is disclosed. In one embodiment, the apparatus comprises at least one computer program adapted to analyze multi-source data relating to user behavior and activity.

In an eighth aspect, method for collecting and analyzing of data relating to delivery of content via a network is disclosed. In one embodiment, the method comprises: (i) collecting a plurality of user activity data, the user activity data comprising data relating to usage or interaction by a user with the content; (ii) receiving a plurality of reference data, the reference data describing the content; (iii) correlating at least a portion of the user activity data to the reference data to create viewing impressions; and (iv) transmitting the viewing impressions to an entity for analysis thereof.

In a ninth aspect, a method for managing data in a operator-managed content delivery network is disclosed. In one embodiment, the method comprises: (i) receiving a first plurality data, the first plurality of data comprising a plurality of fields comprising data relating to a subscriber's interaction with a plurality of content delivered thereto, at least a portion of the first plurality of data being: validated so as to ensure a device from which the first plurality of data is received is associated with the subscriber; and parsed to individual ones of the plurality of fields; (ii) receiving a second plurality of data, the second plurality of data comprising data describing the plurality of content; and (iii) processing the individual ones of the plurality of fields to generate a plurality of records correlating the individual ones of the plurality of fields to the reference data, the plurality of records correlating the individual ones of the plurality of fields to the reference data being utilized to describe a period of time in which the subscriber is presumed to be utilizing a particular one of the plurality of content.

In a tenth aspect, an apparatus for collection and analysis of data relating to delivery of content in a network is disclosed. In one embodiment, the apparatus comprises: first logic configured to collect a plurality of data relating to a plurality of primary and secondary content delivered to a plurality of subscriber devices via the network; and second logic configured to collect a plurality of data relating to individual ones of a plurality of tuning events which occur at the plurality of subscriber devices, the plurality of subscriber devices being associated with one or more of a plurality of subscribers.

In an eleventh aspect, a network apparatus for use in a network is disclosed, in one embodiment, the network apparatus comprises: an interface configured to communicate with the network; processing apparatus in communication with the interface; at least one storage device in communication with the processing apparatus, the storage device comprising a computer program which is configured to, when executed on the processing apparatus: (i) obtain data relating to at least one of each primary and secondary content elements delivered to a plurality of client apparatus via the network; (ii) collect a plurality of data relating to individual ones of a plurality of tuning events which occur at the plurality of client apparatus; and (iii) process the obtained data and the collected plurality of data so as to identify one or more correlations between the tuning events and the delivered primary and secondary content elements.

These and other features and advantages of the present invention will immediately be recognized by persons of ordinary skill in the art with reference to the attached drawings and detailed description of exemplary embodiments as given below.

BRIEF DESCRIPTION OF THE DRAWINGS

FIG. 2 is a block diagram illustrating an exemplary overarching architecture for the collection and analysis of data.

FIG. 13a illustrates an exemplary global control table.

FIG. 13b illustrates an exemplary system control table.

FIG. 27 is a matrix of the network elements and the downstream.

FIG. 32 is a matrix of the valid TUNE OUT events and appropriate tuning events.

Figure 1:
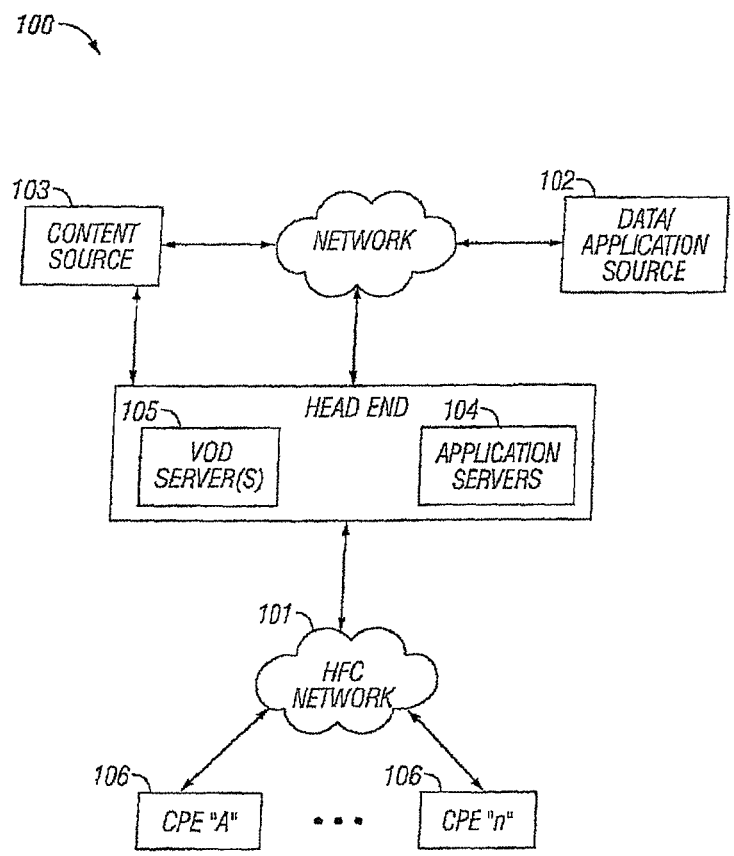
FIG. 1 is a functional block diagram illustrating an exemplary HFC cable network configuration useful with the present invention.

All figures © Copyright 2009-2010 Time Warner Cable, Inc. All rights reserved.

DETAILED DESCRIPTION OF THE INVENTION

Reference is now made to the drawings, wherein like numerals refer to like parts throughout.

As used herein, the term "advertisement" refers to (without limitation) advertising, promotions, info-mercials, related segments, or special features (e.g., the making of "X", where X is the primary content), as well as other types of secondary content.

As used herein, the term "application" refers generally to a unit of executable software that implements a certain functionality or theme. The themes of applications vary broadly across any number of disciplines and functions (such as on-demand content management, e-commerce transactions, brokerage transactions, home entertainment, calculator etc.), and one application may have more than one theme. The unit of executable software generally runs in a predetermined environment; for example, the unit could comprise a downloadable Java Xlet™ that runs within the JavaTV™ environment.

As used herein, the terms "client device" and "end user device" include, but are not limited to, set-top boxes (e.g., DSTBs), personal computers (PCs), and minicomputers, whether desktop, laptop, or otherwise, and mobile devices such as handheld computers, PDAs, personal media devices (PMDs), and smartphones.

As used herein, the term "computer program" or "software" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.), Binary Runtime Environment (e.g., BREW), and the like.

The terms "Customer Premises Equipment (CPE)" and "host device" refer to any type of electronic equipment located within a customer's or user's premises and connected to a network. The term "host device" refers generally to a terminal device that has access to digital television content via a satellite, cable, or terrestrial network. The host device functionality may be integrated into a digital television (DTV) set. The term "customer premises equipment" (CPE) includes such electronic equipment such as set-top boxes (e.g., DSTBs), televisions, cable modems (CMs), embedded multimedia terminal adapters (eMTAs), whether stand-alone or integrated with other devices, Digital Video Recorders (DVR), gateway storage devices (Furnace), and ITV Personal Computers.

As used herein, the term "database" refers generally to one or more tangible or virtual data storage locations, which may or may not be physically co-located with each other or other system components.

As used herein, the term "display" means any type of device adapted to display information, including without limitation CRTs, LCDs, TFTs, plasma displays, LEDs, incandescent and fluorescent devices. Display devices may also include less dynamic devices such as, for example, printers, e-ink devices, and the like.

As used herein, the term "DVR" (digital video recorder) refers generally to any type or recording mechanism and/or software environment whereby content sent over a network can be recorded and selectively recalled. Such DVR may be dedicated in nature, or part of a non-dedicated or multi-function system.

As used herein, the term "DOCSIS" refers to any of the existing or planned variants of the Data Over Cable Services Interface Specification, including for example DOCSIS versions 1.0, 1.1, 2.0 and 3.0. DOCSIS (version 1.0) is a standard and protocol for internet access using a "digital" cable network.

As used herein, the term "headend" refers generally to a networked system controlled by an operator (e.g., an MSO) that distributes programming to MSO clientele using client devices. Such programming may include literally any information source/receiver including, inter alia, free-to-air TV channels, pay TV channels, interactive TV, and the Internet.

As used herein, the terms "Internet" and "internet" are used interchangeably to refer to inter-networks including, without limitation, the Internet.

As used herein, the terms "microprocessor" and "digital processor" are meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable compute fabrics (RCFs), array processors, secure microprocessors, and application-specific integrated circuits (ASICs). Such digital processors may be contained on a single unitary IC die, or distributed across multiple components.

As used herein, the terms "MSO" or "multiple systems operator" refer to a cable, satellite, or terrestrial network provider having infrastructure required to deliver services including programming and data over those mediums.

As used herein, the terms "network" and "bearer network" refer generally to any type of telecommunications or data network including, without limitation, hybrid fiber coax (HFC) networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, ATM, X.25, Frame Relay, 3GPP, 3GPP2, WAP, SIP, UDP, FTP, RTP/RTCP, H.323, etc.).

As used herein, the term "node" refers without limitation to any location, functional entity, or component within a network.

As used herein, the term "QAM" refers to modulation schemes used for sending signals over cable networks. Such modulation scheme might use any constellation level (e.g. QPSK, 16QAM, 64QAM, 256QAM, etc.) depending on details of a cable network. A QAM may also refer to a physical channel modulated according to the schemes.

As used herein, the term "network interface" refers to any signal, data, or software interface with a component, network or process including, without limitation, those of the Firewire (e.g., FW400, FW800, etc.), USB (e.g., USB2), Ethernet (e.g., 10/100, 10/100/1000 (Gigabit Ethernet), 10-Gig-E, etc.), MoCA, Serial ATA (e.g., SATA, e-SATA, SATAII), Ultra-ATA/DMA, Coaxsys (e.g., TVnet™), radio frequency tuner (e.g., in-band or OOB, cable modem, etc.), WiFi (802.11a,b,g,n), WiMAX (802.16), PAN (802.15), or IrDA families.

As used herein, the term "storage device" refers to without limitation computer hard drives, DVR device, memory, RAID devices or arrays, optical media (e.g., CD-ROMs, Laserdiscs, Blu-Ray, etc.), or any other devices or media capable of storing content or other information.

As used herein, the term "user interface" refers to, without limitation, any visual, graphical, tactile, audible, sensory, or other means of providing information to and/or receiving information from a user or other entity.

As used herein, the term "wireless" means any wireless signal, data, communication, or other interface including without limitation WiFi (such as IEEE-Std. 802.11 or related standards including 802.11 a/b/g/n), Bluetooth, 3G, HSDPA/HSUPA, TDMA, CDMA (e.g., IS-95A, WCDMA, etc.), FHSS, DSSS, GSM, PAN/802.15, WiMAX (802.16), 802.20, narrowband/FDMA, OFDM, PCS/DCS, analog cellular, CDPD, satellite systems, millimeter wave or microwave systems, acoustic, and infrared (i.e., IrDA).

Overview

In one salient aspect, the present invention discloses methods and apparatus for audience data collection and analysis in a content delivery network (such as a cable, satellite or HFCu network). In one embodiment, the invention provides for the collection of data from various data sources, such as inter alia, a device/user data source, an switched digital video (SDV) data source, a subscriber data source, a video on-demand (VOD) data source, an application server (AS) data source, an advertisement data source, and an electronic program guide (EPG) data source. Collected data is transmitted to a data collection system, where the records are collected, processed and used to generate files for delivery to a subscriber data analysis (SDA) system, the delivered data being used for detailed analysis of user preferences, activity, and/or behavior.

Data is collected, parsed (if necessary), transformed and/or managed prior to transmission or reporting to the SDA (and other entities). One of the primary objectives of the SDA is to provide a reporting infrastructure from the collected data that provides usage, namely the SDV tuning events, VOD events and advertisement events. In one variant, reports are generated and transmitted, including: (i) household viewership, (ii) household commercial/advertisement viewership, and (iii) VOD consumption.

Reference data (e.g., static data) is loaded directly into the SDA through the use of a loader entity or through direct insertion. The MSO may provide facilities to keep internal reference data up to date, however, in some instances, records fail because the data is inconsistent with the subscriber information or the network. To account for that, the system advantageously provides a recycling mechanism to reprocess records that could not find matching records for. The aforementioned collection system may also provide the ability to log an error if connectivity is lost between elements in the collection system.

Input files, as collected, are in one embodiment archived or stored into a dedicated directory on the local file system. Additionally, exception (error, filter, and duplicate) files may be stored into a dedicated directory on the local file system as well.

A specific interface for retrieving audience measurement events from sample data sets prior to the transmission to the SDA is also discussed herein. In one variant, household data, channel information, and tuning data are collected via the interface.

In order to protect subscriber anonymity, customer identifiers (e.g., MAC address, subscriber account numbers, customer account numbers) may, in one embodiment, be made anonymous after being is correlated with generic demographic information prior to its delivery.

Information may also be collected under the present invention from the use of interactive applications (e.g., "iTV" or similar interactive applications). Business methods and systems of implementation of the foregoing are also discussed herein.

DETAILED DESCRIPTION OF EXEMPLARY EMBODIMENTS

Exemplary embodiments of the audience classification apparatus and methods of the present invention are now described in detail. While these exemplary embodiments are described in the context of a hybrid fiber coax (HFC) cable architecture having a multiple systems operator (MSO), digital networking capability, and plurality of client devices/CPE, the general principles and advantages of the invention may be extended to other types of networks and architectures, whether broadband, narrowband, optical or electrical, wired or wireless, content or data, or otherwise. Hence, the following description is merely exemplary in nature. For example, the invention may be practiced over a fiber-to-the-home (FTTH) or fiber-to-the-curb (FTTC) system, HFCu networks, or over satellite or millimeter wave-based networks having two-way capabilities.

It will also be appreciated that while described generally in the context of a network providing service to a customer or consumer (i.e., residential) end user domain, the present invention may be readily adapted to other types of environments including, e.g., commercial/enterprise, and government/military applications. Myriad other applications are possible.

Also, while certain aspects are described primarily in the context of the well known IP or Internet Protocol (described in, inter alia, RFC 791 and 2460), it will be appreciated that the present invention may utilize other types of protocols (and in fact bearer networks to include other internets and intranets) to implement the described functionality.

Network—

FIG. 1 illustrates a typical content delivery network configuration with which the apparatus and methods of the present invention may be used. The various components of the network 100 include (i) one or more data and application origination points 102; (ii) one or more content sources 103, (iii) one or more application distribution servers 104; (iv) one or more VOD servers 105, and (v) customer premises equipment (CPE) 106. The distribution server(s) 104, VOD servers 105 and CPE(s) 106 are connected via a bearer (e.g., HFC) network 101. A simple architecture comprising one of each of the aforementioned components 102, 104, 105, 106 is shown in FIG. 1 for simplicity, although it will be recognized that comparable architectures with multiple origination points, distribution servers, VOD servers, and/or CPE devices (as well as different network topologies) may be utilized consistent with the invention. For example, the headend architecture of FIG. 1a (described in greater detail below) may be used.

The data/application origination point 102 comprises any medium that allows data and/or applications (such as a VOD-based or "Watch TV" application) to be transferred to a distribution server 104. This can include for example a third party data source, application vendor website, CD-ROM, external network interface, mass storage device (e.g., RAID system), etc. Such transference may be automatic, initiated upon the occurrence of one or more specified events (such as the receipt of a request packet or ACK), performed manually, or accomplished in any number of other modes readily recognized by those of ordinary skill.

The application distribution server 104 comprises a computer system where such applications can enter the network system. Distribution servers are well known in the networking arts, and accordingly not described further herein.

The VOD server 105 comprises a computer system where on-demand content can be received from one or more of the aforementioned data sources 102 and enter the network system. These servers may generate the content locally, or alternatively act as a gateway or intermediary from a distant source.

The CPE 106 includes any equipment in the "customers' premises" (or other locations, whether local or remote to the distribution server 104) that can be accessed by a distribution server 104.

Figure 1A:
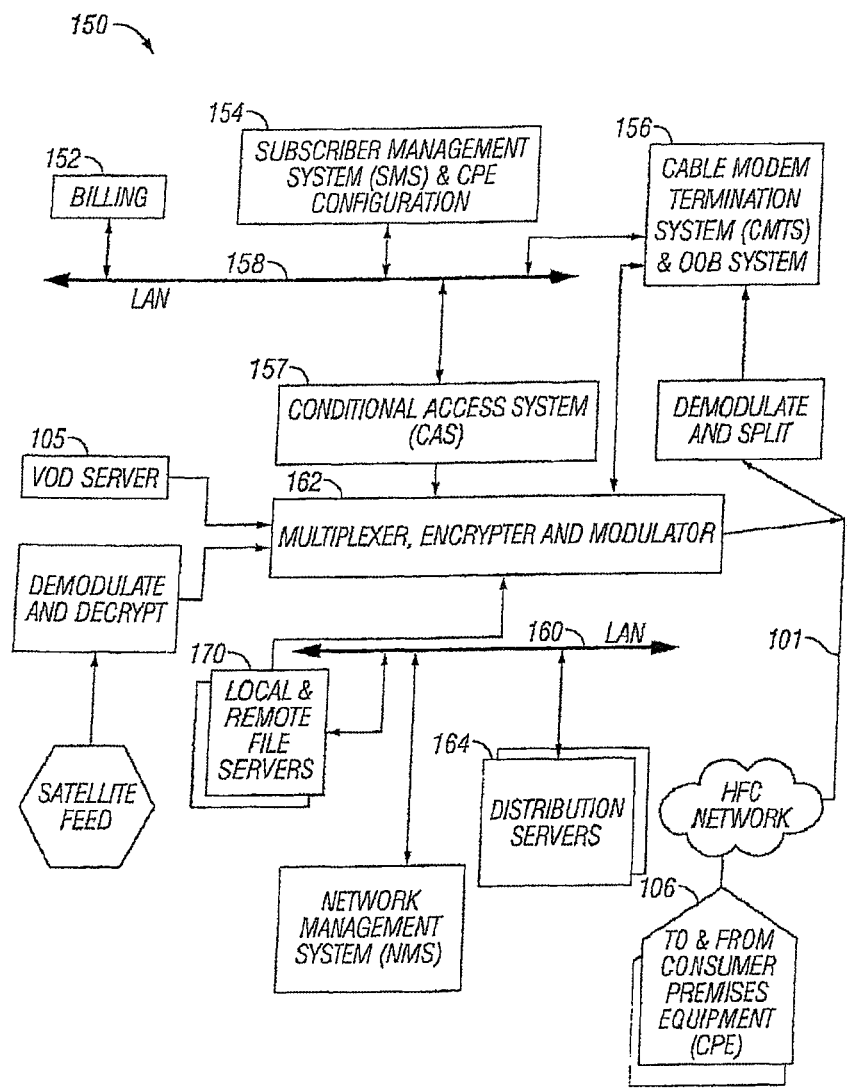
FIG. 1a is a functional block diagram illustrating one exemplary HFC cable network headend configuration useful with the present invention.

Referring now to FIG. 1a, one exemplary embodiment of a headend architecture useful with the present invention is described. As shown in FIG. 1a, the headend architecture 150 comprises typical headend components and services including billing module 152, subscriber management system (SMS) and CPE configuration management module 154, cable-modem termination system (CMTS) and OOB system 156, as well as LAN(s) 158, 160 placing the various components in data communication with one another. It will be appreciated that while a bar or bus LAN topology is illustrated, any number of other arrangements as previously referenced (e.g., ring, star, etc.) may be used consistent with the invention. It will also be appreciated that the headend configuration depicted in FIG. 1a is high-level, conceptual architecture and that each MSO may have multiple headends deployed using custom architectures.

Figure 1B:
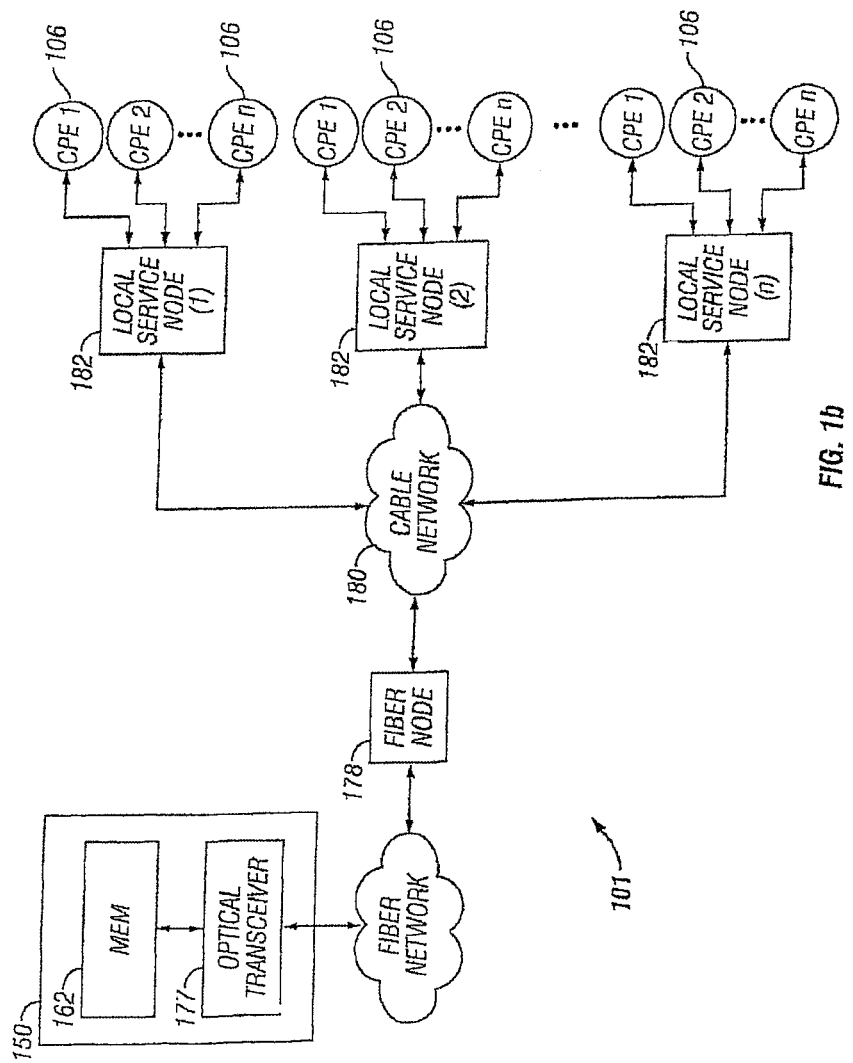
FIG. 1b is a functional block diagram illustrating one exemplary local service node configuration useful with the present invention.

The exemplary architecture 150 of FIG. 1a further includes a multiplexer-encrypter-modulator (MEM) 162 coupled to the HFC network 101 adapted to process or condition content for transmission over the network. The distribution servers 164 are coupled to the LAN 160, which provides access to the MEM 162 and network 101 via one or more file servers 170. The VoD servers 105 are coupled to the LAN 160 as well, although other architectures may be employed (such as for example where the VoD servers are associated with a core switching device such as an 802.3z Gigabit Ethernet device). As previously described, information is carried across multiple channels. Thus, the headend must be adapted to acquire the information for the carried channels from various sources. Typically, the channels being delivered from the headend 150 to the CPE 106 ("downstream") are multiplexed together in the headend as previously described, and sent to neighborhood hubs (FIG. 1b) via a variety of interposed network components.

Figure 1C:
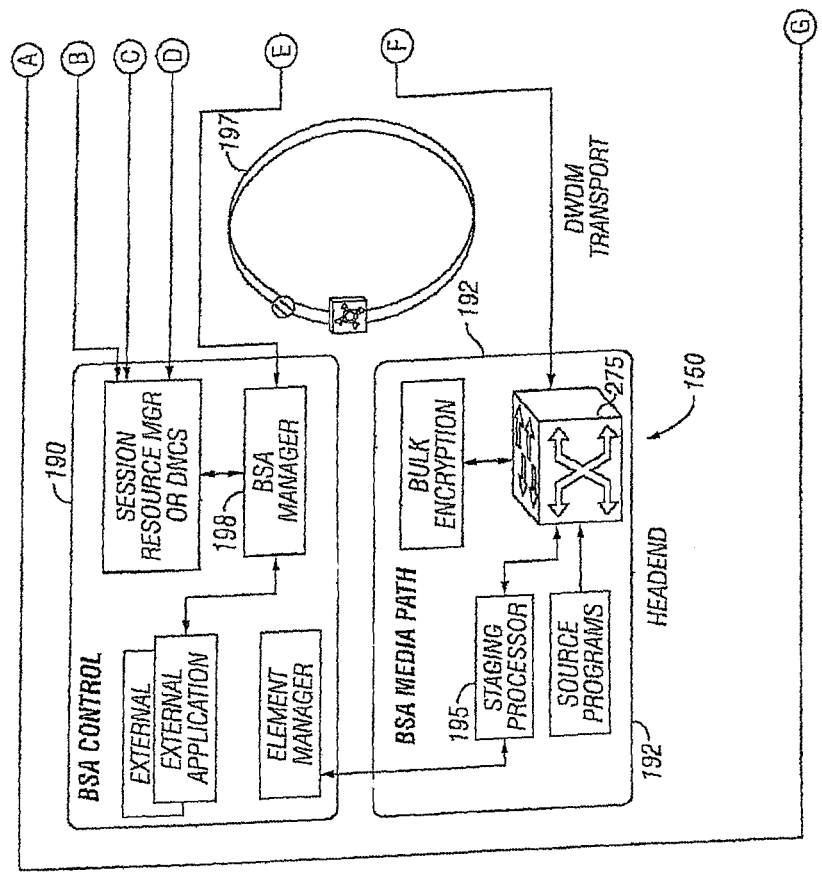
FIG. 1c is a functional block diagram illustrating one exemplary broadcast switched architecture (BSA) network useful with the present invention.
Figure 1C:
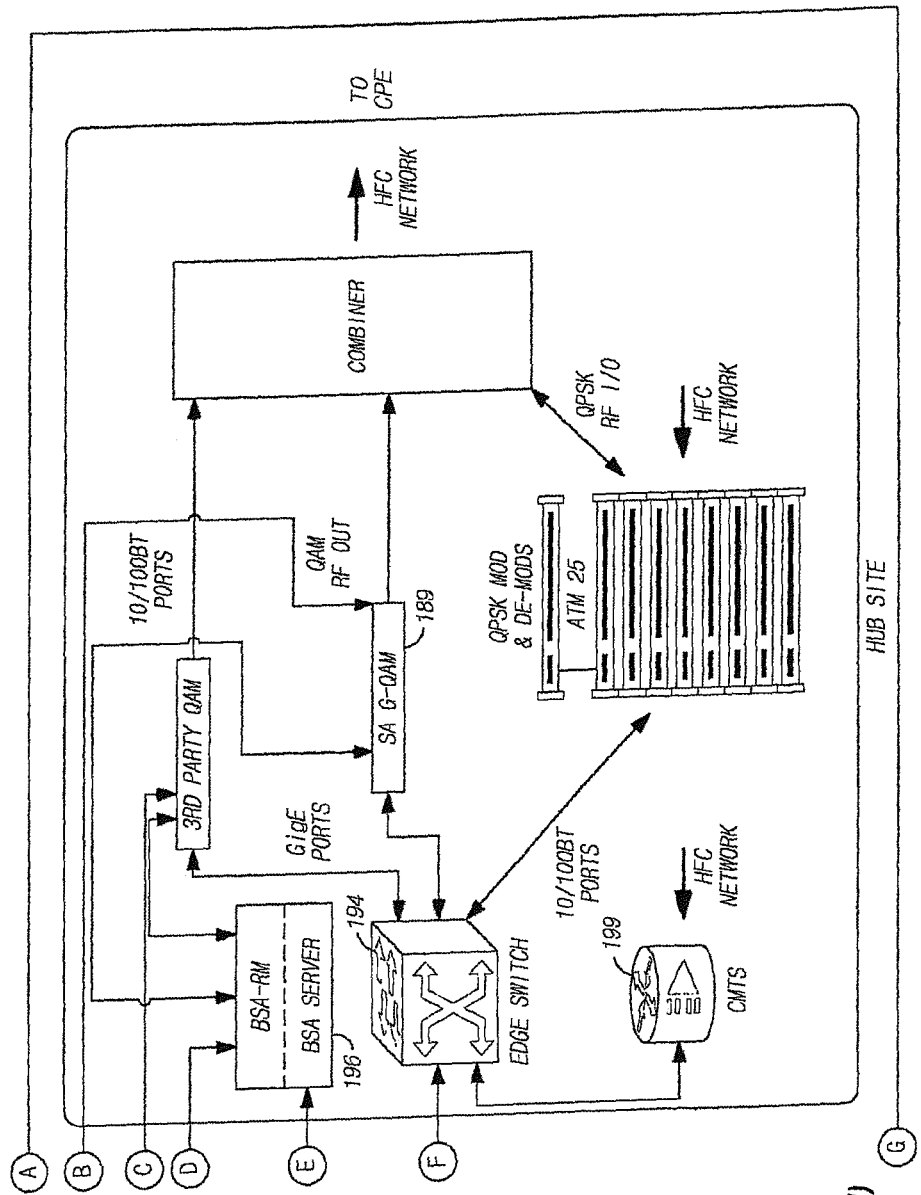

It will also be recognized, however, that the multiplexing operation(s) need not necessarily occur at the headend 150 (e.g., in the aforementioned MEM 162). For example, in one variant, at least a portion of the multiplexing is conducted at a BSA switching node or hub (see discussion of FIG. 1c provided subsequently herein). As yet another alternative, a multi-location or multi-stage approach can be used, such as that described in U.S. patent application Ser. No. 11/048,334, entitled "APPARATUS AND METHODS FOR MULTI-STAGE MULTIPLEXING IN A NETWORK" incorporated herein by reference in its entirety, which discloses inter cilia improved multiplexing apparatus and methods that allow such systems to dynamically compensate for content (e.g., advertisements, promotions, or other programs) that is inserted at a downstream network node such as a local hub, as well as "feed back" and "feed forward" mechanisms for transferring information between multiplexing stages.

Content (e.g., audio, video, data, files, etc.) is provided in each downstream (in-band) channel associated with the relevant service group. To communicate with the headend or intermediary node (e.g., hub server), the CPE 106 may use the out-of-band (OOB) or DOCSIS channels and associated protocols. The OCAP 1.0, 2.0, 3.0 (and subsequent) specification provides for exemplary networking protocols both downstream and upstream, although the invention is in no way limited to these approaches.

It will also be recognized that the multiple servers (broadcast, VoD, or otherwise) can be used, and disposed at two or more different locations if desired, such as being part of different server "farms". These multiple servers can be used to feed one service group, or alternatively different service groups. In a simple architecture, a single server is used to feed one or more service groups. In another variant, multiple servers located at the same location are used to feed one or more service groups. In yet another variant, multiple servers disposed at different location are used to feed one or more service groups.

"Switched" Networks—

FIG. 1c illustrates an exemplary "switched" network architecture also useful with the premises gateway apparatus and features of the present invention. While a so-called "broadcast switched architecture" or BSA network is illustrated in this exemplary embodiment, it will be recognized that the present invention is in no way limited to such architectures.

Switching architectures allow improved efficiency of bandwidth use for ordinary digital broadcast programs. Ideally, the subscriber is unaware of any difference between programs delivered using a switched network and ordinary streaming broadcast delivery.

FIG. 1c shows the implementation details of one exemplary embodiment of this broadcast switched network architecture. Specifically, the headend 150 contains switched broadcast control and media path functions 190, 192; these element cooperating to control and feed, respectively, downstream or edge switching devices 194 at the hub site which are used to selectively switch broadcast streams to various service groups. A BSA server 196 is also disposed at the hub site, and implements functions related to switching and bandwidth conservation (in conjunction with a management entity 198 disposed at the headend). An optical transport ring 197 is utilized to distribute the dense wave-division multiplexed (DWDM) optical signals to each hub in an efficient fashion.

Co-owned and co-pending U.S. patent application Ser. No. 09/956,688 filed Sep. 20, 2001 and entitled "Technique for Effectively Providing Program Material in a Cable Television System", incorporated herein by reference in its entirety, describes one exemplary broadcast switched digital architecture useful with the present invention, although it will be recognized by those of ordinary skill that other approaches and architectures may be substituted.

In addition to "broadcast" content (e.g., video programming), the systems of FIGS. 1a and 1c (and FIG. 1d, described below) also deliver Internet data services using the Internet protocol (IP), although other protocols and transport mechanisms of the type well known in the digital communication art may be substituted. One exemplary delivery paradigm comprises delivering MPEG-based video content, with the video transported to user PCs (or IP-based STBs) over the aforementioned DOCSIS channels comprising MPEG (or other video codec such as H.264 or AVC) over IP over MPEG. That is, the higher layer MPEG- or other encoded content is encapsulated using an IP protocol, which then utilizes an MPEG packetization of the type well known in the art for delivery over the RF channels. In this fashion, a parallel delivery mode to the normal broadcast delivery exists; i.e., delivery of video content both over traditional downstream QAMs to the tuner of the user's STB or other receiver device for viewing on the television, and also as packetized IP data over the DOCSIS QAMs to the user's PC or other IP-enabled device via the user's cable modem.

Referring again to FIG. 1e, the IP packets associated with Internet services are received by edge switch 194, and forwarded to the cable modem termination system (CMTS) 199. The CMTS examines the packets, and forwards packets intended for the local network to the edge switch 194. Other packets are discarded or routed to another component.

The edge switch 194 forwards the packets receive from the CMTS 199 to the QAM modulator 189, which transmits the packets on one or more physical (QAM-modulated RF) channels to the CPE. The IP packets are typically transmitted on RF channels that are different that the RF channels used for the broadcast video and audio programming, although this is not a requirement. The CPE 106 are each configured to monitor the particular assigned RF channel (such as via a port or socket ID/address, or other such mechanism) for IP packets intended for the subscriber premises/address that they serve.

"Packetized" Networks—

Figure 1D:
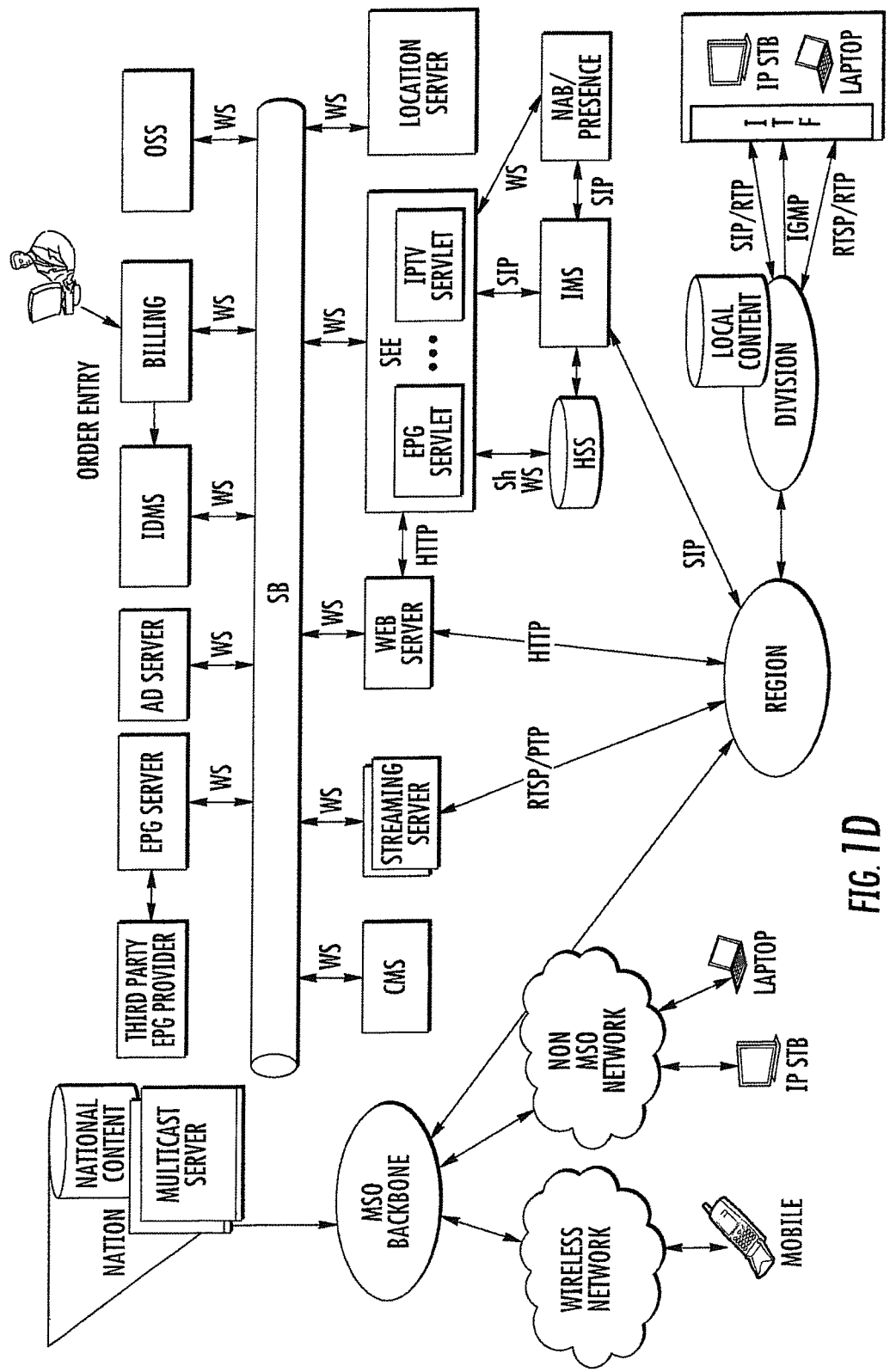
FIG. 1d is a functional block diagram illustrating one exemplary packetized content delivery network architecture useful with the present invention.

While the foregoing network architectures described herein can (and in fact do) carry packetized content (e.g., IP over MPEG for high-speed data or Internet TV, MPEG2 packet content over QAM for MPTS, etc.), they are often not optimized for such delivery. Hence, in accordance with another embodiment of the present invention, a "packet optimized" delivery network is used for carriage of the packet content (e.g., IPTV content). FIG. 1d illustrates one exemplary implementation of such a network, in the context of a 3GPP IMS (IP Multimedia Subsystem) network with common control plane and service delivery platform (SDP), as described in U.S. provisional patent application Ser. No. 61/256,903 entitled "METHODS AND APPARATUS FOR PACKETIZED CONTENT DELIVERY OVER A CONTENT DELIVERY NETWORK, previously incorporated herein. Such a network provides significant enhancements in terms of, inter alia, common control of different services, implementation and management of content delivery sessions according to unicast or multicast models, etc.; however, it is appreciated that the various features of the present invention are in no way limited to any of the foregoing architectures.

I. Audience Measurement and Analysis System—

Referring now to FIG. 2, one embodiment of an architecture for the collection and analysis of data according to the present invention is shown. As illustrated, data is collected from various headend data sources 201 and transmitted to a data collection system 200. Data may also be collected from user CPE 106 via the network 101. Collected data is processed at the system 200. As shown, usage detail records are collected, processed and used to generate files for delivery to a subscriber data analysis (SDA) system 203 for analysis. In one embodiment, the collection system 200 includes and is based on an Openet FusionWorks system as disclosed in Openet "*Fusion Works SDL Technical Reference* © 2008, version 2.0," which is incorporated herein by reference in its entirety, although it will be appreciated that other types of systems and implementations may be used with equal success, and the use of the Fusion Works system is but one possible implementation choice.

Figure 2A:
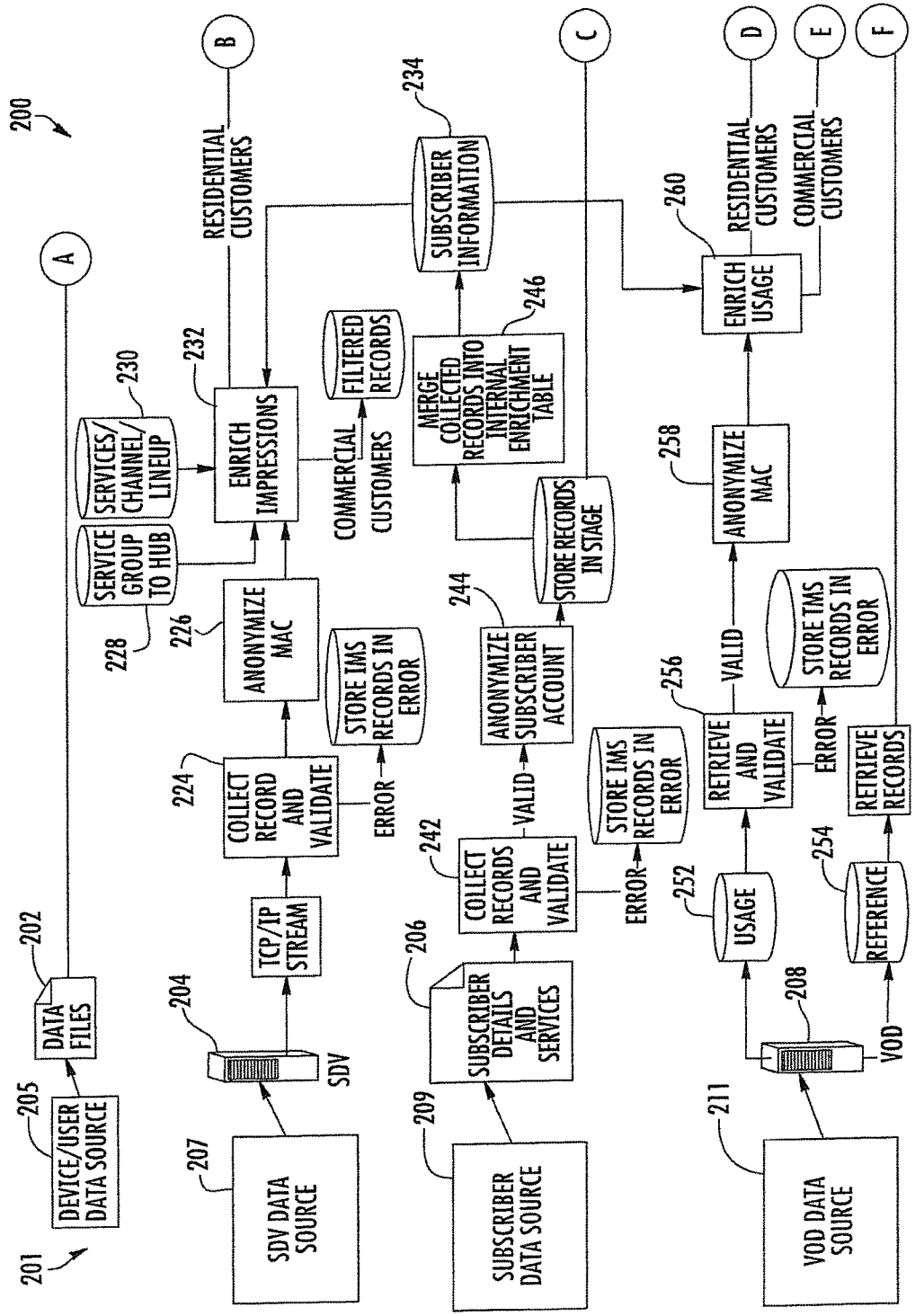
FIG. 2a is block diagram detailing the components of the data collection system of FIG. 2.
Figure 2A:
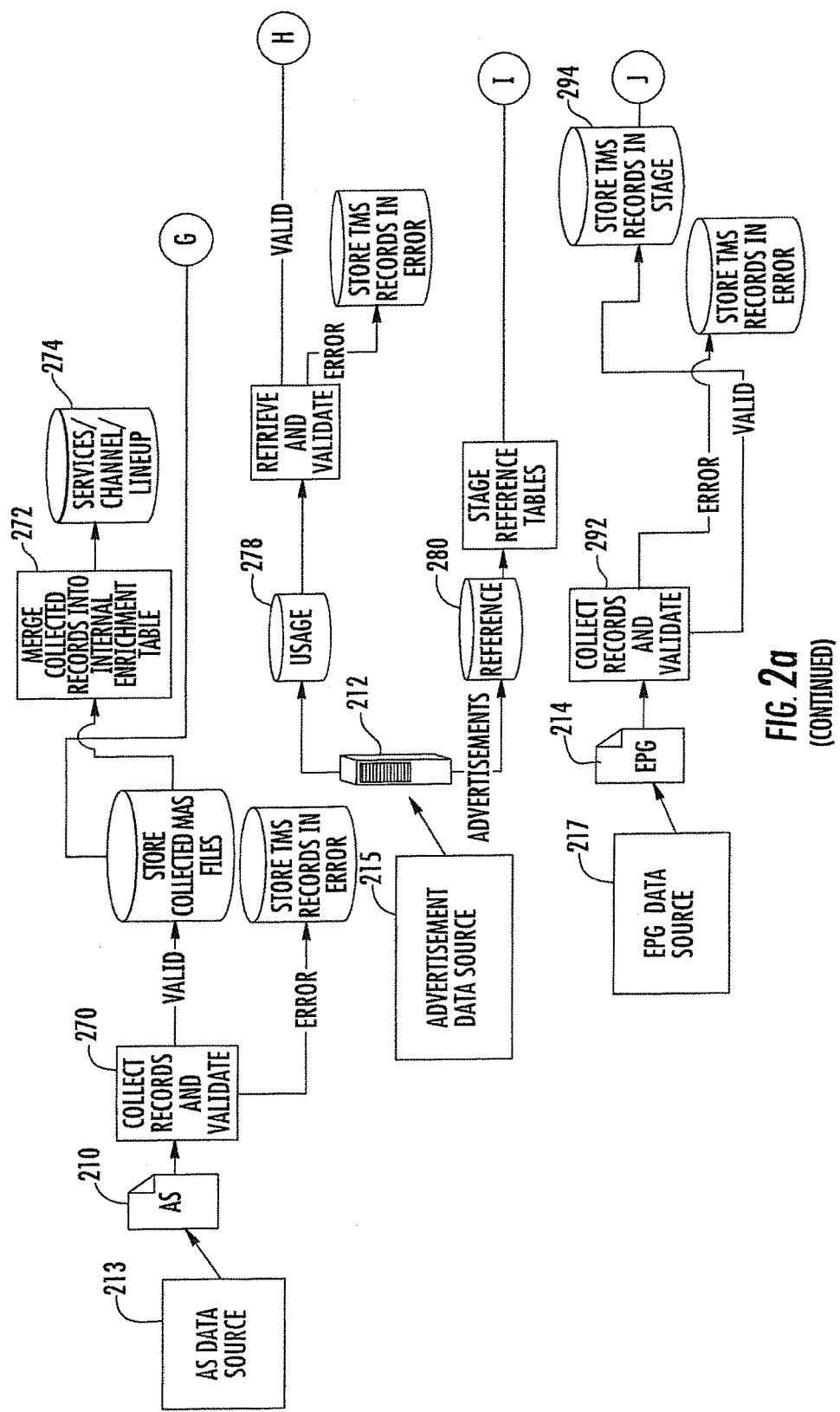
Figure 2A:
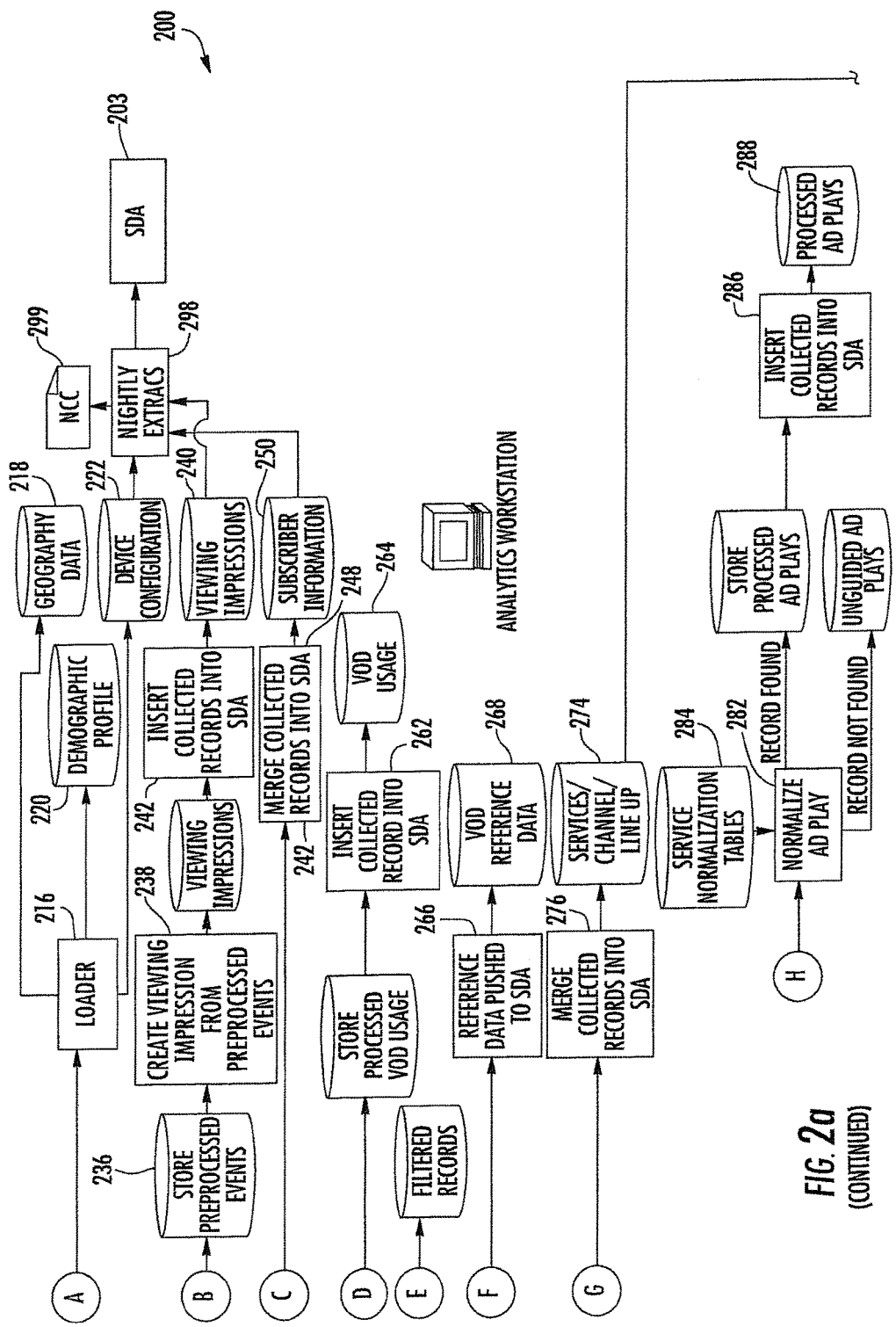
Figure 2A:
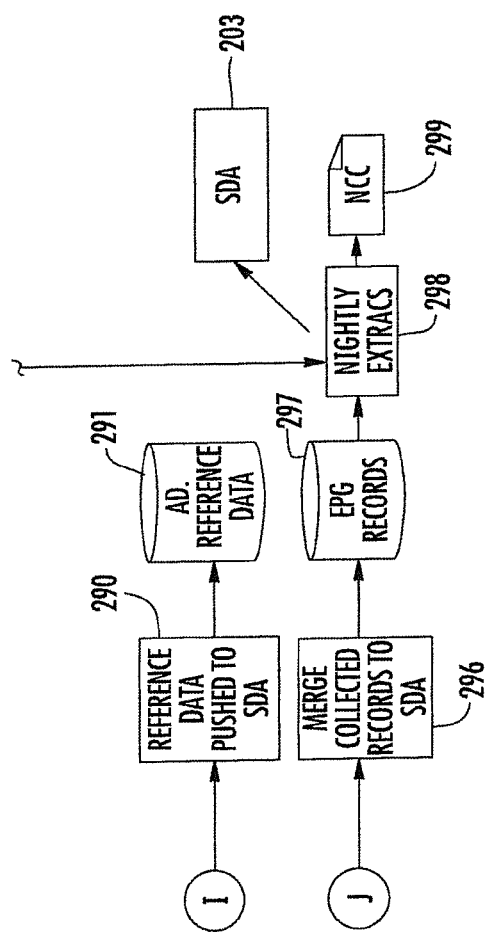

FIG. 2a is a detailed illustration of the various entities of the data collection system 200. As shown, information is collected from a plurality of data sources 201, such as inter alia, a device/user data source 205, a broadcast switched or switched digital video (SDV) data source 207, a subscriber data source 209, a video on-demand (VOD) data source 211, an application server (AS) data source 213, an advertisement data source 215, and an electronic program guide (EPG) data source 217. Data is collected by various data collector entities, such as inter alia, a data file collector 202, an SDV data collector 204, a subscriber details and services data collector 206, a VOD data collector 208, an AS data collector 210, an advertisement data collector 212, and an EPG data collector 214. It is appreciated that while only one of each of the above data collectors is illustrated, data may be collected from any number and/or types of data sources by any number and/or type of data collectors in accordance with the present invention. Moreover, collection functions can be combined or integrated, or divided across two or more complementary platforms.

Moreover, while certain embodiments are described primarily described in terms of switched digital video (SDV) delivery paradigm, other delivery paradigms may be supported, such as e.g., IP-based delivery (whether unicast or multicast), the description of SDV being merely for purposes of illustration.

Data files collected from the data file sources) 205 by the data file collector 202 are directly loaded via a loader 216 to one or more databases. The loader 216 generally comprises bulk loader utility used for moving data from external files into one or more databases. In one embodiment, the loader 216 may comprise an SQL*Loader® of the type manufactured by Oracle® Corporation, although other implementations may be readily appreciated by those of ordinary skill given the present disclosure. As illustrated, the collected data is loaded (via the loader 216) to at least one of three databases: (i) a geography database 218, (ii) a demographic profile database 220, and (iii) a device configuration database 222. It is appreciated that additional databases for the storage of data from the data file collector 202 may be provided, and/or the foregoing databases may be combined or integrated if desired.

Data regarding device and/or user geographic location is stored at the geography database 218. Data regarding user demographics/psychographics is stored at the demographic profile database 220. Data regarding device configurations is stored at the device configuration database 222.

Tuning event information and tuning event types information is collected at the SDV collection entity 204 for eventual storage at e.g., the viewing impressions database 240. Tuning event data from the SDV servers 204 is in the illustrated embodiment collected in real time. The collected tuning event data is encoded in plain text. In the illustrated embodiment, data is collected via a transmission control protocol (TCP) port as a TCP/IP stream. In one implementation, the collector comprises a Cisco™ SDV Collector, software version 1.5, as discussed in Cisco Data Sheet entitled "SDV Collector" dated December 2008, and incorporated herein by reference in its entirety. Exemplary parameters defined specifically for the collection of SDV data are illustrated in Appendix A of U.S. Provisional Patent Application Ser. No. 61/260,346 of the same title filed on Nov. 11, 2009, previously incorporated herein by reference in its entirety.

As noted above, the direct connection protocol is through a TCP/IP link. In one embodiment, there are 5 server ports open per usage type, 15 in total per SDV. There is also a UDP multicast port available as well. SDV servers 204 deliver records in the exemplary embodiment Log 2 Format as described below. Data is compressed through the TCP/IP stream.

In another embodiment, 8 instances of the collector are given per cluster, 1 division to collect in total—7 are active, and 1 stand by. The instances naming convention is as follows:

<div>_SDV<type>_<method>_<###.###.###.###>

Here, <div> represents the division code, _SDV_ represents the identity of the collector apparatus as a SDV collector. The symbol <type> refers to the type of collector in this instance a tuning events collector (TUN). The symbol <method> gives the method of collection, for example, TCP. Finally, <##.###.###.###> represents the IP address of the apparatus. A sample instance name is "B23_SDV_TUN_TCP_10.1.1.1".

Since data is collected in real time, a file naming conversion is not applicable. Further, a file name duplicate check is not necessary in this embodiment, as for real time feeds there is no file name duplication. Also, a sequence number validation is not necessary.

Data collected from the SDV data source(s) 207 is validated at e.g. the validation entity 224. The MAC address of the validated data is then anonymized at the anonymizer 226. In one embodiment, the MAC address may be anonymized by inter cilia, the use of a cryptographic hash. In one embodiment, the techniques for providing anonymity utilizing a cryptographic hash described in U.S. patent application Ser. No. 11/186,452 filed Jul. 20, 2005 and entitled "Method and Apparatus for Boundary-Based Network Operation", which is incorporated herein by reference in its entirety, may be utilized in conjunction with the present invention. As disclosed therein, the identity of a CPE is anonymized by using a cryptographic hash coupled with an optional "opaque" variable which carries information relating to the CPE of the hash with which it is associated. The hash and opaque variable frustrate de-encryption or reverse-engineering of the individual subscriber's identity or specific location. Alternative methods of providing anonymization may also be utilized consistent with the present invention, including e.g., the anonymization methods discussed herein below.

The enrichment entity 232 is used to enrich the data. Data is enriched with anonymous subscriber data (from the subscriber information store 234) to add non-identifiable customer information. The enrichment entity 232 further adds channel identification, service and/or lineup information from the services/channel lineup tables 230 and the service group to hub data store 228. In one embodiment, the services/channel lineup tables 230 comprise internal tables of the application server 213 (discussed in greater detail below).

Pre-processed data may be stored at the pre-processed data storage entity 236. At the viewing impression converter 238, data is converted into viewing impressions. The processed records are inserted, via the insertion entity 242, into SDV usage tables in a subscriber data analysis (SDA) system 203, for analysis. Viewing impressions are stored at the viewing impression storage entity 240. In one embodiment, conversion of data into viewing impression involves the correlation of tune in and tune out events into a single tuning impression record that consists of the program viewed, start/end date/time of the viewing event, tuning event type, tune out type, and anonymized customer/CPE GUIDs.

The SDA 203 generally comprises a database for audience measurement analytics. In one embodiment, the SDA 203 may comprise an Oracle schema, although other implementations may be used with equal success. Several reference tables are loaded directly into SDA 203, including inter glia, geography information, device configuration, EPG reference data, and tuning reference data (each of which will be discussed below). In one embodiment, the aforementioned Oracle SQL*Loader product may be used for loading the SDA 203 database. All collected and processed records that are stored in the SDA 203 database are available for reporting through the analytics engine.

Subscriber details and subscriber billing records may be collected at the subscriber details and services data collector 206. The data is collected from one or more SDV data sources 207, parsed, and verified at the validation entity 224. Subscriber information is pushed to the system 200, where a local "collect" is performed. Local collection rules use a standard collection library. Collections are preformed at regular, configurable intervals; however, files are delivered at least once a day in the illustrated embodiment (this period being selectable). A "Start_collect" event script for the collector instance is provided to start a collection at every configured period. These scripts can also be invoked manually from the GUI. In addition, a "Stop_collect" script is provided for each collector instance. This can be executed to halt the collection process if needed.

An anonymizer 244 is utilized for the anonymization of the subscriber information. In one embodiment, as discussed above, a cryptographic hash may be used for anonymization as discussed in previously incorporated U.S. patent application Ser. No. 11/186. As noted above, subscriber information may be passed to the enrichment entity 232 via a first merging entity 246. Subscriber records are also merged by a second merging entity 248 into SDA 203 while keeping an internal copy for processing. Subscriber data is stored at the subscriber information storage entity 250.

In one embodiment, the subscriber details and services data is collected from a Convergys™ Integrated Communications Operations Management System (ICOMS) server. According to this embodiment, subscriber data is collected with the use of a QBatch collector and COGNOS™ data modeling/analysis. The QBatch collector is configured for the efficient processing of files regardless of the location of those files. The QBatch collector is configured to retrieve the subscriber files and may use parameters such as those listed in the table of Appendix B of the previously incorporated U.S. Provisional Patent Application Ser. No. 61/260,346.

In another embodiment, there is one (1) instance of the SDV collector entity 206. The collector 206 instance is named using the following naming convention is as follows:

SUB_DETAIL_<div>, SUB_SERVICES_<div>

In the given naming convention, the <div> symbol represents the division code. A sample instance name is "SUB_AC_411".

The file naming convention for reference data files is as follows:

<Div_D>_<ref_type>_YYYYMMDD.TXT

The <Div_ID> symbol of the given naming convention is the division identifier code. The <ref type> can be either "VIDEO_SUB" or "VIDEO_SERVICES". The YYMMDD represents the date (year, month day). Lastly, ".TXT" is the file extension. The following is an example of a COGNOS data filename: B411_VIDEO_SUB_20090211. TXT.

If the filename being collected has already been collected (within e.g., a user-configurable period of time), the file is considered a duplicate, and an error message is generated. The file is then stored to a duplicate file directory and processing continues with the next file. The period of time for duplicate check is a configurable parameter. In one embodiment, for the initial configuration of the system 200 is configured to maintain the list for 5 days. In one embodiment, in order to enable filename duplicate checking, the parameters of Appendix C of the previously incorporated U.S. Provisional Patent Application Ser. No. 61/260,346 may be implemented.

There is no sequence number in the exemplary file structure; therefore, there is no need to validate the sequence number.

The collector 206 collects data from each billing system that the MSO uses. The collector also collects and stores household packages information, CPE/STB household information, and household information, Video on-demand (VOD) data collected at the VOD server platform 208 is also monitored. In one embodiment, the VOD data collector platform 208 comprises an Everstream® Video on-Demand Collector (software version 2.8.0). The data collector 208 utilizes data manipulation software to prepare the data for use within the system 200. The manipulation software is an Oracle Instance, in one specific embodiment. A scheduled task may, in one embodiment, be configured to retrieve a data record using the exemplary parameters listed in the table of Appendix D of the previously incorporated U.S. Provisional Patent Application Ser. No. 61/260,346.

In another embodiment, one instance of the database schema used to deliver VOD server usage data is provided; the VOD server 208 delivers usage data through a database connection. Since a single instance is used, there is no need to define a VOD collector 208 instance naming conversion. Furthermore, a file naming convention, a file name duplicate check and sequence number validation are not utilized for VOD data collection in this embodiment.

Data retrieved from the VOD collector 208 is compressed, and is delivered at a specified periodicity (or based on the occurrence of events), such at least once a day. A default data format may be used for the input of VOD data. In one embodiment, the default data format comprises an Oracle format based on the SQL*NET® protocol, although other approaches may be used with equal success.

VOD data includes in one variant both usage data 252 and reference tables 254. Records from the usage table 252 are retrieved and validated at the validation entity 256. The MAC address of the subscriber devices associated with the collected data is anonymized as discussed above, via an anonymization entity 258. Data is enriched with other nonidentifiable subscriber data (such as that collected above with respect to the subscriber details and services data collector 206). The processed records are inserted, via an insertion entity 262, in the SDA 203 for analysis. VOD usage data is stored at a VOD usage database 264.

The reference tables 254 are pushed directly to the SDA 203, via a data merging entity 266, through DB Links and replicated in the SDA instance 203. VOD reference data is stored at a VOD reference database 268. In one embodiment, most of the reference table 254 data is merely merged to the SDA 203 via a merging entity 270, and is not processed. However, VOD_LEASE and EQUIPMENT tables may require processing. For example, the EQUIPMENT table may require anonymization of have a MAC address (MAC_ADDRESS field) and the VOD_LEASE table may require removal of account specific information (such as e.g., an ACCOUNT_SID field).

Records provided by the VOD collector 208 are managed as they are delivered. Management includes archiving, as well as the collection and storage of VOD asset information, VOD asset metadata, VOD event information, trick play information, and VOD trick type information.

Data collected by the application server (AS) database collector 210 is collected through the use of files. The collector 210 is configured to retrieve records from the AS data source 213. In one example, the AS data source 213 retrieves these records using the parameters listed in the table shown in Appendix E of previously incorporated U.S. Provisional Patent Application Ser. No. 61/260,346. The files based collection protocol is FTP over TCP/IP in the illustrated embodiment, although other protocols/transports may be used. These files are not compressed. Collection is performed at regular configurable intervals; but files are delivered at the specified times (e.g., once a day). Files that come from the AS database 210 are read, parsed and validated by a validation entity 270.

In one embodiment, the application server data source 213 comprises the application server discussed in co-owned, co-pending U.S. patent application Ser. No. 11/263,015 filed Oct. 2, 2002 and entitled "Network based digital information and entertainment storage and delivery system", now published as U.S. Patent Application Publication No. 2003/0208767, which claims priority under 35 U.S.C. 119(e) the benefit of U.S. Provisional Application No. 60/377,963 filed on May 3, 2002, each of the foregoing incorporated herein by reference in its entirety. In one variant, the AS 213 is a Mystro™ server device of the type utilized by the Assignee hereof, although it will be appreciated that other configurations may be utilized with equal success.

In another embodiment, there are sixteen (16) instances of the AS collector 210. The instances naming convention is as follows:

<div>_MAS_<type>_<##>

The <div> symbol represents the division code, and the _MAS_ symbol illustrates that the data is obtained from a Mystro Application server 213. In the given naming convention, the <type> symbol represents the file type being managed by the collector 210 (for example, the file type may be a SERVICE file, a PROGRAM file, or a CHANNEL file, etc.) Lastly, the <##> symbol is the two-digit identifier. A sample instance name is "B23_MAS_SERVICE_01".

The file naming convention on the remote host is as follows:

<fileid>.txt.gz

In the given example, the <fileid> symbol is a field identifier which identifies the channels, services or lineups (in lower case). The .txt.gz. portion identifies the data file in text compressed using gzip. The following are examples of data filenames: services.txt.gz, channel.txt.gz.

As will be discussed below, files are collected by the system 200 at a desired frequency or periodicity (e.g., nightly), and transmitted to an SDA. The nightly files contain a data extract from the services, lineup and channel tables.

In the present embodiment, there is no requirement for a filename duplicate check because the files each have fixed names. Old files are tagged as part of collection and archived. There is no sequence number in the file, therefore, there is no need to validate the sequence number.

If the filename being collected has already been collected within a given period of time, then the file is considered a duplicate. In case of duplicate file, an error message is generated and the file is stored to a duplicate file directory and processing continues with the next file. The period of time for duplicate check is a configurable parameter within the system. In one example, such as for an initial configuration the system may be configured to maintain the list for 5 days. In one variant, in order to enable filename duplicate checking, the parameters of Appendix F of previously incorporated U.S. Provisional Patent Application Ser. No. 61/260,346 may be used. Data collected by the AS 210 is either merged with internal enrichment table information at a merging entity 272, or merged to the SDA 203 via an SDA merging entity 276. The merged data (via either merging entity 272, 276) is then used to populate a services table, a channel table and/or a line-up table (collectively referred to as service/channel/line-up tables 274). The service/channel/line-up tables 274 are used for correlating the SDV source indicator to a channel and disclose the available channel lineup and offerings in a division or region.

The AS data collector 210 collects and stores channel map information, lineup information, service information, and service types information.

Advertisement insertion data may be collected at the advertisement servers 212 as well. Data is delivered to the system 200 through a database connection to an advertisement data source 215. The data is collected for example at least once a day, and is not compressed. Collected advertisement data may be delivered through the aforementioned Oracle SQL*NET protocol, or another suitable protocol as desired.

In one embodiment, the advertisement servers 212 comprise an OpenTV® Eclipse™ product (software version 4.0.1). A scheduled task is configured to retrieve data records using, for example, the parameters listed in the table of Appendix G of previously incorporated U.S. Provisional Patent Application Ser. No. 61/260,346. Advertisement insertion data includes usage tables 278 and reference tables 280. At the normalization advertisement play entity 282, records from the usage tables 278 are enriched with service information that is obtained from the service normalization table 284. Collected records are then merged, via merging entity 286 into the SDA 203 and stored at the processed advertisement plays database 288. The reference tables 280 are pushed directly to the SDA 203 through DB Links via a merging entity 290, and are replicated in the SDA instance 203; no processing of the reference tables 280 is required other than merging the data. Advertisement reference data is then stored at an advertisement reference database 291.

In another embodiment, there is one (1) instance of the advertisement data being delivered. A collector naming convention is not necessary for scheduled tasks. Furthermore, file naming conventions, file name duplicate checks and sequence number validations are not necessary for advertisement data collection under this embodiment.

In one implementation, an operator-created reference table (not shown) may be utilized for obtaining service information from advertisement events that are delivered by the advertisement server 212, and another reference table (not shown) for matching service groups to hubs in order to obtain channel information.

The advertisement server 212 collects and stores inter alia, local advertisements, advertiser information, information regarding advertiser type, agency information, advertisement spot play, and advertisement status code information.

Electronic programming guide (EPG) data collectors 214 provide television programming and schedule information. Data from the EPG data collector 114 is collected from an EPG data source 217 through the use of files. The collector 214 is configured to retrieve records using, for example, the parameters listed in the table of Appendix H of previously incorporated U.S. Provisional Patent Application Ser. No. 61/260,346. In one embodiment, the EPG data source(s) 217 comprise one or more Tribune Media Systems™ (TMS) databases. The EPG data is collected, parsed, and validated at the validation entity 292 and stored at a staging entity 294. The staged data may then be merged into the SDA instance 203 via a merging entity 296. Collected EPG data is stored at the EPG records database 297.

In another embodiment there is one instance of the data collector 214 delivery. The instances naming convention may be represented as:

<div>_TMS_<type>

The symbol <div> represents the division code. In the given example, the symbol _TMB_ refers to the Tribune Media System (TMS) implementation discussed above. The <type> symbol is used to represent the file type being managed by the collector 114 (for example, PROGRAM, or SCHEDULE, etc.) Hence, a sample instance name might be "B23_TMS_SCHEDULE".

The files based collection protocol is FTP over TCP/IP. These files are compressed using GNU zip or "gzip" compression format, which is a well known open software application, although other compression utilities may be used with equal success. The collector 214 in the present embodiment performs collections at regular configurable intervals; e.g., with files delivered once a day. The files contain 14 days of "rolling" or moving window data in one embodiment (delivered once a day).

The file naming convention on the remote host may in one embodiment be as follows:

<tabletype>.txt.gz

In this example, the <table type> symbol describes the table (such as e.g., a progrec table, skedrec table, statrec table, progrec table, etc.). The symbol ".txt.gz" indicates the compression type (e.g., gzip) and identifies the file as a data file. An exemplary data file name is: progrec.txt.gz. The term "remote hose" refers to the FTP site from which the collector (e.g., EPG data collector 214) picks up this file.

The data files are delivered as an encrypted summary file. In one embodiment, an MD5 cryptographic hash is utilized according to the standards set forth in Network Working Group standard RFC 1321 entitled "*The MD5 Message-Digest Algorithm*" and dated April 1992, which is incorporated herein by reference in its entirety. Other hashing algorithms may be used with equal success as well. The termination file indicates when a file has been written and closed. The termination file also indicates when all files are ready to be collected. The file naming convention on the remote host is as follows:

<tabletype>.txt.gz.sum

According to this embodiment, the <table type> describes the table, for example, the table may be a progrec table, a skedrec table, a statrec table, or a progrec table, etc. The txt.gz.sum identifies a data file summary with an MD5 hash. An exemplary encrypted summary file name and/or termination file name is progrec.txt.gz.

In one embodiment, the termination file is not necessary; the files are now available for pickup as posted.

As previously noted, if the filename being collected has already been collected within a configurable period of time, then the file is considered a duplicate. However, for Tribune Media Files, all files have exactly the same name; thus, these files must be renamed upon collection. In one embodiment, the Tribune Media Files are renamed by adding the collection date (and/or time) to the file name in order to create a unique file name. The period of time for duplicate check is a parameter and is configurable. See, for example, Appendix I of previously incorporated U.S. Provisional Patent Application Ser. No. 61/260,346.

Since there is no sequence number in the file, there is no need for sequence number validation.

The collected data is maintained in archive for, in one embodiment seven days, however, shorter and/or longer periods may be utilized, including e.g., a long-term storage option.

As noted above, the system 200 collects and stores inter alia program information, rating code information, program genre information, and genre information.

In one embodiment, four reports are created every night by a nightly extraction entity 298. The reports contain information regarding the number of subscribers, network, programming information and viewing events. These reports are generated based in part on data from the processed viewing impressions, AS, EPG records, and subscriber data. The reports are delivered to the National Cable Communications (NCC) entity 299 using secure FTP, although other mechanisms may be used.

Figure 2B:
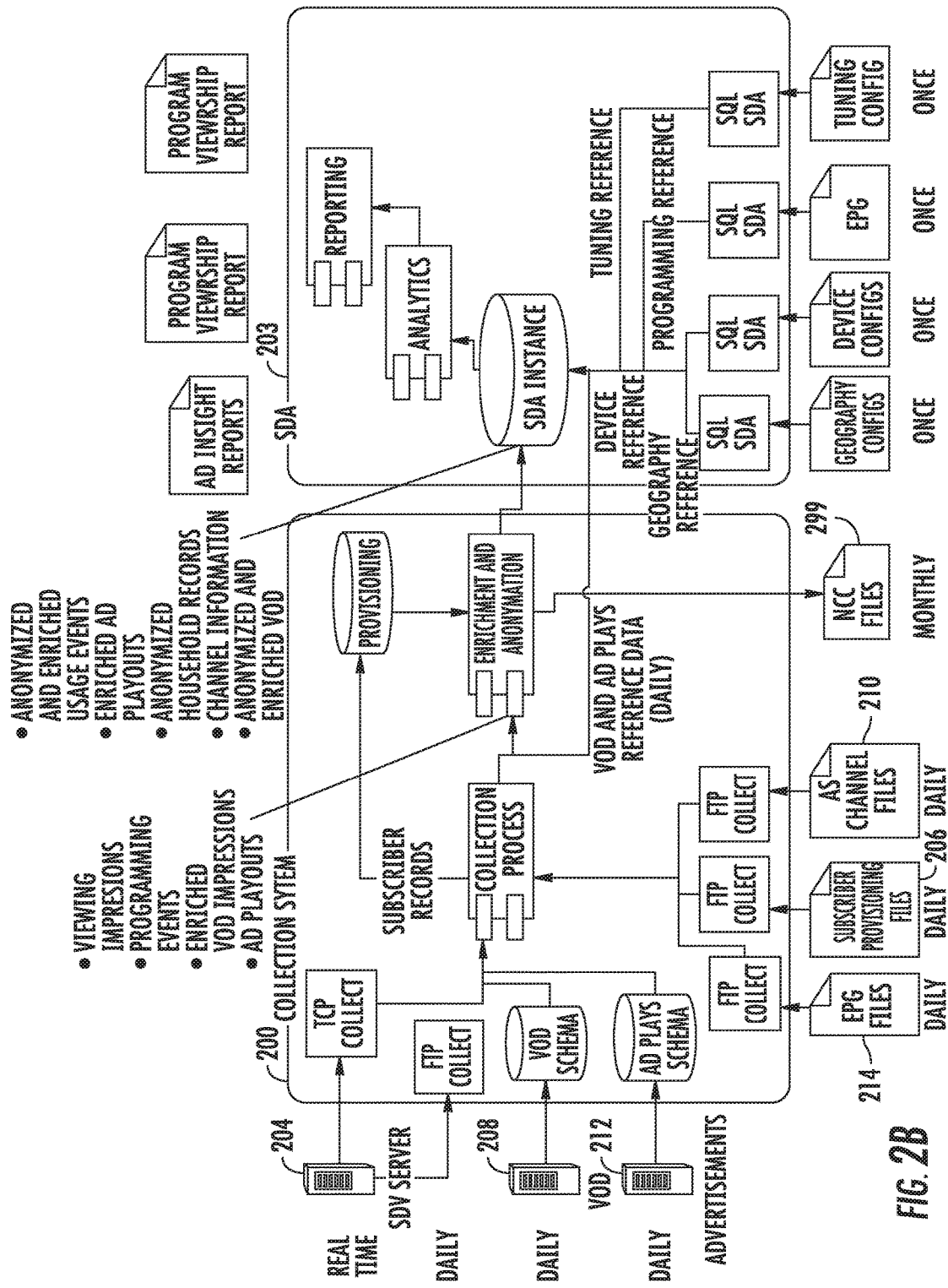
FIG. 2b is a block diagram detailing a second embodiment of the components of the data collection system of FIG. 2.

FIG. 2b illustrates another embodiment of the components of the data collection system of FIG. 2.

II. Data Acquisition/Collection Methods—
SDV Data Collection—

Figure 3:
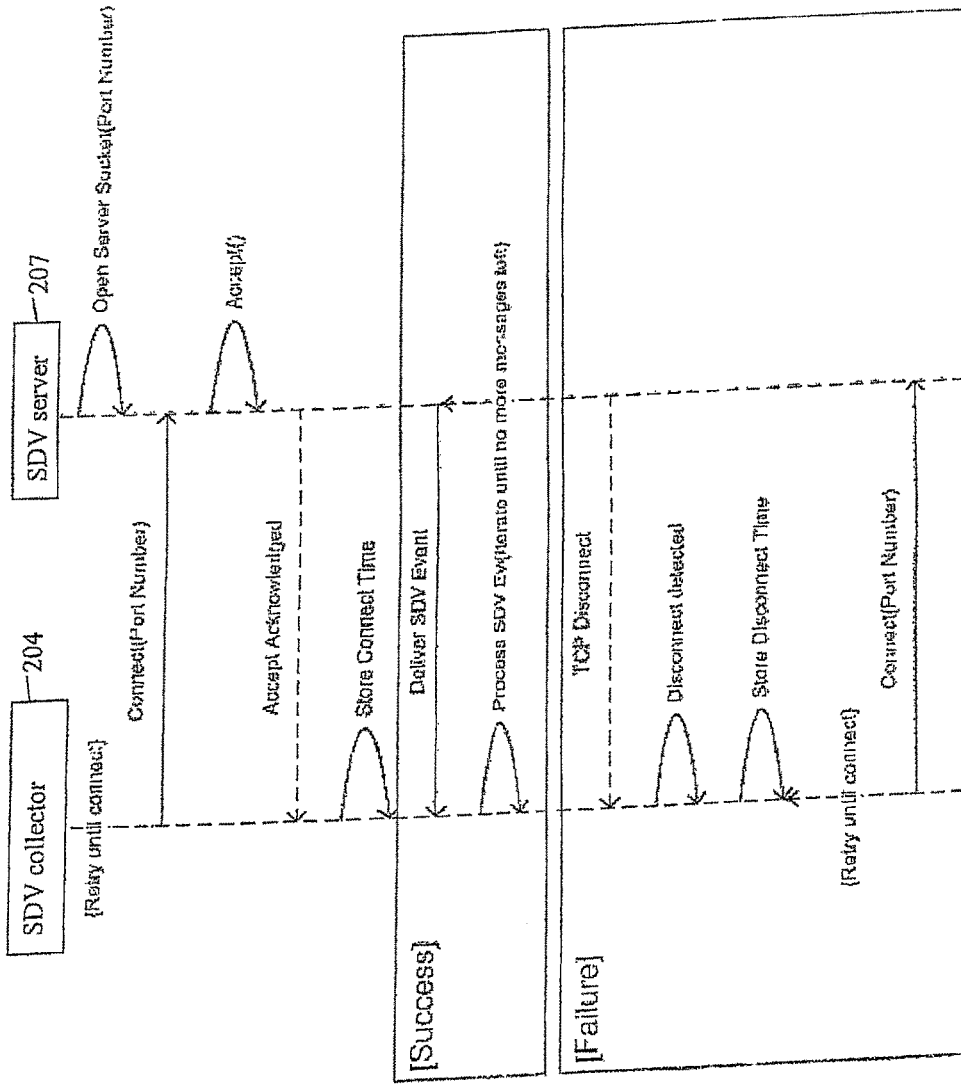
FIG. 3 is a logical flow diagram illustrating a method for the collection of SDV data.

FIG. 3 illustrates one embodiment of a protocol or message exchange between the SDV collector and SDV server for the collection of SDV data according to the invention.

Subscriber Data Collection—

Figure 4:
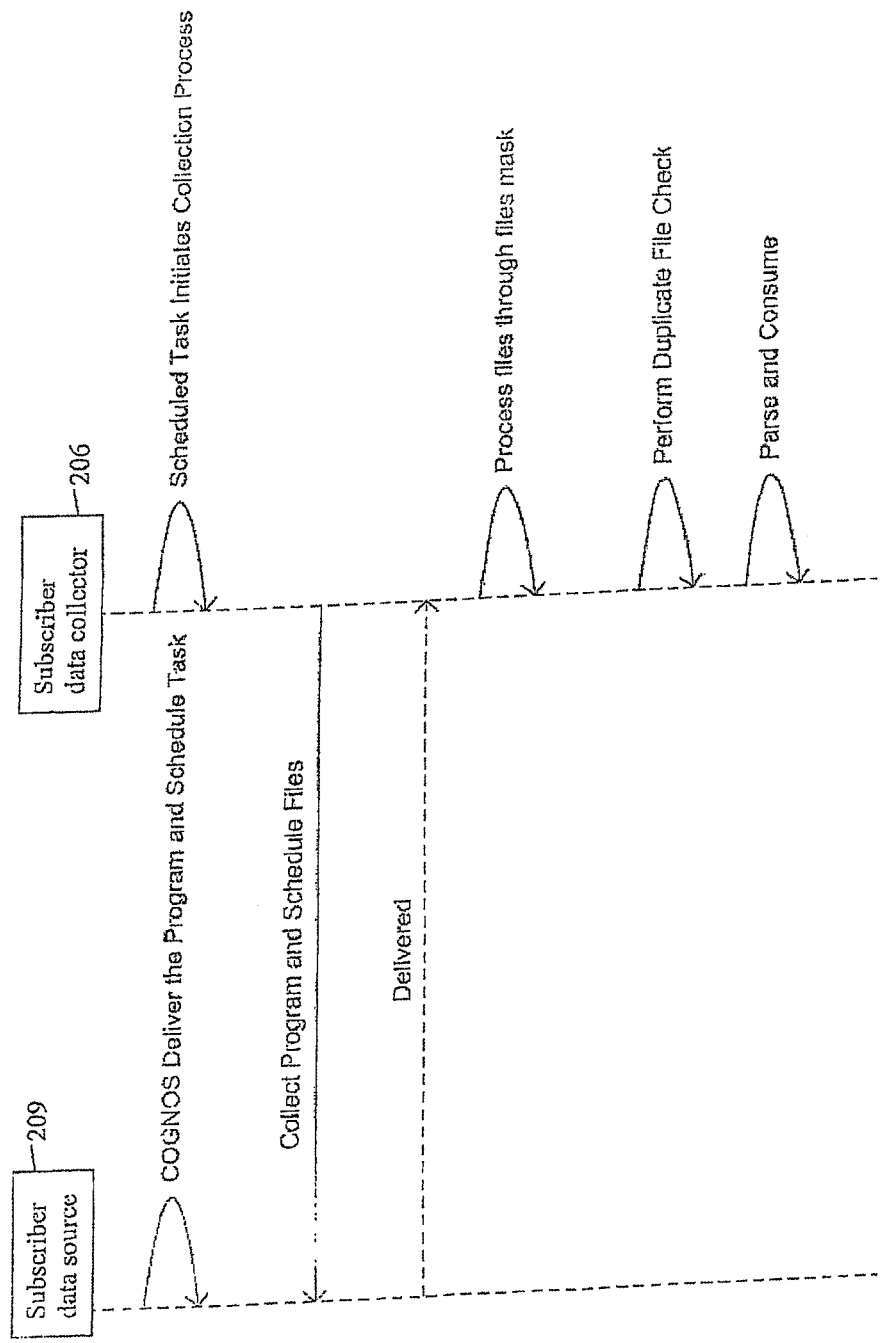
FIG. 4 is a logical flow diagram illustrating a method for collecting subscriber data.

FIG. 4 illustrates one embodiment of a message exchange between a subscriber data server and collector, for collecting subscriber data.

VOD Data Collection—

Figure 5:
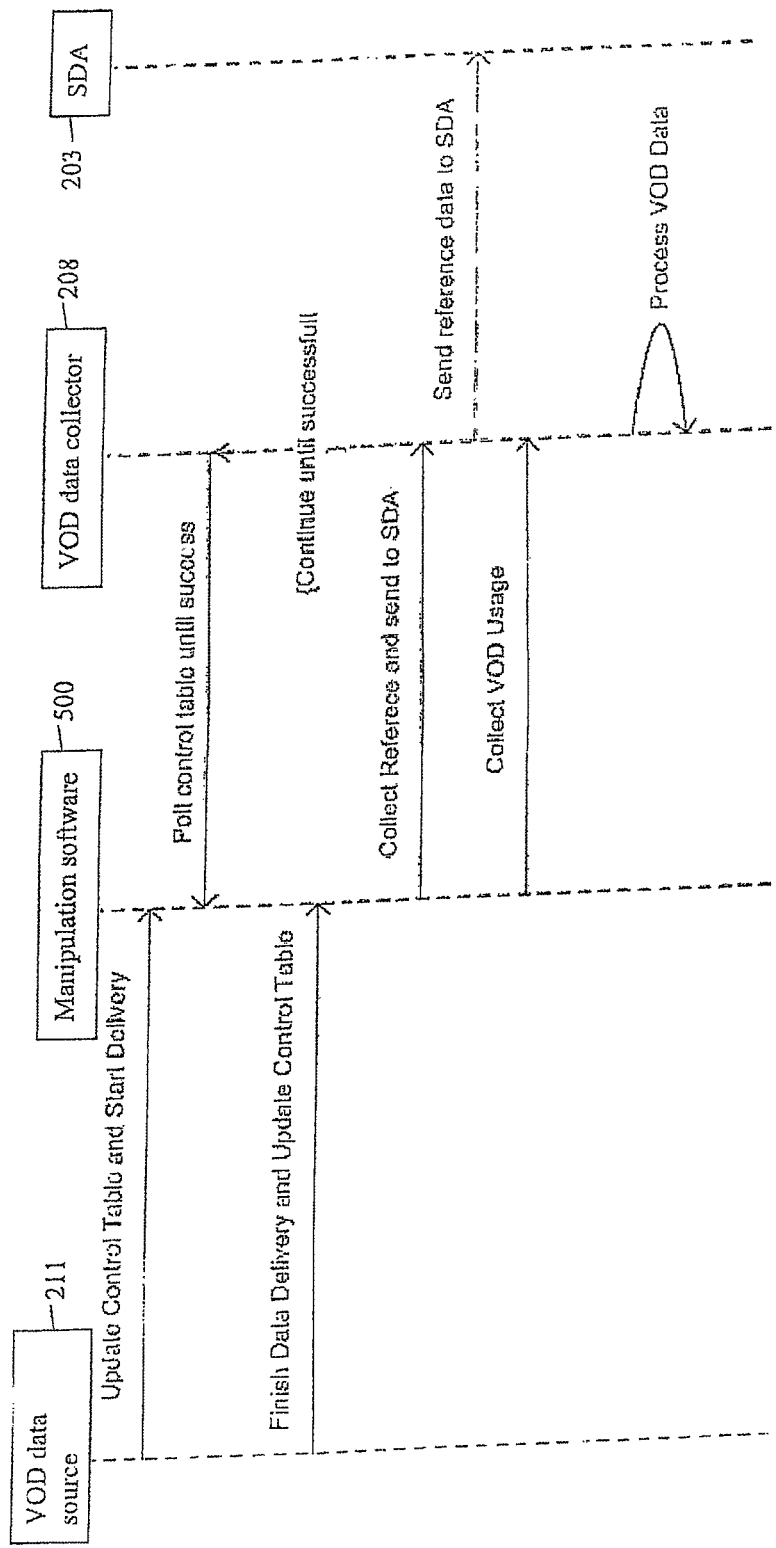
FIG. 5 is a logical flow diagram illustrating a method for the collection of VOD data.

FIG. 5 illustrates one embodiment of a message exchange between various entities for the collection of VOD data.

AS Data Collection—

Figure 6:
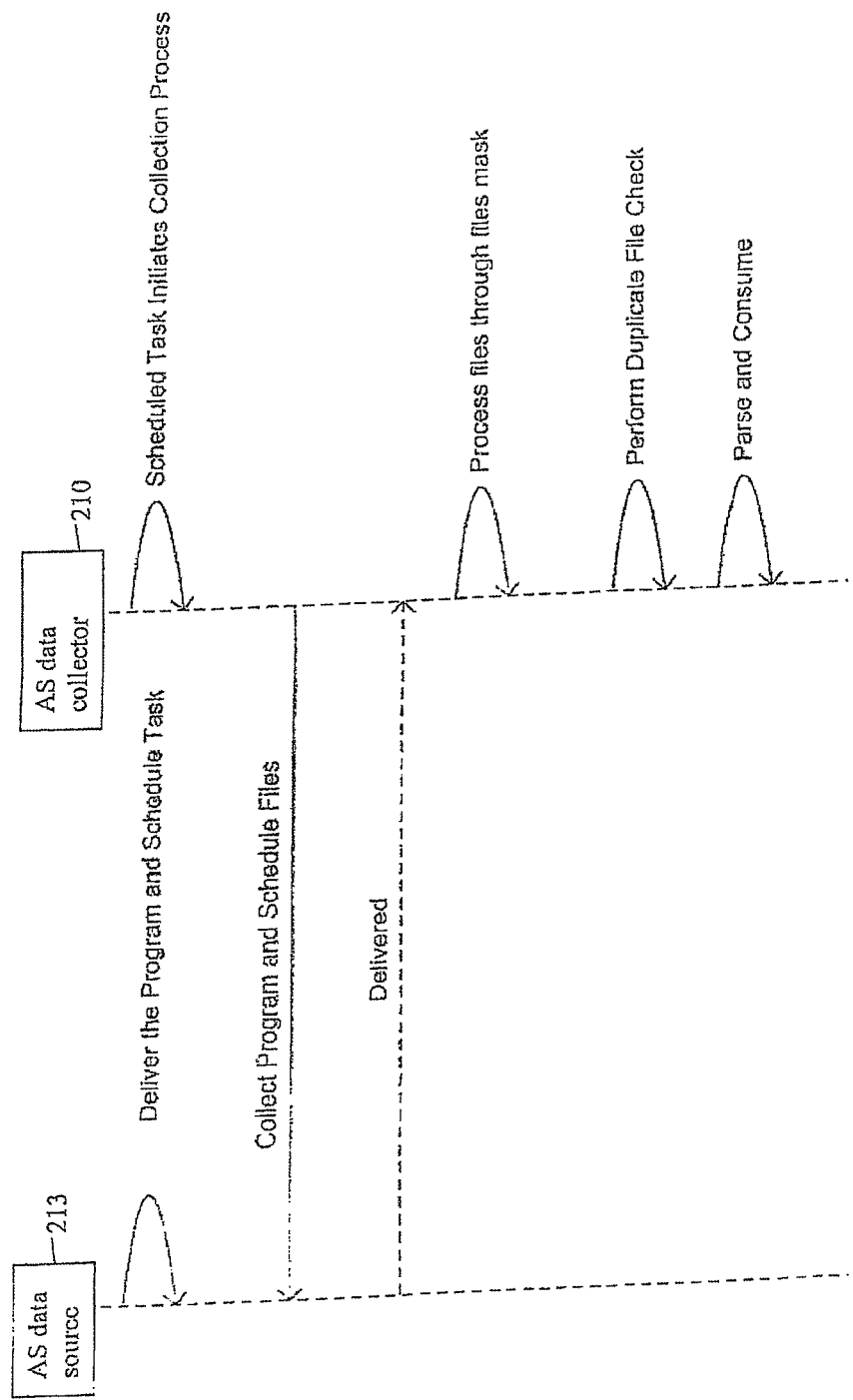
FIG. 6 is a logical flow diagram illustrating a method for AS data collection.

FIG. 6 illustrates one embodiment of a message exchange between various entities for the collection of VOD data.

Advertisement Data Collection—

Figure 7:
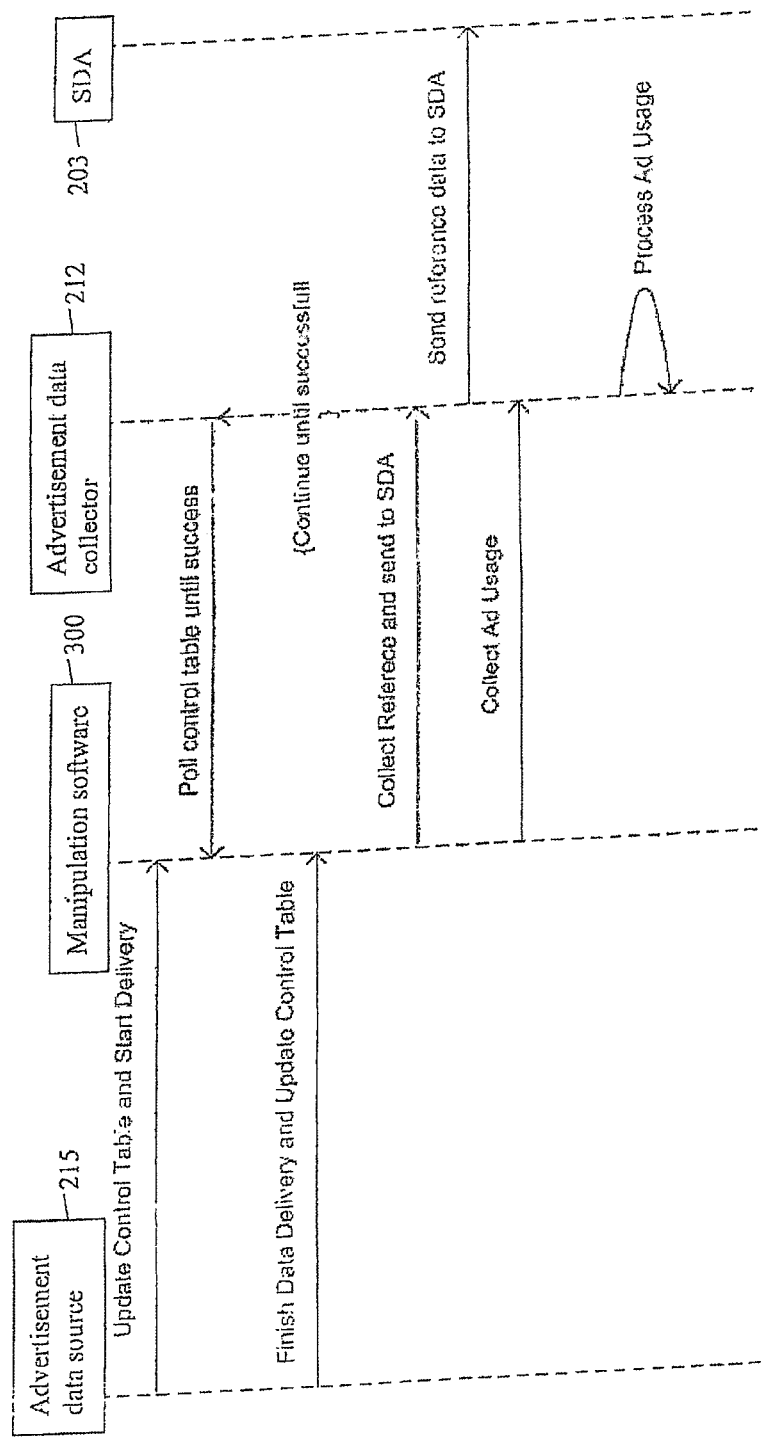
FIG. 7 is a logical flow diagram illustrating a method for advertisement data collection.

FIG. 7 illustrates one embodiment of a message exchange between various entities for the collection of advertisement data.

EPG Data Collection—

Figure 8:
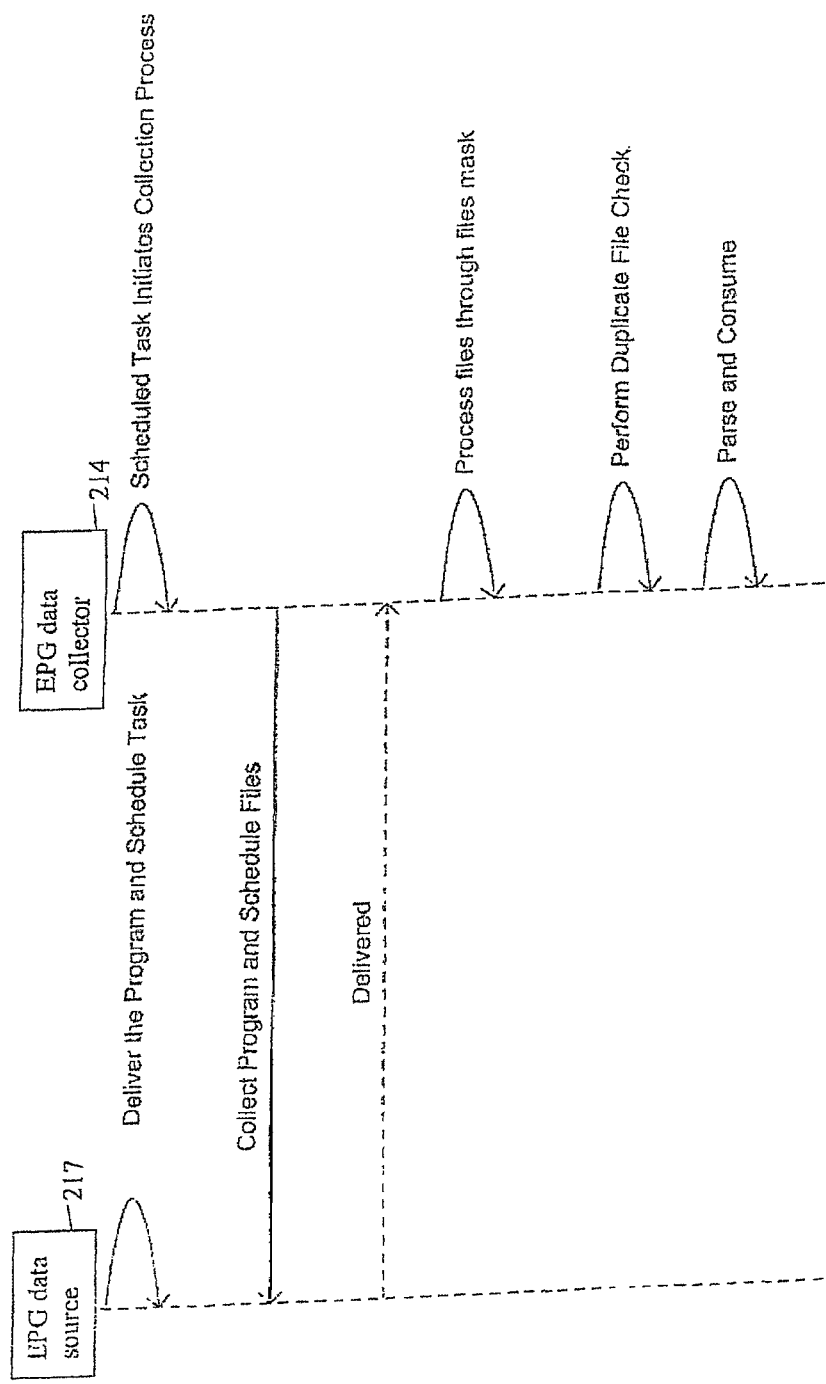
FIG. 8 is a logical flow diagram illustrating a method for EPG data collection.

FIG. 8 illustrates one embodiment of a message exchange between various entities for the collection of EPG data.

III. Parsing—

Parsing in the present context refers to, without limitation, the activity to decompose each record in its individual fields. During this process, the system 100 dissects each record, and proceeds to manage the decomposed records and their components according to their file format and semantics. Since the usage data is being delivered through direct database connections, parsing is not required, and is not discussed herein with respect to usage data.

SDV Data Parsing—

In one embodiment, the SDV parsing parameters are described in Openet *Fusion Works SDL Technical Reference* © 2008, version 2.0, previously incorporated herein. The table of Appendix J of previously incorporated U.S. Provisional Patent Application Ser. No. 61/260,346 shows exemplary parameters which are defined specifically for SDV collectors.

As noted above, one embodiment of the SDV data collector 104 comprises a Cisco SDV Collector, as discussed in Cisco Data Sheet entitled "SDV Collector" previously incorporated herein. The input data format consists of LOG 2 records that are transmitted on a TCP/IP link. An exemplary input data layout is described elsewhere herein.

If a record fails to parse because of improper field formatting or field corruption, it is stored in a generic error repository. The system 100 does not stop the collection of SDV records if one of the records fails.

Subscriber Details and Services Data Parsing—

The parsing parameters for the subscriber details and services data may be of the type defined in the aforementioned Openet *Fusion Works SDL Technical Reference*. Appendix K of previously incorporated U.S. Provisional Patent Application Ser. No. 61/260,346 illustrates exemplary parameters specifically defined for the subscriber details and services data collector 106.

In one embodiment, the data is provided by a custom made script. The input format consists of clear text files in which the records have fields that are separated by "pipes" (|) (Pipe Separated Values). The collector 106 may manage inter alia subscriber detail extract files. These files contain all the information about subscriber, its account and equipment in premises. The collector 106 may also manage inter alia, subscriber service extract files; these files contain subscribers by account, rather than by account or equipment. The subscriber service extract files are used to update the subscriber personal information.

The input data layout is specified in greater detail below.

Application Server Data Parsing—

The parsing of application server data is in one variant of the type defined in the aforementioned Openet *Fusion Works SDL Technical Reference*. The table of Appendix L which can be found in previously incorporated U.S. Provisional Patent Application Ser. No. 61/260,346 illustrates exemplary parameters specifically defined for the application server 110.

The input data format consists of clear text files in which the records have fields that are separated by "pipes" (|). The input data layout is specified in greater detail below.

EPG Data Parsing—

The parsing of EPG data is performed in one variant according to the methods and apparatus disclosed in the aforementioned Openet *Fusion Works SDL Technical Reference*. Exemplary parameters specifically defined for the EPG data collector 114 are illustrated in the table of Appendix M of the previously incorporated U.S. Provisional Patent Application Ser. No. 61/260,346. In one embodiment, as noted above, the EPG data collector 114 may comprise a Tribune Media Systems database, Version 5.2.

The input data format consists of clear text files in which the records have fields that are separated by "pipes" (|). The input data layout is specified in detail below.

IV. Data Management—

Once data is collected, it is necessary to transform and/or manage the data prior to transmission or reporting to e.g., the NCC 299 and/or SDA 203. For example, the data may be transformed from a first input format to an output format.

SDV Data Record Management—

Collected SDV tuner records are converted into viewing impressions. A viewing impression refers in the present context to a quanta of time in which a subscriber is presumed to be watching a service. For the purposes of audience measurement, any viewing impression that is longer than 1 second is considered a valid impression, although other criteria may be applied.

Figure 9:
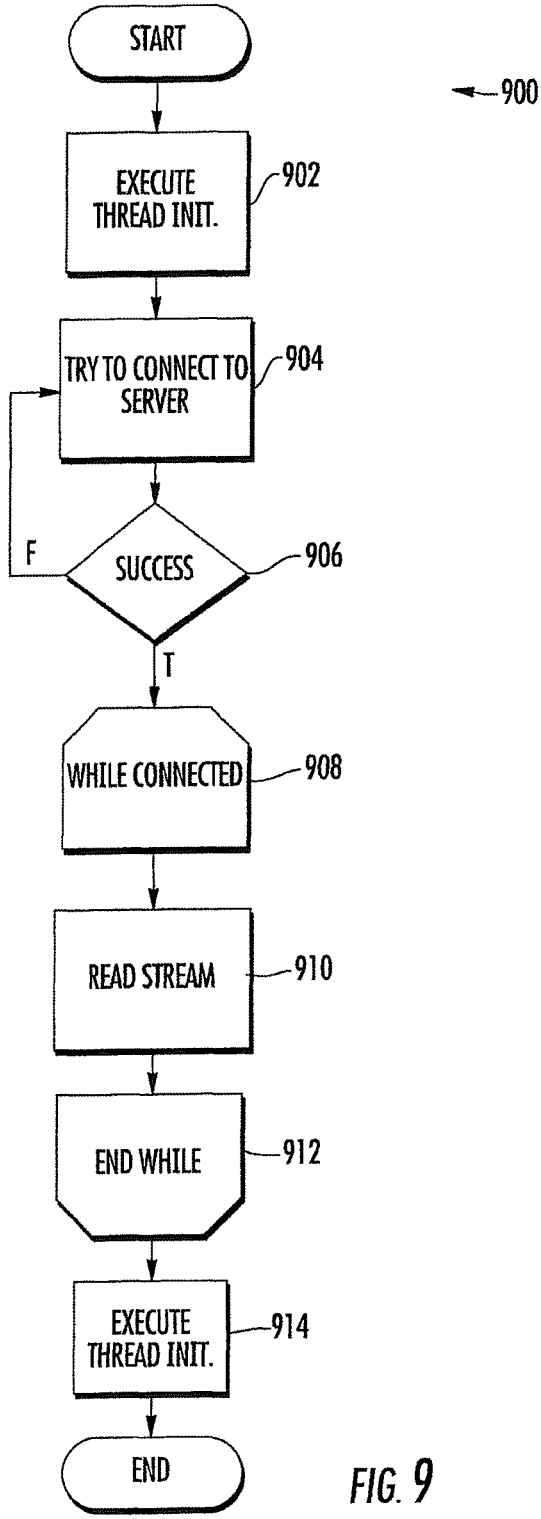
FIG. 9 is a logical flow diagram illustrating a method for processing collected SDV records.

FIG. 9 illustrates an exemplary method 900 for processing collected SDV records. As shown, per step 902, the thread initialization) is executed.

SDV files are collected and stored as raw records that are then used to create viewing impressions. These viewing impressions have all the data needed for analysis. Batch start executes before any records is processed, and is used to prepare the system before any file can be processed. The following functional call may be used at step 902 of the method for executing the thread init.)

```
Br_Thread_Init {
    Initialize variables
    #Clean up stage tables
}
```

© Copyright 2009-2010 Time Warner Cable, Inc. All rights reserved

Next, at step 904, the SDV collector 204 connects to the SDV server 207. If the connection is not successful (step

906), the connection is re-tried. If the connection is successful (step 906), while connected (step 908) a read stream function is executed step 910. When the connection ends (step 912), a new execute thread in it is begun at step 914.

Each SDV records has its DATE, TIME, EVENT, SG_ID, MAC, TUNER_USE, SOURCE, and LUA fields validated. Exemplary validation of the above fields according to the invention is illustrated in Appendix N of previously incorporated U.S. Provisional Patent Application Ser. No. 61/260,346. Invalid records are inserted in the error table (e.g., a BL_SDV_TUNLOG_TCP_ERR table).

Duplication of data in the SDV records must be identified as well. In embodiment, DATE, TIME, EVENT, SG_ID, MAC, TUNER_USE, SOURCE, and LUA fields are checked for duplicate entries. Duplicate records are inserted into a duplicate table (e.g., a BL_SDV_TUNLOG_TCP_DUP table).

SDV records that belong to a commercial subscriber are filtered as well as those viewing impressions that have zero duration.

Records that are not duplicates are processed via inter alia, (i) anonymization of the MAC address, (ii) parsing tuner use data, (iii) computing a tune-out event, (iv) obtaining channel information, (v) calculating the platform, (vi) computing contiguous events, and (vii) determining switched digital events. In one embodiment, the anonymization of the MAC address proceeds according to the following exemplary pseudocode logic:

```
Lb_Anonymize_MAC { pm_mac } {
    # Constant salts
    SaltNumber_0 = first salt value
    SaltNumber_1 = second salt value
    DWord_0 = Convert into right DWord (pm_mac)
        DWord_1 = ZeroPad(Convert into let DWord (pm_mac)
        Add SaltNumber_0 to DWord_0. Store result to DWord_0.
            Carry over any overflow bits to DWord_1
        Subtract second salt value to DWord_1
        SaltedDword = Concatenate DWord_1 and DWord_0
        Anonymized Mac = Apply MD5(SaltedDWord)
        return String(Anonymized Mac)
}
```

© Copyright 2009-2010 Time Warner Cable, Inc. All rights reserved

In one embodiment, the parsing of tuner use data occurs according to the following logic:

```
Lb_Parse_Tuner_Use {pm_tuneruse} {
    Create an empty list.
    Split pm_tuneruse in bits being the Least Significant Bit 0
    And the most significant bit 7.
    If bit 0 is 1 then, add "IS_RECORDING" to list.
    If bit 2 is 1 then add "IS_PPV" to list.
    Case if the combination of bits 3 to 5 is:
        00 Add "IS_BACKGROUND"
        01 Add "IS_MAIN"
        02 Add "IS_PIP"
    End Case
    If bit 7 is 1 then add "IS_FAILED"
    Return list
}
```

© Copyright 2009-2010 Time Warner Cable, Inc. All rights reserved

The tune-out events may be computed as follows:

```
Lb_Compute_Tune_Out {pm_event pm_tuner_use} {
    If pm_tuner_use is IS_FAILED then
        Return a tune out type of 4, Error
    If pm_event is 1 or pm_event is 2
        Return a Tune out type of 0, Channel Change
    If pm_event is 8 or pm_event is 6 then
```

-continued

```
        Return a tune out type of 2, Inactive
    If pm_event is 3 or pm_event is 4 or pm_event is 5 then
        Return a tune out type of 1, Zombie
    Else
        Return a tune out type of 2, Inactive
}
```

© Copyright 2009-2010 Time Warner Cable, Inc. All rights reserved

Channel information may be obtained by the following exemplary functional call:

```
Lb_ObtainChannel {pm_source, pm_source_group} {
    Get the list of hubs from the Source Group to Hub
    translation table.
    Use the hub to obtain the lineup id from BL_MASLINEUP
    Use the pm_source and lineup id to obtain the service id
    from BL_MAS_SERV
    Return Service Id.
}
```

© Copyright 2009-2010 Time Warner Cable, Inc. All rights reserved

In another embodiment, the platform calculation occurs according to the following logic:

```
Lb_Calculate_Platform {pm_cpe_guid} {
    Search in hash to see if this pm_cpe_guid has been
processed.
    If it has been processed then, obtain the platform type.
        If tuner id is > 1 and the platform type is MDN, then
            Update hash as ODN.
            Return ODN.
        Else
            Return hashed type.
    Else
        If tuner id is >1 then
            platform is ODN
        Else
            Platform is MDN
        End If
        Store determined platform type in hash.
    End If
}
```

© Copyright 2009-2010 Time Warner Cable, Inc. All rights reserved

Contiguous events may be computed, in one embodiment, according to the following functional call:

```
Lb_Compute_Contiguous {pm_cpe_guid, pm_tuner_id, pm_date,
pm_time, pm_lua } {
    Get previous timestamps for last date use hash using the
pm_cpe_guid
    and pm_tuner_id
    If previous date is within the number of seconds described
in sp_contiguousTreshold of lua then
        Store current date and time in hash
        Return true, is contiguous
    Else
        Store current date and time in hash
        Return false, is not contiguous
    End If
}
```

© Copyright 2009-2010 Time Warner Cable, Inc. All rights reserved

Switched digital (SDV) events may be determined by e.g.:

```
Br_SDVEVent { User Defined Event } {
    Create Database Map
    Foreach field in User Defined Event
        If the field is the SOURCE then
            If User Defined Event(SOURCE) has a "-" # looks
```

-continued

```
like 1000-1
                Split the value in SOURCE into the source id and
index.
                Store the source id and index in the database
map.
            End if
        ElseIf field="MAC_ADDRESS"
                #Mac Address is delivered as #############-##
                Extract the MAC address from the parsed record.
                Anonymize the MAC address by calling
LB_Anonymize_MAC
                Store the anonymized MAC address into the
database map.
                Store the index, the value at the right of the
MAC address
                In the tuner id field.
            End If
            Store the collected value in the anonymized MAC
        Next
        Get subscriber data from the BL_SUB_DETL table by using
the anonymized
            MAC address.
        If the subscriber data was not found store the content of
the array in
            BL_SDV_TUNLOG_TCP_UGD and finish
        Else
            Use the LUA field as the start of the event.
            Use the DATE_TIME as the end of the tuning event.
            Calculate duration using the LUA and DATE_TIME fields
            If Duration is less or equal than the duration in the
or
                sp_filteringThreashold or the sp_filterCommercial
is 1 and
                record belongs to a commercial subscriber
            Then
                Store the content of the array in
BL_SDV_TUNLOG_TCP_FLR
            Else
                Call the Lb_Parse_Tuner_Use Routine and use the
list
                To populate if it is Recording, PIP or PPV or
Error.
                Using the Service Group and Source, Call
Lb_ObtainChannel
                To obtain the channel that will be populated the
SERVICE_ID
                Retrieve any previous source id and service group
                that was stored previously call Lb_ObtainChannel
to obtain the
                channel that will be populated in
PREVIOUS_SERVICE_ID
                Store current source id and service group as
                the new previous source id for later retrieval.
                Compute tune_out type by calling
Lb_Compute_Tune_Out_type
                Compute platform type with the number of tuner
id's collected.
                Compute if the event is contiguous
                If is_contiguous is false and TUNE_OUT_TYPE is
Channel Change and
                    platform is MDN
                Then
                    Subtract the amount seconds described in
sp_mdnTimeAdjust
                    to TOTAL_VIEW_TIME
                    Subtract the amount of seconds described in
sp_mdnTimeAdjust
                    to END_TIME
                End If
                Store the content of the array in
BL_SDV_TUNLOG_TCP_STG.
            End If
        End If
}
```

© Copyright 2009-2010 Time Warner Cable, Inc. All rights reserved

Batch end executes after all records are processed. The batch end process is used to prepare the system before any file can be processed. An exemplary functional call for executing the batch end process is:

```
Br_ThreadEnd { }
{
    Store all records still in memory into
        BL_SDV_TUNLOG_TCP_STG
}
```

© Copyright 2009-2010 Time Warner Cable, Inc. All rights reserved

Appendix O of previously incorporated U.S. Provisional Patent Application Ser. No. 61/260,346 illustrates exemplary UDE-to-BL_SDV_TUNLOG_TCP_STG mapping; i.e., the data table structure of the anonymized and enriched tuning event record described above. As shown, several local system-specific codes in the raw tuning event record are converted into a normalized view of the event, complete with channel/network information, tune-out types, etc. The normalized view of the event may then be combined/processed with other enriched tuning event records.

Database tables are used to match the service group number to a given HUB. This information is then used to determine the lineup in the AS lineup table. The AS lineup table is represented as e.g., a BL_SG_HUB table. The AS lineup table is populated and maintained manually into the database. Exemplary AS lineup table definitions consistent with the present invention may be defined by the table of Appendix P of previously incorporated U.S. Provisional Patent Application Ser. No. 61/260,346.

AS Data Record Management—

Records collected from the AS data source 213 are managed utilizing a collection entity 210. In one embodiment (noted above), the collector 210 comprises a QBatch collector of the type previously described.

Figure 10:
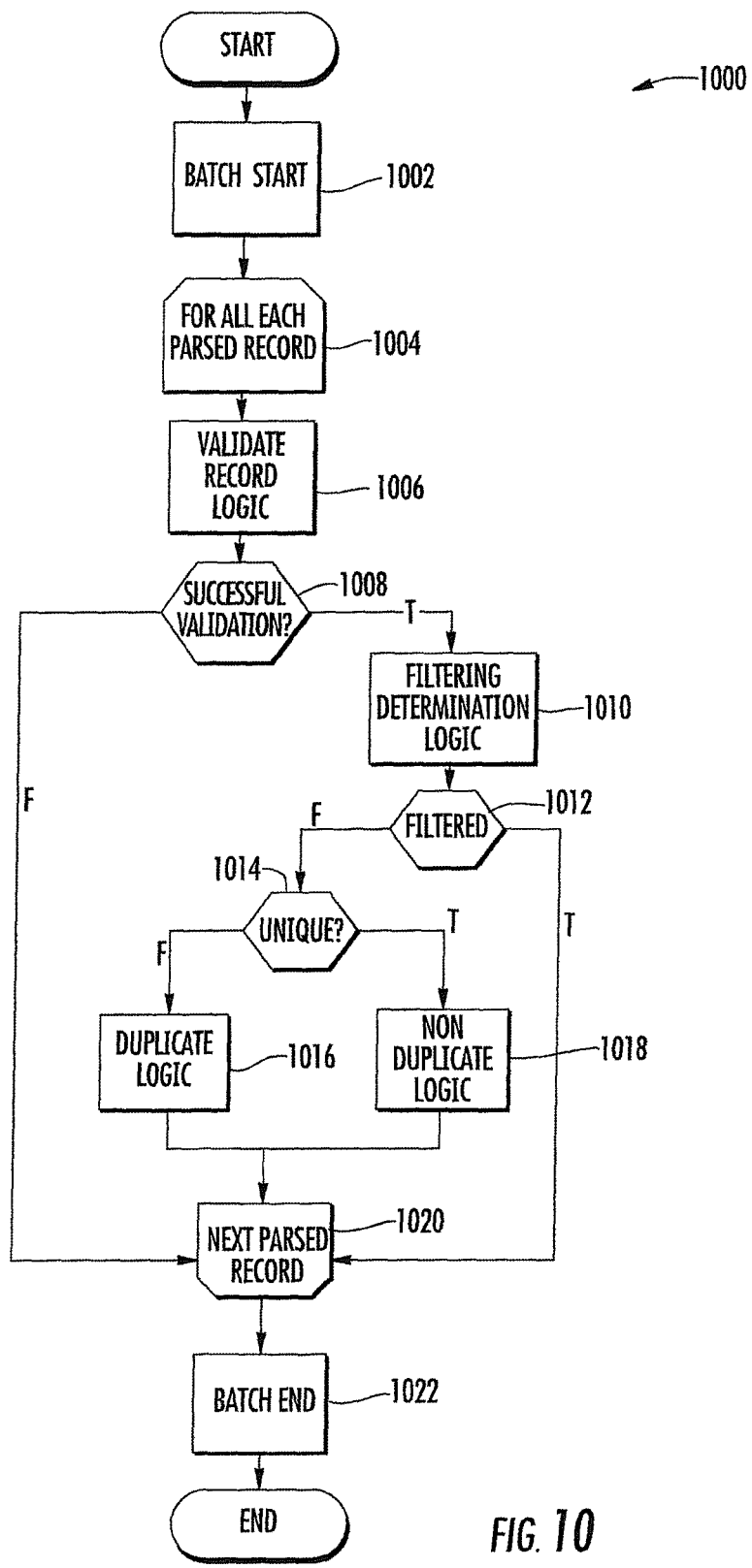
FIG. 10 is a logical flow diagram illustrating a method for managing AS data records.

FIG. 10 illustrates an exemplary method for managing AS data records. The AS collector 210 collects line-up files, channel files, and services files. AS files from the AS 213 are collected via the AS collector 210 and stored in a stage table. The staged records may used to populate an AS table in the system 200 and in the SDA 203.

Per step 1002 of the method, the batch start executes before any records are processed. The batch start process is used to prepare the system before any file can be processed.

Next, for each parsed record (step 1004) the records are validated step 1006. If the validation is not successful (step 1008), the next parsed record is examined at step 1020. Per step 1022 the batch end process is reached. If the validation is successful (step 1008), a filtering logic is utilized (step 1010).

If the record is filtered (step 1012), the process continues to step 1020 where the next parsed record is evaluated. If the record is not filtered (step 1012), it is determined whether the record is unique (step 1014). If the record is not unique, a duplicate logic is used at step 1016; and, if the record is unique a non-duplicate logic is used at step 1018.

Once the duplicate (1016) or non-duplicate (1018) logic is completed, the next parsed record is examined (step 1020) and the batch end process is started (step 1022).

Lineup Files—

"Lineup" files collected at the AS collector 210 are considered to be a comparatively slow-moving dimension. As records are modified or inserted, the system 200 creates records with an activation and expiration date. This approach ensures that historical references to these records are maintained.

In one embodiment, the following functional call may be utilized to execute the batch start process for lineup files:

```
Br_BatchStart {
    Initialize Variables
    #Clean up stage tables
    Truncate BL_STG_MAS_LNUP table
}
```

© Copyright 2009-2010 Time Warner Cable, Inc. All rights reserved

The collected records in the illustrated embodiment each have their REGION_NAME, DIVISION_NAME, DIVISION_CODE, and LINEUP_ID fields validated. Invalid records are inserted in an error table (e.g., BL_STG_MAS_LNUP_ERR table). Exemplary parameters for AS records are illustrated in Appendix Q of previously incorporated U.S. Provisional Patent Application Ser. No. 61/260,346.

The REGION_NAME, DIVISION_CODE, and LINEUP_ID fields in records from a line-up file are checked for duplication and must be unique. Duplicate records are inserted in a duplicate table (e.g., BL_STG_MAS_LNUP_DUP table).

In one embodiment, the line-up records are not filtered.

Records that are not duplicates are used for processing using the following logic:

```
Br_NonDuplicateEvent { User Defined Event } {
    #Create Database Map
    Map User Defined Event to an array according to the field
    translation table
    Result Insert translated array into BL_STG_MAS_LNUP
}
```

© Copyright 2009-2010 Time Warner Cable, Inc. All rights reserved

An exemplary UDE-to-BL_STG_MAS_LNUP mapping is shown in Appendix R of previously incorporated U.S. Provisional Patent Application Ser. No. 61/260,346. Appendix R thereof illustrates the MAS source data used to identify the channel lineup ID for a particular Division network hub as an initial step in identifying the actual network/channel identified in the raw tuning event record.

A batch end process is executed after all records are processed, and is used to prepare the system before any file can be processed. In one embodiment, the following functional call is used to execute the batch end process:

```
Br_BatchEnd { }
{
    Flush any outstanding records into BL_STG_MAS_LNUP
    #Merge all rows from stage into final Line-Up table
    #Records must be updated if they do exist
    Get a list of lineup records that are in BL_STG_MAS_LNUP not
in BL_MASLINEUP.
    Insert those records into BL_MASLINEUP with an Activation
Date of Today
        and an expiration day of 3999.
    For all the records that are already in BL_MASLINEUP.
        If it changed, update the expiration date to today.
        Insert a new entry with the activation day of today and
an expiration
            Date of 3999
        Next For
    Get a list of lineup records that are not in
SDA.BL_MASLINEUP.
    Insert those records into SDA.BL_MASLINEUP with an
Activation Date of Today
        and an expiration day of 3999.
    For all the records that are already in SDA.BL_MASLINEUP.
```

-continued

```
        If it changed, update the expiration date to today.
        Insert a new entry with the activation day of today and
an expiration
            Date of 3999
        Next For
}
```

© Copyright 2009-2010 Time Warner Cable, Inc. All rights reserved

An exemplary line-up table (e.g., BL_STG_MAS_LNUP) to active line-up table (e.g., BL_MASLINEUP) mapping for local storage (e.g., at the system 200) and SDA 203 is shown in Appendix S of previously incorporated U.S. Provisional Patent Application Ser. No. 61/260,346.

Channel Files—

Channel files from the AS are collected and stored in a stage table. The staged channel records are then used to populate the AS table of the data collection system 200 and at the SDA 203. Channel files are also considered to be a slow-moving dimension. As channel records are modified or inserted, the system 200 creates channel records with an activation and expiration date. This approach again ensures that historical references to these channel records are kept.

Batch start executes before any channel record is processed and it is used to prepare the system before any file can be processed. In one embodiment, the batch start process is represented by the following logic:

```
Br_BatchStart {
    Initialize Variables
    #Clean up stage tables
    Truncate BL_STG_MAS_CHAN table
}
```

© Copyright 2009-2010 Time Warner Cable, Inc. All rights reserved

Each of the channel records has its REGION_NAME, DIVISION_NAME, DIVISION_CODE, LINEUP_ID, SERVICE_ID, and DISPLAY_CHANNEL fields validated. Exemplary validation criteria are given in Appendix T of previously incorporated U.S. Provisional Patent Application Ser. No. 61/260,346.

Invalid channel data records are placed in an error table (e.g., BL_MASCHANNEL_ERR table).

Duplicate channel records are determined by looking for uniqueness in the REGION_NAME, DIVISION_CODE, LINEUP_ID, SERVICE_ID, and DISPLAY_CHANNEL fields. Duplicate channel records are inserted in a duplicate table (such as e.g., BL_MASCHANNEL_DUP table).

As above with line-up records, channel records are not filtered.

Channel records that are not duplicates are next processed. In one embodiment, the following logic is used for processing the AS channel records.

```
Br_NonDuplicateEvent { User Defined Event } {
    #Create Database Map
    Map User Defined Event to an array according to the field
    translation
    table
    Insert translated array into BL_STG_MAS_CHAN
}
```

© Copyright 2009-2010 Time Warner Cable, Inc. All rights reserved

An exemplary UDE-to-BL_STG_MAS_CHAN mapping is illustrated in Appendix U of previously incorporated U.S. Provisional Patent Application Ser. No. 61/260,346.

As shown, the MAS reference data allows the collection system 200 to map from a division channel lineup to a specific network/channel based on service ID.

A batch end process is executed after all the records have been processed. The batch end process is used to prepare the system before any file can be processed. The batch end process may have the functional call listed below.

```
Br_BatchEnd { }
{
    Flush any outstanding records into BL_STG_MAS_CHAN
    #Merge all rows from stage into final Line-Up table
    #Records must be updated if they do exist
    Get a list of lineup records that are in BL_STG_MAS_CHAN not
in
    BL_MASCHANNEL.
    Insert those records into BL_MASCHANNEL with an Activation
Date of Today
    and an expiration day of 3999.
    For all the records that are already in BL_MASCHANNEL.
        If it changed, update the expiration date to today.
        Insert a new entry with the activation day of today and
an expiration
            Date of 3999
        Next For
    Get a list of lineup records that are not in
SDA.BL_MASCHANNEL.
    Insert those records into SDA.BL_MASCHANNEL with an
Activation Date of Today
    and an expiration day of 3999.
    For all the records that are already in SDA.BL_MASCHANNEL.
        If it changed, update the expiration date to today.
        Insert a new entry with the activation day of today and
an expiration
            Date of 3999
        Next For
}
```

© Copyright 2009-2010 Time Warner Cable, Inc. All rights reserved

Services Files—

Services files from the AS 213 are collected and stored in a stage table. The staged service records are used to populate the AS table in the system 200 and SDA instances 203. Services files are also considered to be a slow-moving dimension. As service records are modified or inserted, the system 200 creates service records with an activation and expiration day. This ensures that historical references to these records are kept.

The batch start executes before any record is processed and it is used to prepare the system before any file can be processed.

```
Br_BatchStart {
    Initialize Variables
    #Clean up stage tables
    Truncate BL_STG_MAS_SERV table
}
```

© Copyright 2009-2010 Time Warner Cable, Inc. All rights reserved

Each of the service files have their REGION_NAME, DIVISION_NAME, DIVISION_CODE, LINEUP_ID, SERVICE_ID, SERVICE_TYPE, GUIDE_ID, HD_SD, SD_SOURCE_ID, HD_SOURCE_ID, and SDV fields validated. Invalid service files are inserted in an error table (e.g., BL_MAS_SERV_ERR table). Exemplary validation logic is shown in Appendix V of previously incorporated U.S. Provisional Patent Application Ser. No. 61/260,346.

The service files are also checked for uniqueness with respect to the REGION_NAME, DIVISION_CODE, and SERVICE_ID fields. Duplicate records are inserted into a duplicate table (e.g., BL_STG_MAS_SERV_DUP table).

The service records are not filtered. However, all the service records delivered from the AS 213 are processed. In one embodiment, records that are not duplicates are used for processing using the following logic:

```
Br_NonDuplicateEvent { User Defined Event } {
    #Create Database Map
    Map User Defined Event to an array according to the field
    translation table.
    Insert translated array into BL_STG_MAS_SERV
}
```

© Copyright 2009-2010 Time Warner Cable, Inc. All rights reserved

Exemplary UDE-to-BL_STG_MAS_SERV mapping is illustrated in the table of Appendix W of previously incorporated U.S. Provisional Patent Application Ser. No. 61/260, 346. Appendix W represents the last piece of the puzzle that allows SDA to map the raw tuning event record source ID to the actual channel/network being viewed.

The batch end process executes after all record are processed. The batch end process is used to prepare the system before any file can be processed.

```
Br_BatchEnd { }
{
    Flush any outstanding records into BL_MASSERVICE_STG
    #Merge all rows from stage into final Line-Up table
    #Records must be updated if they do exist
    Get a list of lineup records that are in BL_MASSERVICE_STG
not in
    BL_MASSERVICE.
    Insert those records into BL_MASSERVICE with an Activation
Date of Today
    and an expiration day of 3999.
    For all the records that are already in BL_MASSERVICE.
        If it changed, update the expiration date to today.
        Insert a new entry with the activation day of today and
an expiration
            Date of 3999
        Next For
    Get a list of lineup records that are not in
SDA.BL_MASSERVICE.
    Insert those records into SDA.BL_MASSERVICE with an
Activation Date of Today
    and an expiration day of 3999.
    For all the records that are already in SDA.BL_MASSERVICE.
        If it changed, update the expiration date to today.
        Insert a new entry with the activation day of today and
an expiration
            Date of 3999
        Next For
}
```

© Copyright 2009-2010 Time Warner Cable, Inc. All rights reserved

Exemplary mapping of the BL_MASSERVICE_STG to the BL_MAS_SERV is illustrated in the table of Appendix X of previously incorporated U.S. Provisional Patent Application Ser. No. 61/260,346. This table maps all of the active MAS source data together into a table that is used to enrich raw tuning event record source IDs into normalized networks/channels.

EPG Data Record Management—

Records collected from the EPG data source 217 are managed utilizing a collection entity 214. In one embodiment (noted above), the EPG data source 217 comprises one or more Tribune Media Systems servers. The collected EPG data files are, in one embodiment, handled with a QBatch collector. The collected EPG data files include scheduling records and programming records.

Figure 11:
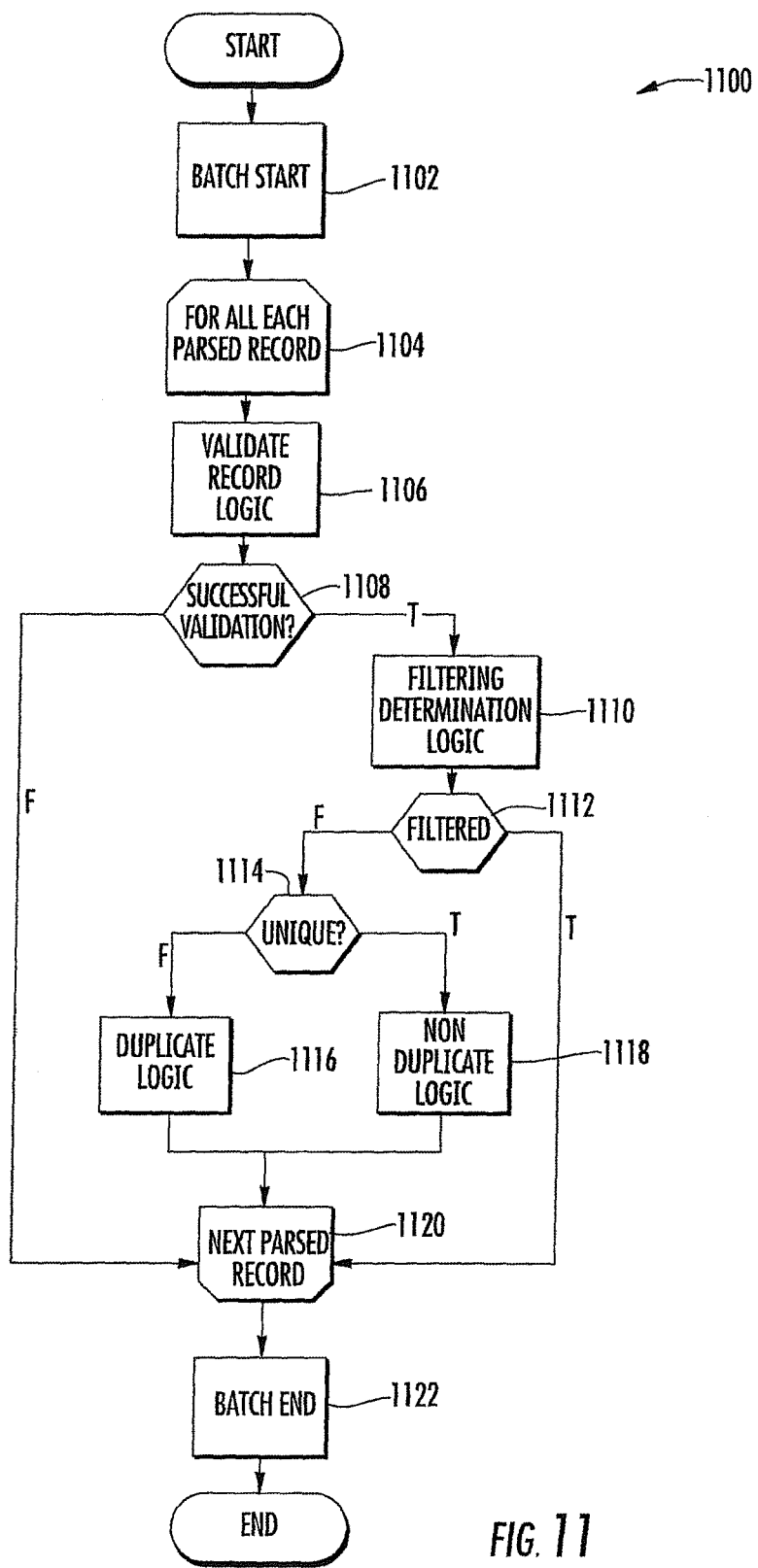
FIG. 11 is a logical flow diagram illustrating a method of EPG data record management and processing.

An exemplary method of EPG data record management and processing is illustrated in FIG. 11. It is noted that, the logic within the validation engine for processing the EPG data differs from that of the processing of AS data (discussed elsewhere herein). The logic for identifying duplicates is also different for the EPG data versus the AS data (also discussed elsewhere herein). Per step 1102 of the method, the batch start executes before any records are processed.

Next, for each parsed record (step 1104) the records are validated step 1106. If the validation is not successful (step 1108), the next parsed record is examined at step 1120. Per step 1122 the batch end process is reached. If the validation is successful (step 1108), a filtering logic is utilized (step 1110).

If the record is filtered (step 1112), the process continues to step 1120 where the next parsed record is evaluated. If the record is not filtered (step 1112), it is determined whether the record is unique (step 1114). If the record is not unique, a duplicate logic is used at step 1016; and, if the record is unique a non-duplicate logic is used at step 1118.

Once the duplicate (1116) or non-duplicate (1118) logic is completed, the next parsed record is examined (step 1120) and the batch end process is started (step 1122).

Schedule Records—

The schedule files are collected and stored in a stage area. This action ensures that any records collected in error are handled properly. After all schedule records have been collected, they are merged into a table; a copy of the table is held at the system 200 and at the SDA instance 203. In one embodiment, an Oracle merge function ensures that new schedule records are inserted and existing ones updated in both tables. The schedule records are rotated by 14 days; hence, the schedule records on the oldest day remain in the reporting instance for historical purposes.

The batch start process is used to prepare the system before any file can be processed. In one embodiment, the batch start process uses the following logic:

```
Br_BatchStart {
    Initialize Variables
    #Clean up stage tables
    Truncate BL_STG_TMS_SCHD table
}
```

© Copyright 2009-2010 Time Warner Cable, Inc. All rights reserved

Each of the schedule records of the collected EPG data has its TF_STATION_NUM, TF_DATABASE_KEY, TF_AIR_DATE, TF_AIR_TIME, TF_DURATION, TF_SEX_RATING, TF_LANGUAGE_RATING, TF_DIALOG_RATING, and TF_FV_RATING fields validated. Invalid schedule records are inserted into an error table (such as e.g., BL_STG_TMS_SCHD_ERR table).

The TF_STATION_NUM, TF_DATABASE_KEY, TF_AIR_DATE, TF_AIR_TIME, and TF_DURATION fields in the schedule records must be unique. Duplicate records are inserted into a duplicate table (e.g., BL_STG_TMS_SCHD_DUP table).

Schedule records are not filtered. Records that are not duplicates are used for processing using the following logic:

```
Br_NonDuplicateEvent { User Defined Event } {
    #Create Database Map
    Map User Defined Event to an array according to the field
    translation table
    Insert translated array into BL_STG_TMS_SCHD
}
```

© Copyright 2009-2010 Time Warner Cable, Inc. All rights reserved

Exemplary mapping of the UDE to the BL_STG_TMS_SCHD is illustrated in the table of Appendix Y of previously incorporated U.S. Provisional Patent Application Ser. No. 61/260,346. Similar to the various MAS source data files, the TMS schedule files are ingested for use in identifying the specific programs being viewed per the SDV tuning records.

Program Records—

The program files are collected and stored in a stage area. This action ensures that any records collected in error are handled properly. After all program records have been collected, they are merged into a table; a copy of the table is held at the system 200 and at the SDA instance 203. In one embodiment, an Oracle merge function ensures that new program records are inserted and existing ones updated in both tables. In one variant, the program records are rotated by 14 days, hence, the program records on the oldest day remain in the reporting instance for historical purposes.

The batch start process is used to prepare the system before any file can be processed. In one embodiment, the batch start process uses the following logic:

```
Br_BatchStart {
    Initialize Variables
    #Clean up stage tables
    Truncate BL_STG_TMS_PROG table
}
```

© Copyright 2009-2010 Time Warner Cable, Inc. All rights reserved

Each programming record has its TF_DATABASE_KEY and TF_TITLE fields validated. Invalid records are inserted into an error table (e.g., BL_STG_TMS_PROG_ERR). Exemplary validation logic for programming records is given at Appendix Z of previously incorporated U.S. Provisional Patent Application Ser. No. 61/260,346.

The programming records are also checked for duplicates at e.g., their TF_DATABASE_KEY and TF_TITLE fields. Duplicate records are inserted into a duplicate table (e.g., BL_STG_TMS_PROG_DUP table).

The programming records are not filtered. Programming records that are not duplicates are then used for processing using the following logic:

```
Br_NonDuplicateEvent { User Defined Event } {
    #Create Database Map
    Map User Defined Event to an array according to the field
    translation table
    Insert translated array into BL_STG_TMS_PROG
}
```

© Copyright 2009-2010 Time Warner Cable, Inc. All rights reserved

Exemplary UDE-to-BL_STG_TMS_PROG mapping is illustrated in Appendix AA of previously incorporated U.S. Provisional Patent Application Ser. No. 61/260,346. The table of Appendix AA is the destination for the TMS program source data, which includes, inter cilia the program title, genre, rating, actors, credits, episode, etc.

Once all of the records have been processed, a batch end process executes and is used to prepare the system before any file can be processed. In one embodiment, the batch end process utilizes the following functional call:

```
Br_BatchEnd { }
{
    Flush any outstanding records into BL_STG_TMS_PROG
    #Merge all rows from stage into final Schedule table
```

-continued

```
#Records must be updated if they do exist
Perform an Oracle Merge from BL_STG_TMS_PROG to
BL_TMS_PROG
Perform an Oracle MERGE from BL_STG_TMS_PROG to the
BL_TMS_PROG in SDA via DBLINK
}
```

© Copyright 2009-2010 Time Warner Cable, Inc. All rights reserved

Exemplary BL_STG_TMS_PROG-to-BL_TMS_PROG mapping is illustrated in Appendix AB of previously incorporated U.S. Provisional Patent Application Ser. No. 61/260,346. Appendix AB thereof illustrates the data staging process for the TMS source data. in one embodiment, the actual source data tables are not used for the enrichment process, but rather a "copied over" version of merged records are used.

VOD Data Record Management—

Video On Demand (VOD) usage data is processed in one embodiment in the aforementioned Oracle environment as a PL/SQL program. The system 200 provides a chronological-like facility which allows for the execution of events at timed intervals.

Figure 12:
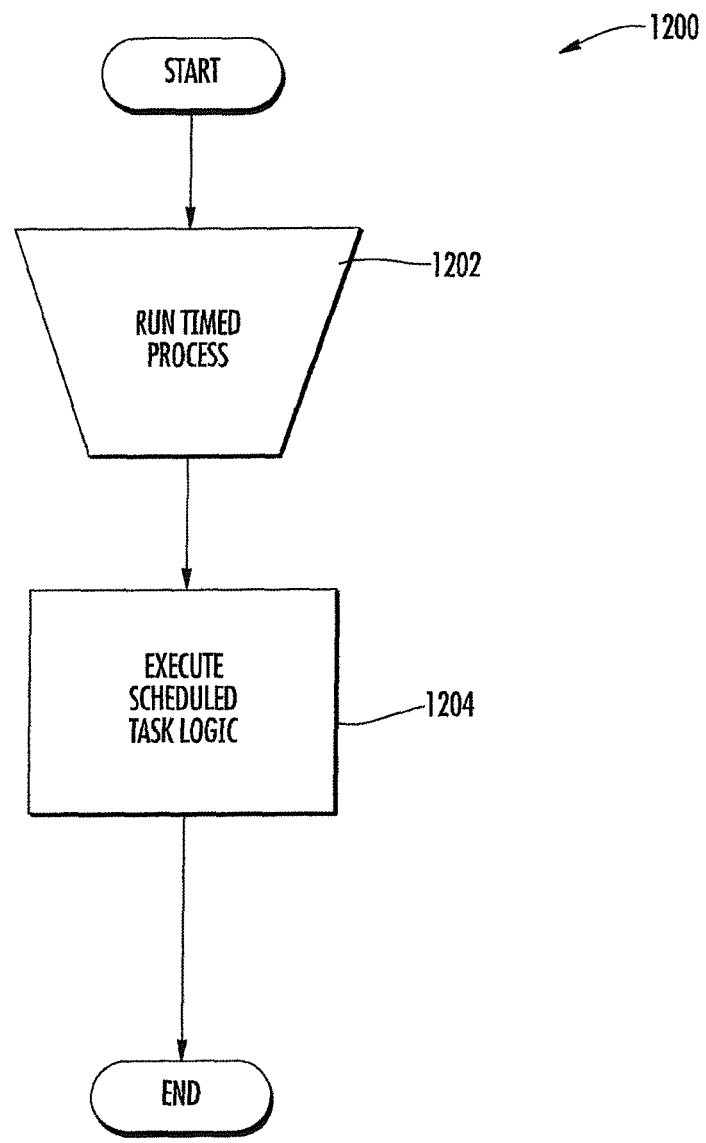
FIG. 12 is a logical flow diagram illustrating a task process for the management of VOD data records.

FIG. 12 illustrates an exemplary task process for the management of VOD data records. Per step 1202 a run timed process is executed. At step 1204 the scheduled task logic is executed.

Data for VOD is delivered through a direct database connection. The system 200 uses a scheduled task to retrieve records. There are two types of records that are delivered by the VOD collector 208 of the illustrated embodiment: (i) reference records and (ii) usage records.

Reference records are records that are used to enhance usage records, such as asset titles and genre. Reference records are collected directly from the VOD data source 211 and merged, inserted or updated, in the SDA instance 203.

Usage records are records that are used to measure VOD usage, such as VOD leases or streams. Usage records are collected by the VOD collector 208 and inserted into the SDA instance 203. Every record that is collected is considered new usage.

The VOD records are validated at the MAC_ADDRESS, ASSET_SID, ASSET_ID, ASSET_COMPONENT_NBR, VIEWING_SECS, VOD_LEASE_ID, CALENDAR_DATE, and START_TIME fields. An exemplary validation table for the above fields is given at Appendix AC of previously incorporated U.S. Provisional Patent Application Ser. No. 61/260,346. Invalid records are inserted in the error table (e.g., BL_VOD_ERR table).

The VOD records are also checked for duplicates at the MAC_ADDRESS, ASSET_SID, ASSET_ID, ASSET_COMPONENT_NBR, VOD_LEASE_ID, CALENDAR_DATE, and START_TIME fields. Duplicate records are inserted into a duplicate table (e.g., BL_VOD_DUP table).

Commercial subscribers are filtered as part of processing. Filtered records are stored in a filtered record table (e.g., BL_VOD_FLR). In one embodiment, a parameter is provided that is used to control whether commercial records are filtered or not (discussed below).

In one variant, records are extracted from VOD instances from the fields and tables listed in the table of Appendix AD of previously incorporated U.S. Provisional Patent Application Ser. No. 61/260,346. The records that are collected from the database schema are processed in PL/SQL that is managed by a scheduled task. The process includes anonymization of the MAC address, processing usage tables, processing reference tables, and processing VOD data.

In one embodiment, the anonymization uses the following logic:

```
Lb_Anonymize { pm_mac } {
    # Constant salts
    SaltNumber_0 = first salt value
    SaltNumber_1 = second salt value
    DWord_0 = Convert into right DWord (pm_mac)
        DWord_1 = ZeroPad(Convert into let DWord (pm_mac)
        Add SaltNumber_0 to DWord_0. Store result to DWord_0.
            Carry over any overflow bits to DWord_1
        Subtract second salt value to DWord_1
        SaltedDword = Concatenate DWord_1 and DWord_0
        Anonymized Mac = Apply MD5(SaltedDWord)
    return String(Anonymized Mac)
}
```

© Copyright 2009-2010 Time Warner Cable, Inc. All rights reserved

The usage tables may be processed using the following exemplary logic:

```
Lb_ProcessUsageTables { } {
    recordset = Select records for that day that are needed
to be processed
    Foreach record in recordset
        If Validate(record) = Failure then
            Insert record into BL_VOD_ERR
        Else
            Map record into an array according to the data
            Translation table
            Fetch subscriber information by using the MAC
Address
            Anonymized MAC Address
            If subscriber information is not found then
                Insert array into BL_VOD_UGD
            Else If subscriber is commercial and
                    the sp_filterCommercial is on.
                Insert array into BL_VOD_FLR
            Else
                Result = Insert array into BL_VOD
            End If
        If Result =Failure THEN
            If it failed because of a duplicate error then
                Result = Insert array into BL_VOD_DUP
            Else
                Rollback
                Cause exception
            End If
        Next
        Commit
        Insert records from the BL_ADS_STG to the SDA table
BL_TNG via
            DBLINK.
}
```

© Copyright 2009-2010 Time Warner Cable, Inc. All rights reserved

The reference tables may be processed using the following exemplary logic:

```
ProcessReferenceTables { } {
    Foreach table
        If reference table is not equipment
        -- Done as dynamic oracle statement
        -- to be done on VOD_ASSET_TITLE, VOD_ASSET,
        ORGANIZATION
        -- LOCATION, VOD_ASSET_TITLE_GENRE,
VOD_ASSET_TITLE_CATEGORY
        -- VOD_ASSET_COMP
            Perform an Oracle MERGE statement from the
            delivery
schema
            To the SDA instance via DBLINK.
```

```
            Else
                    -- For equipment, a stage table called
BL_EQUIPMENT_STG
                    -- will be used to ensure that the MAC_ADDRESS is
                    -- Anonymous
                    Insert into the BL_LEASE_STG the result of
                    Insert into the BL_LEASE_STG the result of
                    Select   VOD_LEASE_SID
                             LEASE_START
                             LEASE_END
                             LOCATION_SID
                               Anonymize
                               (EQUIPMENT.MAC_ADDRESS)
                             VOD_ASSET_COMP_NBR
                             ASSET_SID
                             EQUIPMENT_SID
                             CALENDAR_SID
                             PREVIEW_FLAG
                             TIME_SID
                             VIEWING_SECS
                             PAUSE_VIEWING_SECS
                             RW_VIEWING_SECS
                             FF_VIEWING_SECS
                             NBR_OF_PAUSES
                             NBR_OF_RW
                             NBR_OF_FF FROM VOD_LEASE,
                             EQUIPMENT
                                WHERE
VOD_LEASE.EQUIPMENT_SID=EQUIPMENT.EQUIPMENT_SID;
                    Note that the Account SID is not selected as part of the
VOD LEASE
                    selection, removing it from the analytics layer.
                    Insert records records from BL_VOD into the SDA
instance.
      Next
}

© Copyright 2009-2010 Time Warner Cable, Inc. All rights reserved
```

Processing VOD data may utilize the following functional call:

```
    VODProcess { } {
    #VOD Table List is the list of all the tables that will be
used
         #to create the usage
         Check the status of all the Video On Demand tables
         If the tables are ready to be collected then
              ProcessUsageTables
              ProcessReferenceTables
              Propagate all staged tables into SDA
         Else
              Wait until the next time to collect the records.
         End If
    }
```

© Copyright 2009-2010 Time Warner Cable, Inc. All rights reserved

Exemplary mapping to the BL_VOD table is illustrated in Appendix AE of previously incorporated U.S. Provisional Patent Application Ser. No. 61/260,346. This process addresses the anonymization of the incoming VoD stream/usage data with Customer GUID and CPE GUID, Exemplary mapping from BL_VOD to the SDA.BL_VOD is illustrated in Appendix AF (illustrates the anonymization of the VoD asset data); and exemplary mapping from VOD_LEASE to the SDA. VOD_LEASE is illustrated in Appendix AG (illustrates the anonymization of the VoD lease data) of previously incorporated U.S. Provisional Patent Application Ser. No. 61/260,346. All other reference tables are copied directly from schema to a respective schema in the SDA 203 according to the database definition described elsewhere herein.

At least one MSO entity is responsible for advertising the availability of records with the use of a global control table. The global control table lists the status of the tables being loaded into the database schema. The system 200 uses this table to indicate when the tables are ready to be processed. An exemplary embodiment of a global control table 1300 is shown in FIG. 13*a*.

The system 200 iterates through the global control table 1300 looking for tables that were completed but that were not processed by the system 200. If any tables are found, the system 200 transfers the content according to the logic described above. After the transfer is completed, the system 200 creates an entry in a system control table. An exemplary system control table 1350 is illustrated in FIG. 13*b*. The system control table 1350 is used to track the transfers and to ensure that incomplete tables or already process tables have been transferred.

As illustrated in FIG. 13*a*, the system 200 inserts an entry with the table name, date when the transfer was completed, its disposition and the number of rows that were transferred. The system control table 200 is used to ensure that only those tables that were not transferred are processed. This is accomplished by obtaining the oldest date on this table, and looking for complete transfers in the global control table 1300 that have an older date than the one in the system control table 1350.

Advertisement Data Record Management—

Advertisement data is processed in one embodiment in the aforementioned Oracle environment as a PL/SQL program. The system 200 provides a chronological-like facility which allows for the execution of events at timed intervals.

Figure 14:
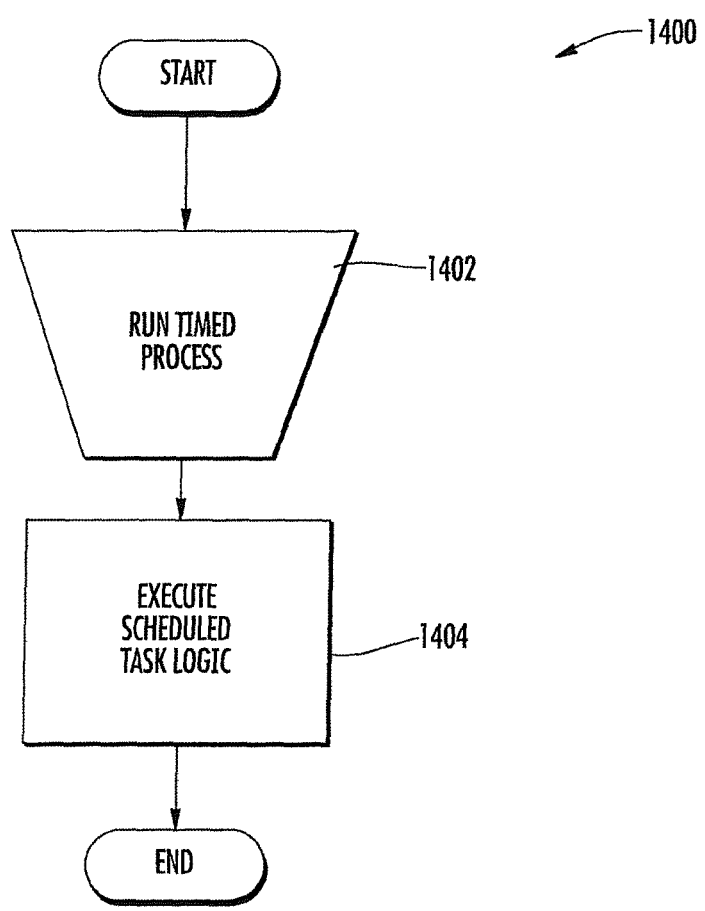
FIG. 14 is a logical flow diagram illustrating a task process for the management of advertisement data records.

FIG. 14 illustrates an exemplary task process for the management of advertisement data records. Per step 1402, a run-timed process is executed. At step 1404, the scheduled task logic is executed.

Advertisement data is delivered through a direct database connection. The system 200 uses a scheduled task to manage the process. There are two types of records that are delivered by the advertisement data collector 212 of the present embodiment: (i) reference records, and (ii) usage records.

References records are records that are used to enhance usage records, such as copy or invoice information. Reference records are collected directly from the advertisement data source 215 and merged, inserted or updated, in the SDA instance 203.

Usage records are records that are used to measure advertisement usage, such as the spots that were broadcasted. Usage records are collected by the advertisement data collector 212 and inserted into the SDA instance 203. Every record that is collected is considered new usage.

Each advertisement records has its SPOT, AIR_DATE, SPOT_START_TIME, COPYLENGTH, CAMPAIGN_ID, CUSTOMER_ID, AGENCY_ID, COPY_ID, NETWORKNAME, SYSCODE, and RETAILUNITCODE fields validated. Exemplary validation logic for the advertisement data is illustrated in Appendix AH of previously incorporated U.S. Provisional Patent Application Ser. No. 61/260,346. Invalid records are inserted in the error table (e.g., BL_ADS_ERR table).

Advertisement records are also checked for duplicates. In one embodiment, duplicates are identified by checking the AIR_DATE, SPOT_START_TIME, COPYLENGTH, NETWORKNAME, SYSCODE, and RETAILUNITCODE fields. Duplicate records are inserted into a duplicate table (e.g., the BL_ADS_DUP table). None of the advertisement data records is filtered.

Records are, in one embodiment, extracted from advertisement events from the fields and tables listed in the table of Appendix AI of previously incorporated U.S. Provisional Patent Application Ser. No. 61/260,346. The records that are collected from the database schema are processed in PL/SQL that is managed by a scheduled task. The process includes processing usage tables, processing reference tables, and processing advertisement data.

In one embodiment, the processing of usage tables is effected via the following logic:

```
Lb_ProcessUsageTables { } {
    recordset = Select records for that day that are needed
to be processed
                    from SPOTS, INVOICE,
                    INVOICE_DETAIL, AGENCY,
COPY,
                    COPY_GROUP and
                    SECONDARYCOMMODITY
    Foreach record in recordset
        If record fails validation then
            Insert record into BL_ADS_ERR
        Else
            Map record into an array according to the field
                translation table
        End If
        Use the Headend, Network and Syscode to retrieve
        The service ID from the BL_SVC_ALIGNMENT table.
        If no records are found then
            Use Network and the "Default" headend to
            retrieve the service_id from
            bl_svc_alignment.
            If no records are found then
                Insert the processed array
                into the
BL_ADS_UGD
            End If
        End If
        If only one record is found, then
            Insert the processed array into
            BL_ADS_STG
        If two records are found, one for HD and one for SD
then
            Insert two records into the processed array
into BL_ADS_STG
            For the SD and HD.
        Else
            Insert the processed array into the
            BL_ADS_UGD
        End If
    Next
    Insert records from the BL_ADS_STG to the SDA table
BL_TNG via
        DBLINK.
}
```

© Copyright 2009-2010 Time Warner Cable, Inc. All rights reserved

Processing the reference tables may, in one embodiment, occur according to the following functional call:

```
ProcessReferenceTables { } {
    Foreach table
        If reference table is not equipment
        -- Done as dynamic oracle statement
        -- to be done on REGION, AGENCY, RETAILUNIT,
           COPY_GROUP
        -- SECONDARY_COMMODITY, ADVERTISER,
           CONTRACT, COPY,
HEADEND
        -- COPY, NETWORK, SPOTS, INVOICE_DETAIL,
           PROGRAM
            Perform an Oracle MERGE statement from the delivery
schema
            To the SDA instance via DBLINK.
    Next
}
```

© Copyright 2009-2010 Time Warner Cable, Inc. All rights reserved

Processing the advertisement data may occur according to the following logic:

```
ADSProcess { } {
    #Ad Plays Table List is the list of all the tables that will
    be used
    #to create the usage
        Check the status of all the Video On Demand tables
        If the tables are ready to be collected then
            ProcessUsageTables
            ProcessReferenceTables
            Propagate all staged tables into SDA
        Else
            Wait until the next time to collect the records.
        End If
        }
```

© Copyright 2009-2010 Time Warner Cable, Inc. All rights reserved

Exemplary mapping to the BL_ADS_STG is given in Appendix AJ of previously incorporated U.S. Provisional Patent Application Ser. No. 61/260,346. As illustrated, the incoming advertisement reference data is enriched to make it usable for the identification of advertisement playouts in a given ad zone. Exemplary mapping from BL_TNG_STG to BL_TNG is shown in Appendix AK of previously incorporated U.S. Provisional Patent Application Ser. No. 61/260, 346. Appendix AK thereof illustrates an exemplary staging table of substantially similar reference data to that of previously referenced Appendix AJ, which is actually used to enrich the advertisement events received. All other reference tables are copied directly from schema to a respective schema in SDA 203 according to the database definition described elsewhere herein.

Control tables, similar to those discussed above with respect to VOD data management, may be utilized in the management of advertisement data. Two database tables are used in the illustrated embodiment to match the raw records coming from the advertisement data source 214 to the rest of the data available in SDA 203; one of them may be actively used for enrichment. These tables are: (i) the geographic alignment table (BL_GEO_ALIGNMENT), and (ii) the service alignment table (BL_SVC_ALIGNMENT).

An exemplary geographic alignment table is illustrated in Appendix AL of previously incorporated U.S. Provisional Patent Application Ser. No. 61/260,346. The geographic alignment table and the service alignment table are built from reference data obtained by the MSO. The geographic alignment table is used to identify the geographic territory that is reached by a given commercial broadcast. For example, when advertisement play-out occurs, the only geographical information that is available (such as from the Open TV solution) is the spot identification information and the retail unit code.

An exemplary service alignment table is illustrated in Appendix AM of previously incorporated U.S. Provisional Patent Application Ser. No. 61/260,346. The service alignment table contains the service level information from an advertisement play-out. The service alignment table is used to correlate the advertisement play-out to a video service. In one example, the only information available (such as from the Open TV solution) are the spot and network names. The network names are different from the ones in services; hence the need for the service alignment table.

For the purposes of mediation, only the service alignment (BL_SVC_ALIGNMENT) is of interest. During the mediation process, advertisement events are enriched with the data from the service alignment table to obtain service identification information. This permits having a common identifier between the viewing events and the advertisement play-outs. Since multiple services can be associated to a network code, the retail unit code is used to discern which service is the one of interest to a given advertisement play, because local origination programs share advertisement network codes for different services.

Subscriber Data Record Management—

Records collected from the subscriber data source 209 are managed utilizing a collection entity 206. Subscriber files are, in one embodiment (noted above), handled with a QBatch collector.

Figure 15:
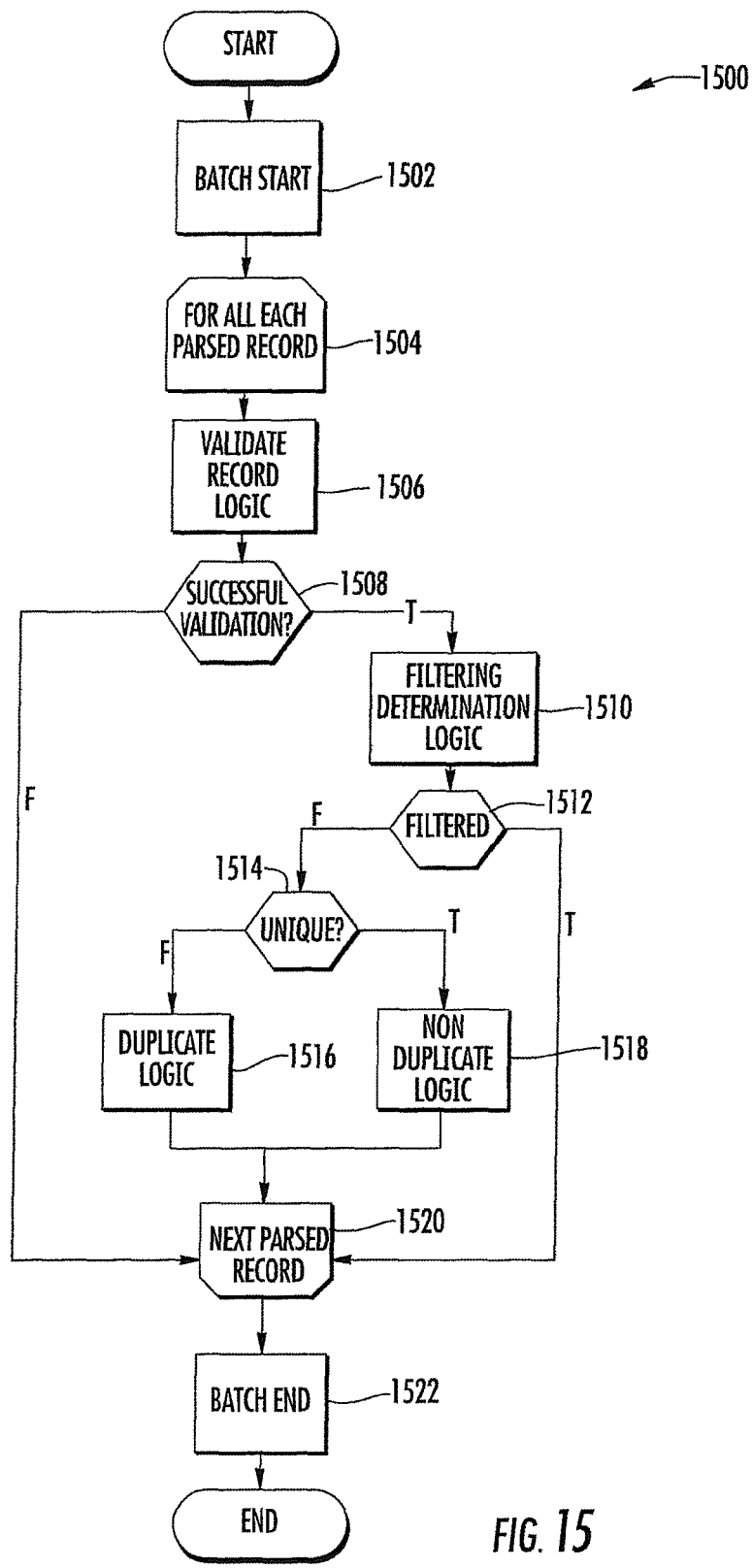
FIG. 15 is a logical flow diagram illustrating a method for managing subscriber data records.

FIG. 15 illustrates an exemplary method for managing subscriber data records. The subscriber data collector 206 collects detail files and services files. Subscriber data files from the subscriber data source 209 are collected via the subscriber data collector 206 and stored in a stage table. The staged records may used to populate subscriber data tables in the system 200, and in the SDA 203. In one embodiment, the subscriber data source 209 comprises a Convergys™ ICOMS sever which delivers a complete set or "dump" of subscriber data records. The system 200 handles additions, updates and removals. To preserve historical perspective or state, these records may optionally contain connect and/or disconnect dates.

Per step 1502 of the method, the batch start executes before any records are processed. The batch start process is used to prepare the system before any file can be processed.

Next, for each parsed record (step 1504) the records are validated step 1506. If the validation is not successful (step 1508), the next parsed record is examined at step 1520. Per step 1522 the batch end process is reached. If the validation is successful (step 1508), a filtering logic is utilized (step 1510).

If the record is filtered (step 1512), the process continues to step 1520 where the next parsed record is evaluated. If the record is not filtered (step 1512), it is determined whether the record is unique (step 1514). If the record is not unique, a duplicate logic is used at step 1516; and, if the record is unique a non-duplicate logic is used at step 1518.

Once the duplicate (1516) or non-duplicate (1518) logic is completed, the next parsed record is examined (step 1520) and the batch end process is started (step 1522).

Schedule and Subscriber Records—

A batch start process executes before any schedule record is processed and it is used to prepare the system before any file can be processed. In one embodiment, the batch start process comprises the following logic:

```
Br_BatchStart {
    Initialize Variables
    #Clean up stage tables
    Truncate BL_STG_SUB_DETL table
    Truncate BL_SUB_DETLS_CUR table
    Insert records from BL_SUB_DETLS into
    BL_SUB_DETLS_CUR
}
```

© Copyright 2009-2010 Time Warner Cable, Inc. All rights reserved

Each of the schedule records has its own fields validated (e.g., SUBSCRIBER_ZIPCODE, DIVISION, DIVISION_ID, SUBSCRIBER_ACCOUNT, SITE_ID, and SUBSCRIBER_CONNECT_DATE fields). Invalid records are inserted in an error table (e.g., BL_SUB_DETLS_ERR). Exemplary validation logic is given in Appendix AN of previously incorporated U.S. Provisional Patent Application Ser. No. 61/260,346.

The schedule records are also checked for uniqueness in the DIVISION_ID, SUBSCRIBER_ACCOUNT, and SUBSCRIBER_CONNECT_DATE fields. Duplicate entries are inserted in the duplicate (BL_SUB_DETLS_DUP) table.

The schedule records are not filtered. Records that are not duplicates are used for processing using the following exemplary logic:

```
Lb_Anonymize_GUID {Subscriber Account, Division Code} {
    Concatenate Subscriber Account and Division Code giving
UID.
    Using its hexadecimal representation, divide UID in DWORDS
    Store Dwords in an Array, Least Significant in 0, Most
Significant in N
    Loop through the Array:
        If Dword belong to an even subscript:
            add a third salt value and Carry any overflow bits to
the next entry
        Else
            subtract fourth salt value, Borrow from next entry if
needed
    End Loop
    Convert Dword Array into String from Most Significant to
Least Significant
            (From N to 0)
    Perform MD5 Hash on the Converted String
    Convert UID into ASCII representation
    Return Converted UID
}
Br_NonDuplicateEvent { User Defined Event } {
    #Create Database Map
    Anonymize the SUBSCRIBER_ACCOUNT field by calling
Lb_Anonymize_GUID.
    Map User Defined Event to an array according to the field
    translation table
    Insert translated array into BL_STG_SUB_DETL
    }
```

© Copyright 2009-2010 Time Warner Cable, Inc. All rights reserved

Exemplary UDE-to-BL_STG_SUB_DETL mapping is shown in Appendix AO of previously incorporated U.S. Provisional Patent Application Ser. No. 61/260,346.

Batch end executes after all records are processed and it is used to prepare the system before any file can be processed. In one embodiment, the batch end process comprises the following functional call:

```
Br_BatchEnd { }
{
    Flush any outstanding records into BL_STG_SUB_DETL
    #Merge all rows from stage into final Schedule table
    # TMS Tables will only go to SDA
    #Records must be updated if they do exist
    Get a list of subscriber accounts that were not in the
current load by
    Comparing BL_SUB_DETLS_CUR and BL_STG_SUB_DETL
    Iterate through that list and update the DISCONNECT_TIME
field to SYSDATE
    In BL_SUB_DETLS
    Perform an Oracle Merge from BL_STG_SUB_DETL to
    BL_SUB_DETLS
    Perform an Oracle Merge from BL_STG_SUB_DETL to
    BL_SUB_DETLS
in SDA via
    DBLINK
}
```

© Copyright 2009-2010 Time Warner Cable, Inc. All rights reserved

Exemplary BL_STG_SUB_DETL-to-BL_STG_SUB_DETL mapping is illustrated in Appendix AP of previously incorporated U.S. Provisional Patent Application Ser. No. 61/260,346. The table of Appendix AP addresses the location, line of business, and connect/disconnect details associated with each incoming subscriber record. This information will be used as the basis for the anonymized subscriber information feed, as well as reference data for event record enrichment with subscriber details.

Service Records—

A batch start process executes before any service record is processed and it is used to prepare the system before any file can be processed. In one embodiment, the batch start process comprises the following logic:

```
Br_BatchStart {
    Initialize Variables
    #Clean up stage tables
    Truncate BL_STG_SUB_BILL table
    Truncate BL_SUB_BILL_CUR table
    Insert records from BL_SUB_BILL into BL_SUB_BILL_CUR
}
```

© Copyright 2009-2010 Time Warner Cable, Inc. All rights reserved

Each service record has its SITE_ID, DIVISION, SUBSCRIBER_ACCOUNT, SERVICE_CATEGORY, SITE_ID, SERVICE_CODE, and EQUIPMENT_CONNECT_DATE fields validated. Invalid records are inserted in an error table (e.g., BL_SUB_BILL_ERR table). Exemplary validation logic is given at Appendix AQ of previously incorporated U.S. Provisional Patent Application Ser. No. 61/260,346.

The following fields in the service records are unique: MAC_ADDRESS, DIVISION, SUBSCRIBER_ACCOUNT, SERVICE_CODE, and EQUIPMENT_CONNECT_DATE. Duplicate records are inserted in the duplicate table (e.g., BL_SUB_BILL_DUP).

The subscriber service records are not filtered. Records that are not duplicates are processed using the following exemplary logic:

```
Lb_Anonymize_MAC { pm_mac } {
    # Constant salts
    SaltNumber_0 = first salt value
    SaltNumber_1 = second salt value
    DWord_0 = Convert into right DWord (pm_mac)
        DWord_1 = ZeroPad(Convert into let DWord (pm_mac)
        Add SaltNumber_0 to DWord_0. Store result to
        DWord_0.
                Carry over any overflow bits to DWord_1
        Subtract second salt value to DWord_1
        SaltedDword = Concatenate DWord_1 and DWord_0
        Anonymized Mac = Apply MD5(SaltedDWord)
        return String(Anonymized Mac)
}
Lb_Anonymize_GUID {Subscriber Account, Division Code} {
    Concatenate Subscriber Account and Division Code giving
UID.
    Using its hexadecimal representation, divide UID in DWORDS
    Store Dwords in an Array, Least Significant in 0, Most
Significant in N
    Loop through the Array:
        If Dword belong to an even subscript:
                add third salt value and Carry any overflow bits to
the next entry
        Else
                subtract fourth salt value, Borrow from next entry if
needed
    End Loop
    Convert Dword Array into String from Most Significant to
Least Significant
            (From N to 0)
    Perform MD5 Hash on the Converted String
    Convert UID into ASCII representation
}
Br_NonDuplicateEvent { User Defined Event } {
    Anonymize the MAC Address field by calling
Lb_Anonymize_MAC.
        Anonymize the SUBSCRIBER_ACCOUNT field by calling
Lb_Anonymize_GUID
        Map User Defined Event to an array according to the field
        translation table
        Insert translated array into BL_STG_SUB_DETL
}
```

© Copyright 2009-2010 Time Warner Cable, Inc. All rights reserved

Exemplary UDE-to-BL_STG_SUB_BILL mapping is illustrated in Appendix AR of previously incorporated U.S. Provisional Patent Application Ser. No. 61/260,346. Appendix AR represents the services on each subscriber account. This information is used to link the MAC address from the event record to the subscriber and to provide additional details regarding the subscriber services profile against the enriched usage data.

A batch end process executes after all service records are processed and it is used to prepare the system before any file can be processed. In one embodiment, the batch end process uses the following logic:

```
Br_BatchEnd { }
{
    Flush any outstanding records into BL_STG_SUB_BILL
    #Merge all rows from stage into final Schedule table
    # TMS Tables will only go to SDA
    #Records must be updated if they do exist
    Get a list of subscriber accounts that were not in the
current load by
        Comparing BL_SUB_BILL_CUR and BL_STG_SUB_BILL
        Iterate through that list and update the DISCONNECT_TIME
field to SYSDATE
    In BL_SUB_BILL
    Perform an Oracle Merge from BL_STG_SUB_BILL to
        BL_SUB_BILL
    Perform an Oracle Merge from BL_STG_SUB_BILL to
        BL_SUB_BILL
in SDA via
        DBLINK
}
```

© Copyright 2009-2010 Time Warner Cable, Inc. All rights reserved

Exemplary BL_STG_SUB_BILL-to-BL_SUB_BILL mapping is illustrated in Appendix AS of previously incorporated U.S. Provisional Patent Application Ser. No. 61/260, 346. Appendix AS is one embodiment of a staging table of subscriber services data that may be used to enrich event records and create the anonymized subscriber data files.

V. Data Delivery—

For data select billing, the system 200 creates downstream feeds for operation and billing support systems, and file transfer of data between the network and rating instances of the system.

The term "NCC Files" is used herein to collectively refer to "universe" data files, household data files, station data files, and tuning data files, which are delivered to e.g., the National Cable Companies (NCC). The system 200 reads directly from the SDA 203 database. The output format of the NCC files is one embodiment clear text (in ASCII) using pipes (|) to separate the fields. All files use the same encoding with different data layouts. The universe data file collects records that belonged to all active subscribers, even partially during the period of interest.

The NCC files are given names according to the following naming convention:

<division>_<year>_<month>.dat.

In the naming convention, the <division> symbol represents the division name; the <year> symbol represents the creation year in one embodiment, the year is a four digits number (YYYY). The <month> symbol is the creation month, in one embodiment, the creation month is given as two digits, zero padded (MM). The .dat file extension is a literal. An exemplary field description table for the NCC records is illustrated in Appendix AT of previously incorporated U.S. Provisional Patent Application Ser. No. 61/260,346. Appendix AU thereof illustrates a sample NCC file and source for data contained therein.

The household data files are records that belonged to all active subscribers, even partially during this period. The household data files are named according to the following convention:

HOUSEHOLD_<division>_<year>_<month>.dat

The HOUSEHOLD symbol is a literal name, <division> is the division name, <year> is the creation year; in one embodiment, the year is given as a four digit number (YYYY). The <month> symbol represents the creation month, two digits zero padded (MM) and .dat is a literal. An exemplary field description table for the header portion of the household data records is illustrated in Appendix AV of previously incorporated U.S. Provisional Patent Application Ser. No. 61/260,346. An exemplary field description table for the detail portion of the household data records as illustrated by Appendix AW thereof as well.

Household data records are obtained in a join. The join has the header and the detail in one line. The term "join" refers to an operation where two or more separate data tables are "joined" via a primary key (or common data element) and specific data elements from each table are combined into a new table with the desired results. Logic may be implemented in embodiment, in Openet programming language and used to separate the header and the footer. Appendices AX, AY and AZ of previously incorporated U.S. Provisional Patent Application Ser. No. 61/260,346 illustrate a sample household file, sources for data contained in the header and detail portions of the household data files, respectively.

The station data describes all the programs and channels that were shown during the period. The station data files are named according to the following convention:

STATION_<division>_<region>_<year>_<month>.dat

In the above naming convention, "STATION" is a literal name, <division> is the division name, and <region> is the region name. In one embodiment, the region name corresponds to the lineup being used to map the channel ID. The <year> symbol is the creation year, four digits (YYYY); the <month> symbol is the creation month, two digits (MM); and ".dat" is a literal. Appendix BA of previously incorporated U.S. Provisional Patent Application Ser. No. 61/260, 346 illustrates an exemplary field description table for the header portion of the station data records. Appendix BB thereof illustrates an exemplary field description table for the detail portion of the station data records. Appendix BC thereof gives a sample station data file. Appendices BD and BE thereof illustrate sources for data contained in the header and detail portions of the station data files, respectively.

The tuning data report describes all the tuning events that were collected for a given division during the period. The tuning data files are in one embodiment named according to the following convention:

Tune_<division>_<year>_<month>_<day>.dat

In the above naming convention, "Tune" is a literal, <division> is the division name, <year> is the creation year (four digits, YYYY), <month> is the creation month (two digits, zero padded, MM), <day> is the creation day (two digits, zero padded, DD), and ".dat" is a literal. Appendix BF of previously incorporated U.S. Provisional Patent Application Ser. No. 61/260,346 illustrates an exemplary field description table for the tuning data records. Appendix BG thereof gives a sample tuning data file. Appendix BH thereof illustrates sources for data contained in the tuning data files.

The above-disclosed files may be delivered to outside entities, such as the aforementioned National Cable Companies (NCC), via secured FTP or other such protocol. The system 200 has a scheduled task for each individual report for each individual division. This advantageously allows for asynchronous creation of reports for each division. The output of these reports is controlled with a single control table that states the period being collected for that report. An exemplary schema for the table is illustrated in Appendix B1 of previously incorporated U.S. Provisional Patent Application Ser. No. 61/260,346.

In one embodiment, daily reports are executed after midnight for records processed the day before. In another embodiment, for monthly reports, the scheduled task is executed on the first of the month, and processes records for the entire month.

Files are delivered using e.g., Secure FTP (SFTP) over a TCP/IP link, or other such mechanism. The system 200 pushes the data files to the downstream system. The file creation process executes for example once a day in the illustrated embodiment, but file creation may be controlled through user-specified parameters. The collected files are stored into a dedicated directory on the local file system.

The following exemplary pseudocode describes the process for creating reports. Although each report executes independently in its own scheduled task, they comply with the following logic.

```
Lb_GetControlDates {Report Type, Division} {
    Get the control dates from the control table.
    If this is for a daily report then
        If the REPORT_PERIOD for the latest LAST_RUN is less than today's day,
            Return the REPORT_PERIOD value
        Else
            Nothing to process
    Else
        If the REPORT_PERIOD for the latest LAST_RUN is less than today's month,
            Return the REPORT_PERIOD value
        Else
            Nothing to process
    End If
}
Lb_UpdateControlDates {Report Type, Division} {
    If this is a daily report, Add 1 to the REPORT_PERIOD field.
        If the REPORT_PERIOD field is greater than the end of the month being processed
            Set REPORT_PERIOD to 1
        End If
    Else
        If this a monthly report, Add 1 to the REPORT_PERIOD field.
            If LAST_RUN field is greater than 12, then set REPORT_PERIOD to 1
        End If
    End If
Insert new entry in the control table with the correlator name,
division that was processed, sysdate for the last run, the
type of report being processed, the parameter for this report
and the completed REPORT_PERIOD
}
Lb_ProcessRecords {Recordset} {
    For all the records do
        If records does not have a header
            Write record in report format.
        Else
            Write header with header information off the record set.
            Write detail off the detail information off the record set.
        End If
    Next
}
Lb_GetRecords {Control period, Division} {
    If this is for a daily report then
        Select the record for the specific report for the day plus 1 returned
        by the control table.
```

```
        Else
                Select the record for the specific report for the month
    plus 1 by the
                control table.
        End If
        Return the records that were returned by the database
}
Eh_CreateReport {
    Control period = Lb_GetControlDates (Report Type, Division)
    If there is something to report on then
        Open a new report file for the division and report type
        Recordset = Lb_GetRecords (Control period, Division)
        Status= Lb_ProcessRecords (Recordset)
        Lb_UpdateControlDates (Control period, Division)
        Flush and close report file
    End If
}
```

© Copyright 2009-2010 Time Warner Cable, Inc. All rights reserved

VI. Reporting—

One of the salient functions of the SDA/AM 203 is to provide a reporting infrastructure (based on the data collected from the devices that provide usage—namely the SDV tuning events, Video On Demand Events and Ad Plays). All the processed usage is stored in a separate entity, called the SDA instance 203, that is used exclusively for the purpose of reporting. The SDA instance 203 also hosts the reference data needed for creating ad hoc reports that are used to describe the subscriber behavior to programs, video or advertisement. All reports are in the exemplary embodiment available for view for 90 days, although other periods may be specified.

For the purposes of delivery, the following reports are supported at a minimum: (i) "obtain second-by-second view of household viewership", (ii) "obtain second-by-second view of household commercial viewership", and (iii) "obtain view of VOD consumption". Each of these reports is constrained by the following attributes where appropriate:

Subscriber Service Region
Media Sale Regions
Newtork(s)/Broadcasting Network
Day Part
Program (irrespective of network)
Length of program
Advisory Rating
AS (e.g., Mystro) Rating
Star Rating
Genre(s)
Zip Codes (or groups)
DMA
Ad Zones (or groups)
Single Anonymous Household
Settop Type
Settop Capabilities
Settop Activities (Namely, recorded programs)
Prizm Code
CPE Authorization
Household Service Mix
    The Household has video
    The Household has HSD (high speed data)
    The Household has Voice (e.g., VoIP)

The above attributes are able to be combined, thereby providing a means of segmenting the reporting data. All data provided is also optionally made available through an MSO secure website, and available for download.

Obtain Second-by-Second View of Household Viewership—

The goal of the "second by second view" of the viewership records is to be able to query the database with a specific time period, division identifier and service name. The system returns a list of records containing the requisite information. An exemplary embodiment of a household viewership report is illustrated in the table of Appendix BJ of previously incorporated U.S. Provisional Patent Application Ser. No. 61/260,346. The household viewership report may be built with the fields and tables described in the mapping table of Appendix BK thereof as well. These are collected from the SDA database instance, in that it is dedicated for reporting.

Obtain Second-by-Second View of Household Commercial Viewership—

The goal of the "second by second view" of commercial viewership records is to be able to query the database with a specific time period, division identifier and service name in which a given commercial/advertisement copy was watched. The system returns a list of records containing the information outlined in the exemplary commercial viewership report such as that of Appendix BL of previously incorporated U.S. Provisional Patent Application Ser. No. 61/260,346. The report is organized by advertiser, creative and specific campaign. The report of Appendix BL may, in a further variant, be built with the fields and tables described in the mapping table of Appendix BM of previously incorporated U.S. Provisional Patent Application Ser. No. 61/260,346. These are collected from the SDA database instance. The constraints illustrated in Appendix BN of previously incorporated U.S. Provisional Patent Application Ser. No. 61/260,346 may be used to modify the previous query.

Obtain View of VOD Consumption—

One objective of the "VOD consumption view" is to be able to provide data on how subscribers view VOD assets. An exemplary VOD consumption report is shown in Appendix BO of previously incorporated U.S. Provisional Patent Application Ser. No. 61/260,346.

These records are in the exemplary embodiment correlated with the anonymous households, and obey the following constraints:

1. Total time in trick modes
2. Total number of trick modes events
3. Total time in fast forward
4. Number of specific fast forward events
5. Total time in rewind
6. Number of specific rewind events
7. Total time in pause
8. Number of specific pause events
9. Type of VOD (SOD, POD, VOD, Start Over, Quick Clips)

The above report may be built with the fields and tables described in the exemplary mapping table of Appendix BP of previously incorporated U.S. Provisional Patent Application Ser. No. 61/260,346. These are collected from the SDA database instance. The constraints illustrated in Appendix BQ thereof may be used to modify the previous query.

Reporting constrains these reports (via the above-listed constraints). The strategy for applying a constraint includes filtering the usage to one or more given constraint criteria. Exemplary reporting constraints for tuning events are given in the table of Appendix BR of previously incorporated U.S. Provisional Patent Application Ser. No. 61/260,346. Exemplary reporting constraints for VOD events are given in the table of Appendix BS thereof. Exemplary advertising event constraints are given in the table of Appendix BT thereof as well.

VII. Error Recovery—

Records that fail validation or business logic (discussed in greater detail below) are in one embodiment stored in error repositories in the system 200. Exemplary use and recovery disposition records are described in the table of Appendix BU of previously incorporated U.S. Provisional Patent Application Ser. No. 61/260,346.

The MSO provides facilities to keep the internal reference data current; however, in some instances, records fail because the data is inconsistent with the subscriber information or the network. To account for this case, the system 200 provides a recycling mechanism to reprocess records that could not find matching records.

Tuning records may in one embodiment be inserted into a tuning event table (e.g., BL_SDV_TUNLOG_TCP_TUN table) from the sources disclosed in the table of Appendix BV of previously incorporated U.S. Provisional Patent Application Ser. No. 61/260,346.

Figure 16:
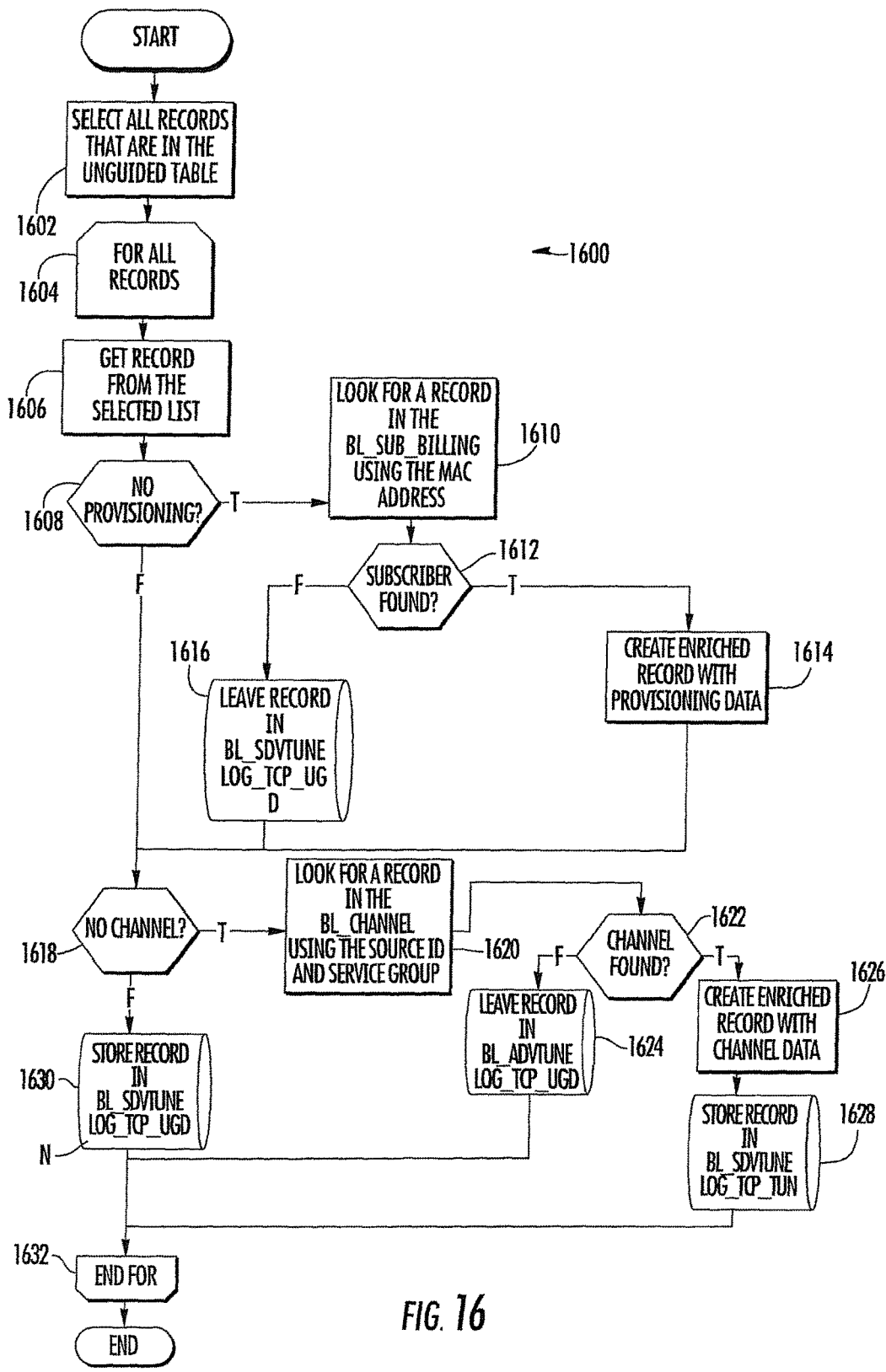
FIG. 16 is a logical flow diagram illustrating a method for recycling tuning events.
Figure 17:
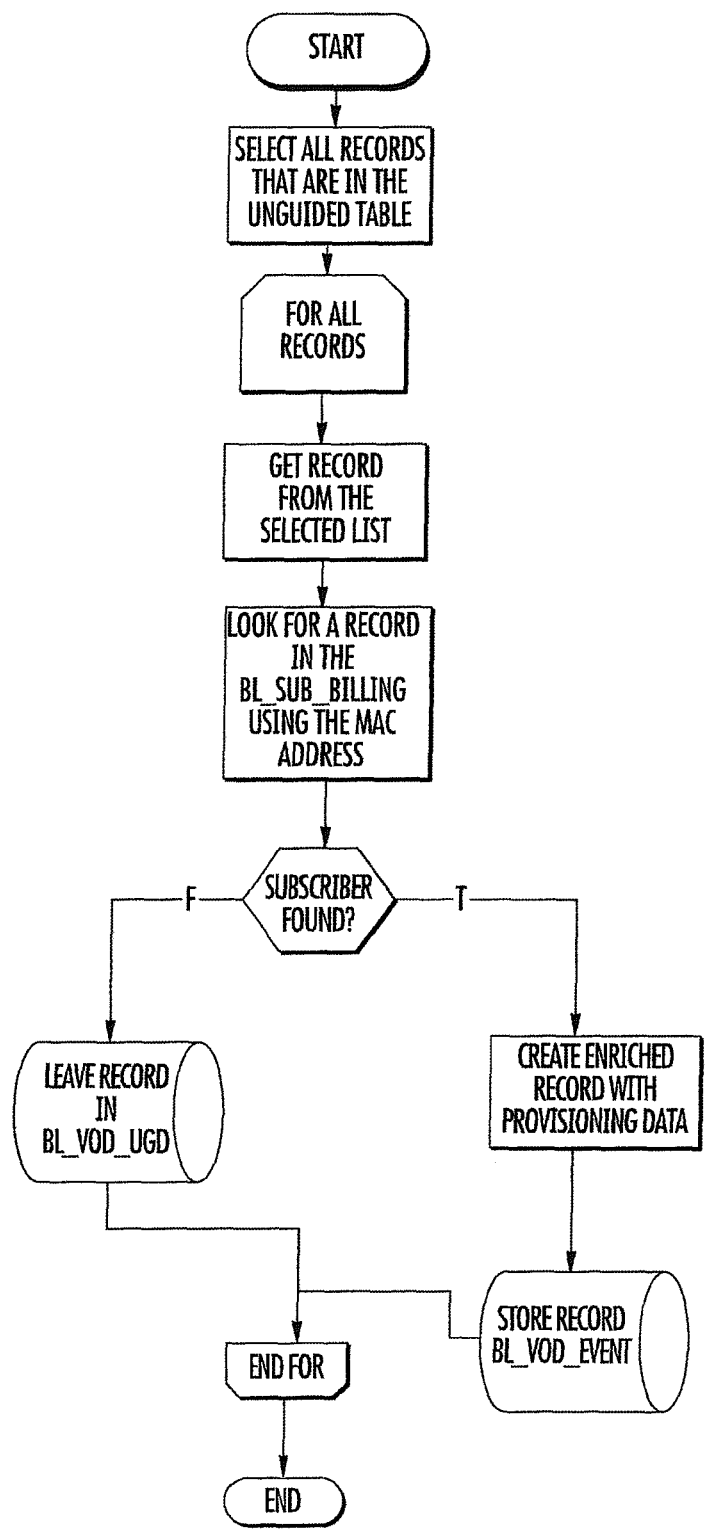
FIG. 17 is a logical flow diagram illustrating a method for recycling VOD events.

An exemplary method for recycling unguided tuning events according to the invention is illustrated in FIG. 16. Similarly, an exemplary method for recycling VOD events is illustrated in FIG. 17.

VOD records are inserted into the VOD event table (e.g., BL_VOD_EVENTS) from the sources disclosed in the table of Appendix BW of previously incorporated U.S. Provisional Patent Application Ser. No. 61/260,346.

Figure 18:
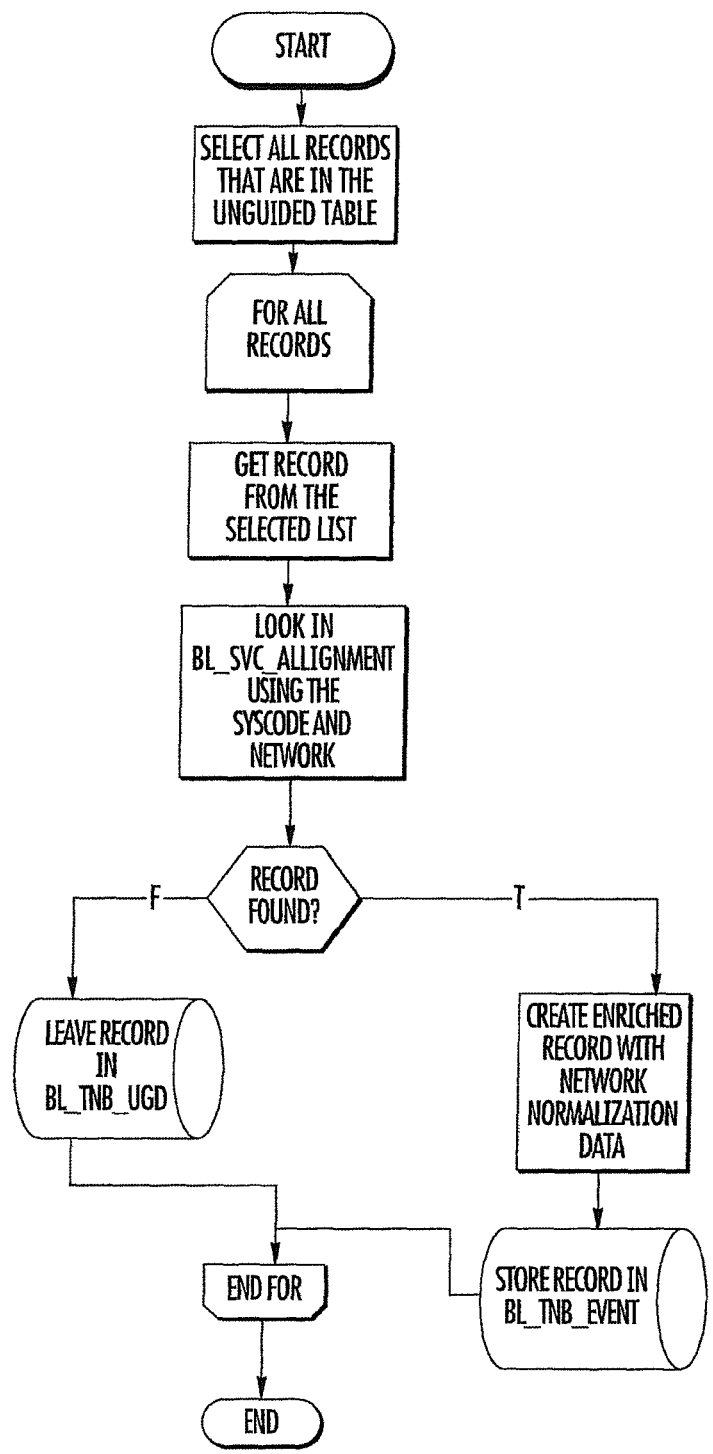
FIG. 18 is a logical flow diagram illustrating a method of recycling advertising events.

An exemplary method of recycling advertising events according to the invention is illustrated in FIG. 18.

Advertising event records are inserted into an advertising events table (e.g., BL_AD_EVENTS) from the sources listed in the exemplary table of Appendix BX of previously incorporated U.S. Provisional Patent Application Ser. No. 61/260,346.

Figure 19:
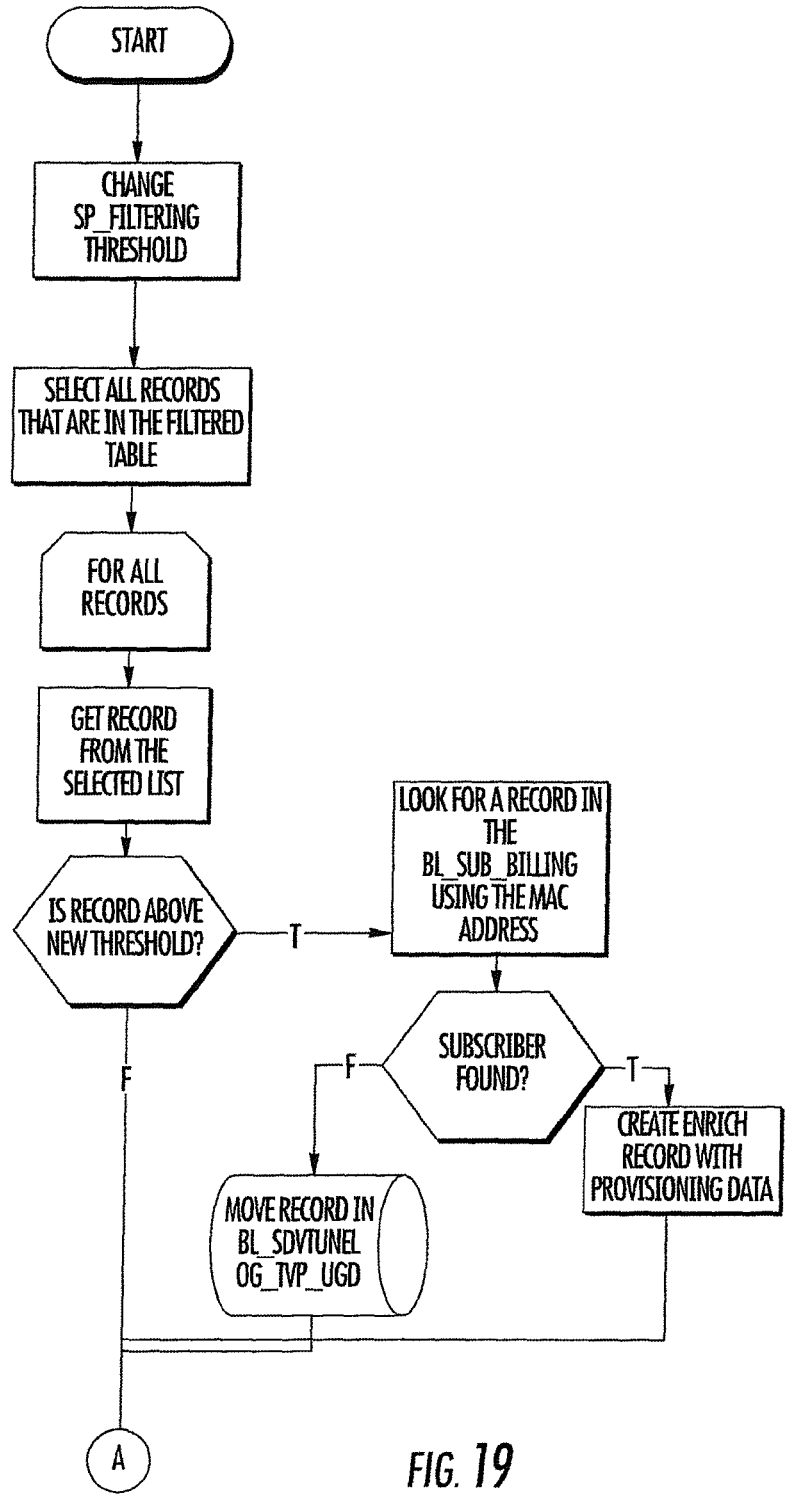
FIG. 19 is a logical flow diagram illustrating a method for recycling tuning filtered events.
Figure 19:
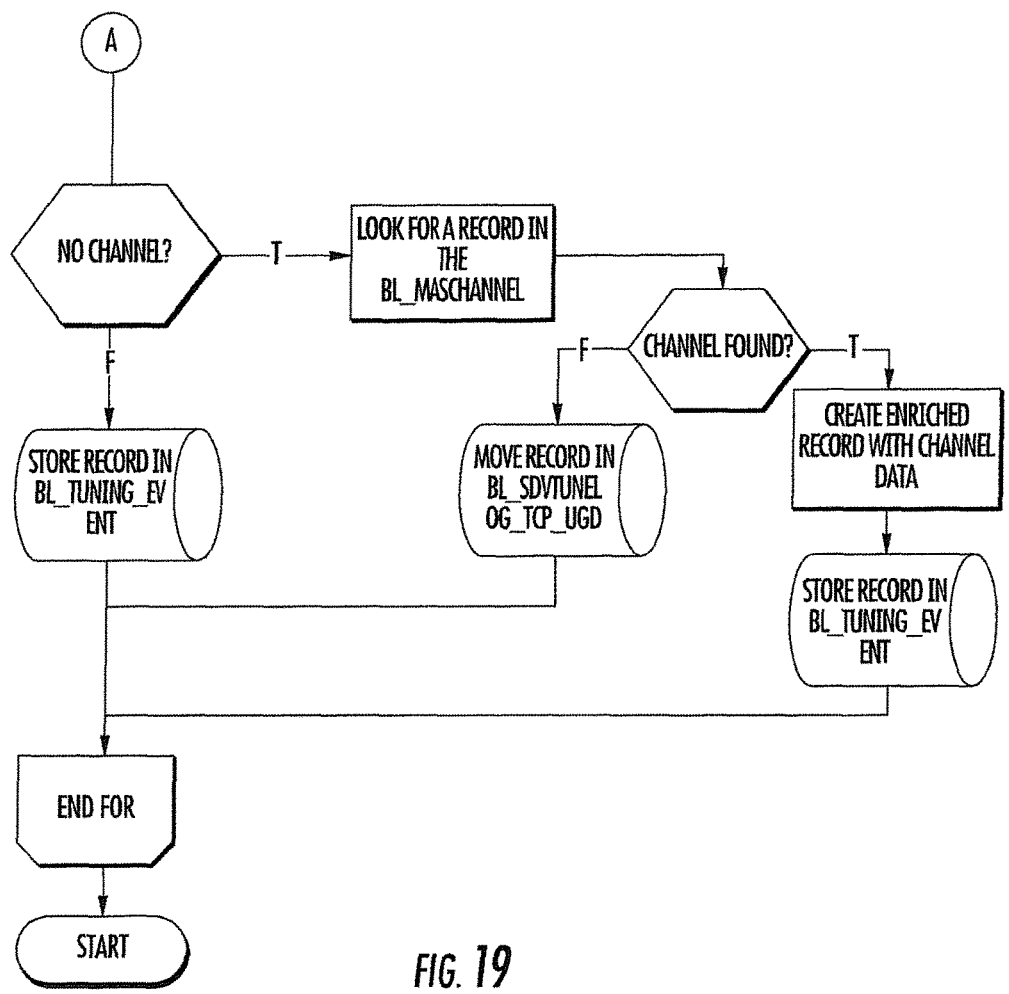

An exemplary method for recycling tuning filtered events is illustrated in FIG. 19.

Tuning filtered events are inserted into a filtered tuning event table (e.g., BL_SDV_TUNLOG_TCP_TUN table from the sources listed in the exemplary table of Appendix BY of previously incorporated U.S. Provisional Patent Application Ser. No. 61/260,346.

Application errors are logged in the existing system 200. These include processing errors, system warning and alerts. Exemplary types of errors are shown in Appendix BZ of previously incorporated U.S. Provisional Patent Application Ser. No. 61/260,346 are in one embodiment captured and reported.

Error codes such as those listed in Appendix CA of previously incorporated U.S. Provisional Patent Application Ser. No. 61/260,346 are added to the default error codes in the system 200.

VIII. Software Development—

Figure 20:
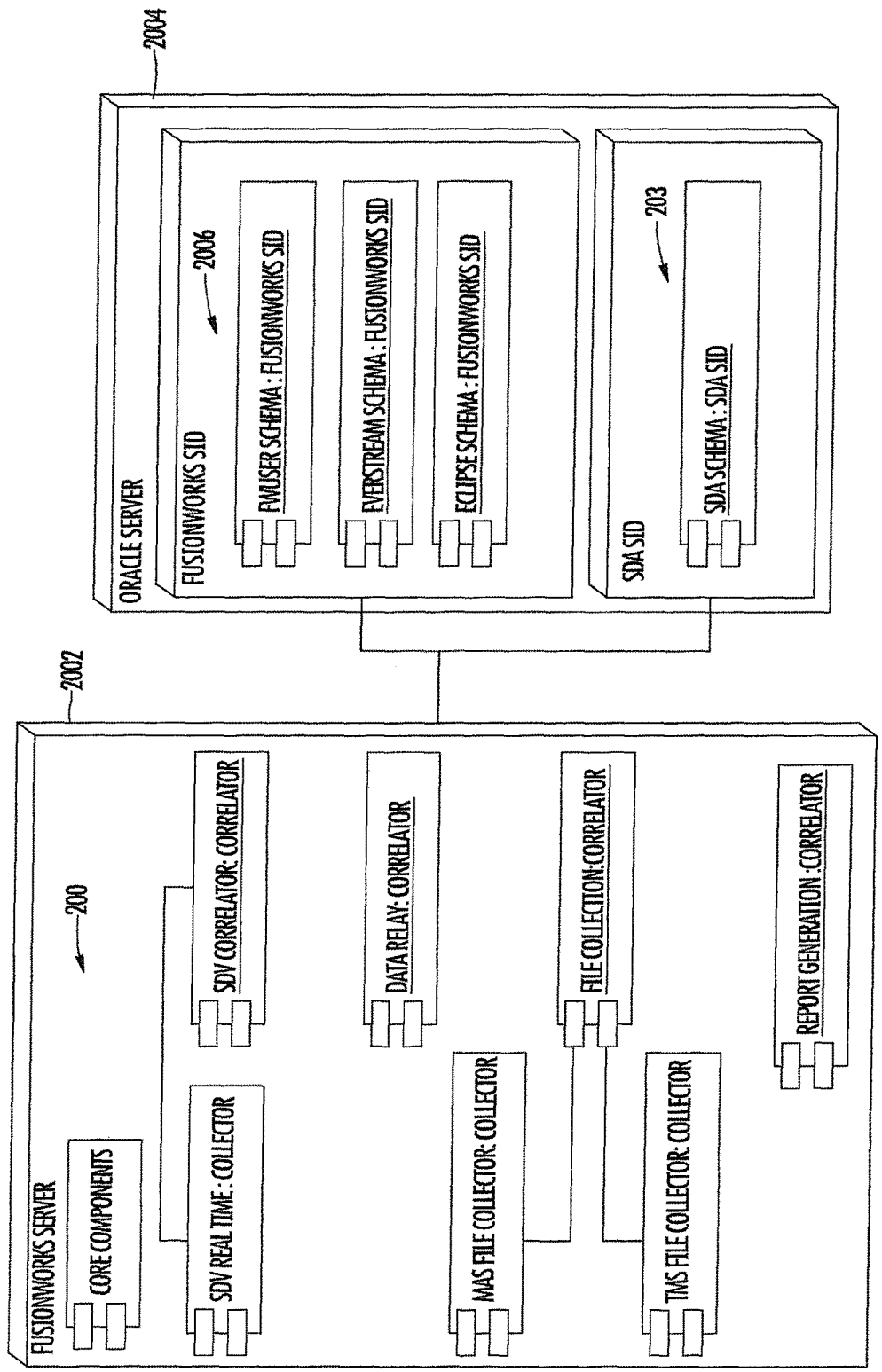
FIG. 20 is a block diagram illustrating an architecture for the interaction between the data collection system and SDA.

Referring now to FIG. 20, one exemplary implementation of an architecture for the interaction between the system 200 and SDA 203 is described. As illustrated, the architecture generally comprises first server(s) 2002 and a second server(s) 2004. The first server(s) 2002 comprises the various software and hardware components which collectively comprise the data collection system 200. The second server(s) 2004 comprises at least two functions: (a) a management function 2006 for managing the system 200 running on the first server 2002; and an analysis function (or SDA) 203 which analyzes collected data. In one embodiment, the second server(s) 2004 comprises an Oracle Relational Database Management System (RDMS), the management function 2006 and the SDA 203 running as Oracle Instances thereon.

The management function 2006 of the second server(s) 2004 is used to manage the system 200 including, e.g., advertisement play data from the advertisement data collector 210 and the VOD data from VOD collector 211. The SDA 203 function provides analytics and reporting, as well as providing files to NCC and other entities (e.g., integration partners). Detail on implementation of these components is provided elsewhere herein.

In one embodiment, the first server 2002 comprises a single server dedicated to hosting the data collection system 200 processing. In other words, according to this embodiment, all of the components of the system 200 reside at the operating system level. The system 200 components, such as those listed in the table of Appendix CB of previously incorporated U.S. Provisional Patent Application Ser. No. 61/260,346, may be created and deployed in one such implementation.

IX. Statistics—

Collection and output file statistics are collected by a manager entity of the system 200 with the relevant semantics according to the records being processed or files being delivered. In one embodiment, the statistics are developed using an Openet FusionWorks Statistics Manager Version 2.0, and using the facilities delivered within the collection system 200. By using the framework, business logic compliance with current and future releases of the data collection system 200 is advantageously assured.

Collection statistics are collected and stored using the aforementioned manger (such as e.g., the Statistics Manager from SDL 2.0). Each collected file from the network elements has statistics such as those listed in the table of Appendix CC of previously incorporated U.S. Provisional Patent Application Ser. No. 61/260,346 collected (per file), and are given a definition in SDL. Output file statistics (or file level statistics) are also collected and stored for all generated downstream files. The collected output files have, in one embodiment the definition discussed in Appendix CD of previously incorporated U.S. Provisional Patent Application Ser. No. 61/260,346.

X. Archiving—

Input files, as collected, are stored into a dedicated directory on the local file system. In one embodiment, input files are stored for e.g., 90 days, after which they are deleted. Files that are older than this specified age are deleted from the system (e.g., on a daily basis or some other specified periodicity).

Once a file is parsed successfully, the file is moved to an archive directory specified in the collector configuration. An exemplary archive directory may be for example of the form:

/u01/m01/archive/input/<collector name>

Once output files are delivered to the downstream systems, they are stored into a dedicated directory on the local file system. In one embodiment, output files are stored for 90 days, after which they are deleted.

Once a file is transferred successfully, the file is moved to an archive directory specified in the collector configuration parameter "sp_downstreamArchiveDir", for example:

/m01/u02/archive/downstream/<collector name>.

Exception (error, filter & duplicate) files are stored into a dedicated directory on the local file system. Exception files are, in one embodiment, stored for 90 days after which they are deleted, Once a file is parsed successfully, all downstream and exception files are completed. If exception files were produced, these files are moved to an archive directory specified in the collector configuration parameter "sp_exceptionArchiveDir", for example:

/m01/u02/archive/exception/<collector name>,

XI. Collector—

Figure 21:
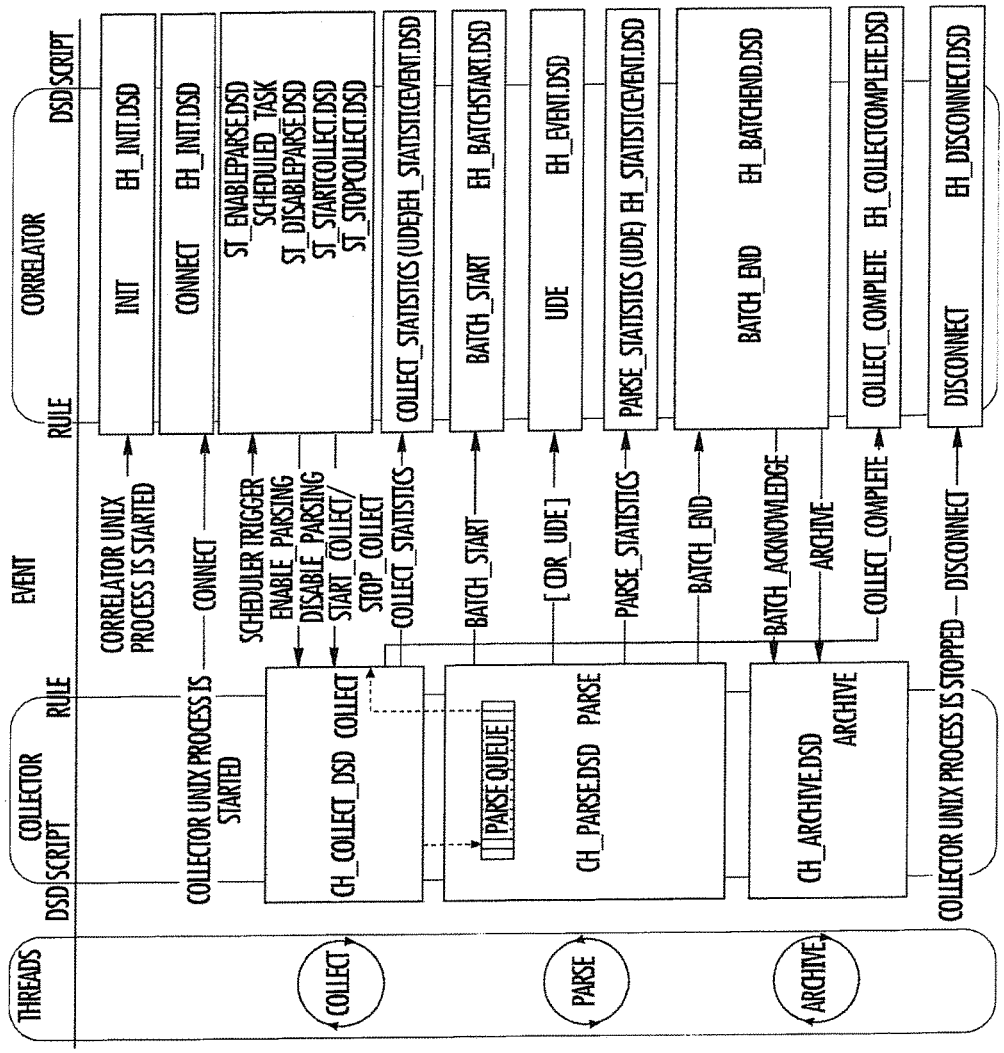
FIG. 21 illustrates interaction between a collector and other components within the data collection system.

FIG. 21 illustrates an exemplary interaction between a collector and other components within the system 200. The event flows of FIG. 21 show the interaction between the collector and correlator and the events being passed between them.

XII. Business Logic—

The business logic for the subscriber details collector 206, AS collector 210, and/or EPG data collector 214 are implemented, in one embodiment, utilizing the logic illustrated in FIG. 21. The business logic implements rules for the following functions:

Connect
Collect_Statistics
Collect_complete
Batch_start
UDR UDE
Parse_Statistics
Batch end
Disconnect Exemplary rules for the above business logic are given in Appendix CE of previously incorporated U.S. Provisional Patent Application Ser. No. 61/260,346.

XIII. Database Objects—

The system 200, in one embodiment, uses the aforementioned Oracle RDMS for processing and storing configuration information. The Database Objects and its design are described in greater detail subsequently herein.

XIV. Reference Data Loading—

Data that is considered static is loaded directly into the SDA instance 203 through e.g., the use of a loader entity or through direct insertion. In one embodiment, the loader entity comprises an Oracle SQL Loader, and/or the direct insertion occurs via SQL*PLUS. Data is then managed by an operator as needed. A plurality of tables (discussed below) are created and data loaded from the described source into the created tables. If the source is delivered through a spreadsheet, the operator either converts the spreadsheet to a comma separated value file that can be conveniently loaded through the loader entity or may be entered by hand as needed.

A SYSCODE to ZIPCODE table (e.g., AM_SYSCODE_ZIPCODE) is used to map SYSCODES from advertisement plays to zip codes. An exemplary schema for the SYSCODE to ZIPCODE table is illustrated at Appendix CF of previously incorporated U.S. Provisional Patent Application Ser. No. 61/260,346. In one embodiment, SYSCODE data is delivered in an MSO SDA 203 spreadsheet on the SYSCODE-ZIPCODE work sheet. The schema (Appendix CF) matches the spreadsheet fields' layout, thereby enabling it to be exported to CSV (comma-separated values) and loaded into the SYSCODE to ZIPCODE table. It is noted that the CSV is a simple file format that can be imported/exported between, for example, Microsoft® Excel and data tables.

A DIVISION-to-DMA table (e.g., AM_DIV_DMA) is used to map a DIVISION to a Nielsen Designated Market Area (DMA). The DIVISION to DMA table also contains the SYSCODE that belongs to a DMA. An exemplary schema for the DIVISION to DMA table is illustrated at Appendix CG of previously incorporated U.S. Provisional Patent Application Ser. No. 61/260,346. The DIVISION data is delivered in the MSO SDA 203 spreadsheet on a DIV_DMA work sheet. The schema (Appendix CG) matches the spreadsheet fields' layout and it can be exported to CSV and loaded into the DIVISION to DMA table. Division names that have a "Contracted" appended are first processed to have the "–Contracted" tag removed.

A division translation table (e.g., AM_DIV_REG_MAP, or AM_DIV_TRANS) contains division and region codes for all divisions. An exemplary schema for the translation table is illustrated in Appendices CH and CI of previously incorporated U.S. Provisional Patent Application Ser. No. 61/260,346. The translation map is used to translate different nomenclatures among systems. The data is collected from several sources and consolidated into the translation table. In one embodiment, data is collected from the MAS, Cable Track Spreadsheet, ICOMS division list, and/or the geography data table. The spreadsheet illustrated in Appendix CJ of previously incorporated U.S. Provisional Patent Application Ser. No. 61/260,346 is an exemplary entry in the division translation table.

An equipment table (e.g., AM_EQUIPMENT, or AM_AD_ZONE_SYSCODE) is used to store information regarding each of a plurality of equipment types useful with the present invention. An exemplary schema for the equipment table is illustrated in Appendices CK and CL of previously incorporated U.S. Provisional Patent Application Ser. No. 61/260,346. As shown the table contains equipment data and peculiarities. The equipment data is collected in spreadsheets and entered (either manually or automatically) into a worksheet. In one embodiment, the data is entered by hand from the STBs—Feature Spec Breakdown.xls.

An advertisement server alignment table (e.g., BL_SVC_ALIGNMENT) is used to determine the service in which an advertisement event was placed. An exemplary schema for the advertisement server alignment table is illustrated in Appendix CM of previously incorporated U.S. Provisional Patent Application Ser. No. 61/260,346. This advertisement server table is, in one embodiment, built by hand and managed by an operator. The data for the advertisement server alignment table is collected in spreadsheets which are entered (manually or automatically) from the MSO SDA 203 worksheets. The fields of the advertisement server alignment table may be populated as illustrated in Appendix CN of previously incorporated U.S. Provisional Patent Application Ser. No. 61/260,346.

A geographic alignment table (e.g., AM_GEO_ALIGNMENT, or BL_GEO_ALIGNMENT) is used to place an advertisement event into a specific geographic location. The geographic alignment table is, in one embodiment, built by hand and managed by an operator. An exemplary schema for the geographic alignment table is illustrated in Appendix CO of previously incorporated U.S. Provisional Patent Application Ser. No. 61/260,346. The data entered into the geographic alignment table is collected in spreadsheets and entered (by hand or automatically) from the MSO SDA 203 worksheets. An exemplary spreadsheet description is illustrated in Appendix CP of previously incorporated U.S. Provisional Patent Application Ser. No. 61/260,346.

A time zone table (e.g., AM_TMSTIMEZONE, or TMSTIMEZONE) is used for time zone determination. The content of the time zone table is loaded directly into SDA 203 using a loader entity (such as the aforementioned SQL*LDR). An exemplary schema for the time zone table is illustrated in Appendix CQ of previously incorporated U.S. Provisional Patent Application Ser. No. 61/260,346. In one embodiment, the time zone table has the dimension used by the TMS tables for time zone determination. According to this embodiment, data is directly loaded from the timezonerec.txt delivered by TMS using SQL*LDR.

A TMS translation table (e.g., AM_TMSTRANSLATION or TMSTRANSLATION) may be utilized in the instance data is received from a TMS entity. The TMS translation table translates words that are commonly used in TMS. The content of the TMS translation table is loaded directly into SDA 203 using SQL*LDR. An exemplary schema for the TMS translation table is illustrated in Appendix CR of previously incorporated U.S. Provisional Patent Application Ser. No. 61/260,346. Data is directly loaded to the TMS translation table, in one embodiment, from the statrec.txt delivered by TMS using SQL*LDR.

A demographic table may be utilized to match zip codes to generalized demographic description of the area. In one embodiment, the table may utilize Prizm® market segmentation data, e.g., generate an AM_PRIZM_ZIP4 table. The content of the demographic table is loaded directly into SDA 203 using a loading entity (such as e.g., SQL*LDR). An exemplary schema for generating a demographic table is given in Appendix CS of previously incorporated U.S. Provisional Patent Application Ser. No. 61/260,346. Data may be directly loaded from the ZIP4_PNE delivered by TMS using SQL*LDR to generate the aforementioned demographic data table.

In another embodiment, the demographic table comprises an AM_PRIZM_ZIP table, which uses a shortened ZIP code (i.e., without the additional four digits). An exemplary schema for generating a demographic table is given in Appendix CT of previously incorporated U.S. Provisional Patent Application Ser. No. 61/260,346.

A Mystro Digital Navigator identification table (e.g., BL_STB_FIRMWARE) may be used to match a given MAC address to its respective firmware in one embodiment. Appendix CU of previously incorporated U.S. Provisional Patent Application Ser. No. 61/260,346 illustrates exemplary schema for the MDN identification table.

There are two files which are used in the exemplary embodiment to populate the MDN identification table: lch-mdn-macs.txt.gz, and lch-odn-macs.txt.gz. One file includes the MAC addresses that belong to MDN CPE and the other one the addresses for the ODN.

Exemplary file formats managed through the collectors (202, 204, 206, 208, 210, 212, and 214) are described in Appendix CV of previously incorporated U.S. Provisional Patent Application Ser. No. 61/260,346. File formats for reference data and database tables that are used for collection are described in the below.

Table 1 of Appendix CV shows exemplary file formats for SDV tuner events. Tables 2-4 illustrate exemplary file formats for AS services records, line-up and channel records, respectively. Tables 5-6 illustrate exemplary file formats for EPG schedule records and programming records, respectively. Tables 7-8 illustrate exemplary file formats for subscriber billing and details records, respectively.

XV. Audience Measurement Interface—

A specific interface for retrieving Audience Measurement events from sample data sets prior to the transmission to the SDA 203 is discussed herein. Three types of data are collected via the interface: (i) household data, (ii) channel information, and (iii) tuning data. In general, data is presented in pipe delimited files to a read-only SFTP site to which parties with whom the MSO has completed the proper commercial and privacy agreements are given access.

Reference File—MAS Service Information

The exemplary MAS service information reference file is one of two files used to correlate a station identification (STATION_ID) in the STATION SUMMARY table to a TMS station identification (TMS STATION ID) for generic correlation of anonymous viewing across MSOs. The MAS service information reference files are delivered on e.g., a daily basis. MAS service information reference files are, in one embodiment, in the following format:

AM_NCC_MAS_SERVICE_[DIVISION]_[DATE]_[FILE_CREATE_DATETIME].dat

The data within the file is formatted as follows (all fields are present, but some may be blank): DIVISION_CODE|GUIDE_ID|. Exemplary MAS service information reference file data descriptions are illustrated by Appendix CW of previously incorporated U.S. Provisional Patent Application Ser. No. 61/260,346, Reference File—TMS Station Information This TMS station information file is the second of the two files used to correlate a station identification (STATION_ID) in the STATION SUMMARY table to a TMS station identification (TMS STATION ID) for generic correlation of anonymous viewing across MSOs. In one embodiment, the TMS station information file is delivered on a daily basis. TMS station information files comprise the following format:

AM_NCC_TMS_STATION_[DIVISION]_[DATE]_[FILE_CREATE_DATETIME].dat

The data within the file is formatted as follows (all fields are present, but some may be blank):

STATION_NUM|STATION_TIME_ZONE|STATION_NAME|STATION_CALL_SIGN|.

Appendix CX of previously incorporated U.S. Provisional Patent Application Ser. No. 61/260,346 illustrates exemplary TMS station information reference file data descriptions.

Reference File—Universe Data

Universe data is refreshed on a daily basis in one embodiment. The universe data reference file comprises the following format:

AM_NCC_UNIVERSE_[DIVISION]_[DATE]_[FILE_CREATE_DATETIME].dat

The data within the file is formatted as follows (all fields are present, but some may be blank): # CABLE HOMES HH|# DIG HH|ZIP|. Exemplary universe data reference file data descriptions are illustrated in Appendix CY of previously incorporated U.S. Provisional Patent Application Ser. No. 61/260,346.

Household Summary Data

Household summary data is in one embodiment, refreshed on a daily basis. Household summary data is in a file with the format:

AM_NCC_HOUSEHOLD_SUMMARY_[DIVISION]_[DATE]_[FILE_CREATE_DATETIME].dat

Here, the DIVISION symbol is the name of the division (e.g. Charlotte); DATE represents the date of the file in the format YYYYMMDD; and FILE_CREATE_DATETIME is the date and time when the file was created. The data within the household summary data file is formatted as follows (all fields are present, but some may be blank):

HH GUID|HH REGION|HH ZIP|HH_RETAILUNITCODE|VIDEO INSTALL DATE|HH HAS PHONE|PHONE INSTALL DATE|HH HAS HSD|HSD INSTALL DATE|HH HAS MOBILE|MOBILE INSTALL DATE|HH STB COUNT|HH PRIZM CLUSTER|.

Each data element may in one embodiment represent the data listed in the table of Appendix CZ of previously incorporated U.S. Provisional Patent Application Ser. No. 61/260,346.

The following rules are applied in one embodiment of the invention to household summary data:
1. A query is executed one time each day to collect this information
2. Tuning records that do not have HH GUIDs matching the data herein is discarded
3. No historical data is provided (history can be tracked in the destination system based on differences between days).

Household Detail Data

In one embodiment, household detail data is refreshed on a daily basis in a file with the format:
AM_NCC_HOUSEHOLD_[DIVISION]_[DATE]_[FILE_CREATE_DATETIME].dat
DIVISION is the name of the Division (e.g. Charlotte), DATE is in the format YYYYMMDD, and FILE_CREATE_DATETIME is the date and time when the file was created. The data within the file is formatted as follows (all fields are present, but some may be blank):

| HH_GUID\|STB GUID\|STB INSTALL DATE\|STB IS HD\|STB IS DVR\|STB HAS PREMIUM VIDEO\|SVC TIER DETAIL\|TV CAPABLE\|ITV OPT IN\|. |
|---|

Each data element may in one embodiment represent the data in the table of Appendix DA of previously incorporated U.S. Provisional Patent Application Ser. No. 61/260,346.

The following rules are applied to household detail data:
1. The report is generated one time each day
2. Tuning records that do not have STB GUIDs matching the data herein is discarded
3. No historical data is provided (history can be tracked in the destination system based on differences between days).

Station Summary Data

Station summary data is refreshed on a daily basis in one embodiment. The station summary data is represented as follows:
AM_NCC_STATION_SUMMARY_[DIVISION]_[DATE]_[FILE_CREATE_DATETIME].dat
DIVISION is the name of the Division (e.g. Charlotte), DATE is in the format YYYYMMDD, and FILE_CREATE_DATETIME is the date and time when the file was created. The data within the file is formatted as follows (all fields are present, but some may be blank):

| STATION ID\|STATION LONG NAME\|RETAILUNITCODE\|CHANNEL NUMBER\|NUMBER PROGRAMS\|. |
|---|

Each data element may in one embodiment be represented by the table of Appendix DB of previously incorporated U.S. Provisional Patent Application Ser. No. 61/260,346.

The following rules relate to the service summary data:
1. A query is executed one time each day to collect this information
2. Tuning records that do not have STATION IDs matching the data herein are discarded Station Detail Data In one embodiment, station detail data is refreshed on a daily basis in a file with the format:
AM_NCC_STATION_DETAIL_[DIVISION]_[DATE]_[FILE_CREATE_DATETIME].dat
DIVISION is the name of the Division (e.g. Charlotte), DATE is in the format YYYYMMDD, and FILE_CREATE_DATETIME is the date and time when the file was created. The data within the file is formatted as follows (all fields will be present, but some may be blank): STATION_ID\|PROGRAM NAME\|DESCRIPTION\|START\|STOP\|GENRE 1\|GENRE 2\|GENRE 3\|GENRE 4\|GENRE 5\|IS FIRST RUN\|IS A PREMIERE\|IS A SPECIAL\|RATING\|. Exemplary data elements of the above format are illustrated in Appendix DC of previously incorporated U.S. Provisional Patent Application Ser. No. 61/260,346.

The following rules may be applied to the station detail data:
1. A query is executed one time each day to collect this information
2. Tuning records that do not have STATION IDs matching the data herein are discarded Tuning Data In one embodiment, tuning data is refreshed on a daily basis in a file with the format:
AM_NCC_TUNING_EVENT_[DIVISION]_[DATE]_[FILE_CREATE_DATETIME].dat
DIVISION is the name of the Division (e.g. Charlotte), DATE is in the format YYYYMMDD, and FILE_CREATE_DATETIME is the date and time when the file was created. The data within the file is formatted as follows (all fields will be present, but some may be blank):

| HH GUID\|STB GUID\|EVENT_TYPE\|STATION ID\|TUNER ID\|IS RECORDING\|IS PPV\|IS OD\|START\|STOP\|TUNE_OUT_TYPE\|. |
|---|

Each data element may in one embodiment represent the data listed in Appendix DD of previously incorporated U.S. Provisional Patent Application Ser. No. 61/260,346.

The following rules may be utilized for determining what constitutes a tuning event:
1. A Tuning Event is persisted when the MAIN tuner on a STB is tuned to the same channel for three consecutive seconds without interruption.
2. A Tuning Event is persisted when the PIP tuner on a STB is tuned to the same channel for three consecutive seconds without interruption.
3. A Tuning Event starts when a STB actively requests to view a channel.
4. A Tuning Event ends when a STB actively requests a different channel than the one which is currently streaming.
5. A Tuning Event ends when a STB enters a Standby state (the STB is actively turned off)
6. It is possible for a single STB to register two concurrent Tuning Events if the box is in both MAIN and PIP mode at the same time.

Advertisement Insertion Data

In one embodiment, advertisement insertion data is refreshed on a daily basis in a file with the format:
AM_ADS_[DIVISION]_[DATE]_[FILE_CREATE_DATETIME].dat
DIVISION is the name of the Division (e.g. Charlotte), DATE is in the format YYYYMMDD, and FILE_CREATE_DATETIME is the date and time when the file was created. The data within the file is formatted as follows (all fields will be present, but some may be blank):

SPOT_START_TIME|SPOT_END_TIME|SPOT_LENGTH|VERIFICATION_STATUS|CAMPAIGN_ID|CAMPAIGN_DESCRIPTION|CUSTOMER_ID|CUSTOMER_NAME|AGENCY_ID|AGENCY_NAME|COPY_ID|SPOT_TYPE_ID|AD_TYPE_ID|NETWORK_ID|RETAILUNITCODE|SYSCODE|STATION_ID|.

Each data element may in one embodiment be represented by the data in the table of Appendix DE of previously incorporated U.S. Provisional Patent Application Ser. No. 61/260,346.

The following rules may be utilized in delivering advertisement plays:
1. Only include in this extract records with a Verification Status of "aired"

VOD Data

VOD data is refreshed on a daily basis in a file with the format:
  AM_VOD_[DIVISION]_[DATE]_[FILE_CREATE_DATETIME].dat DIVISION is the name of the Division (e.g. Charlotte), DATE is in the format YYYYMMDD, and FILE_CREATE_DATETIME is the date and time when the file was created. The data within the file will be formatted as follows (all fields will be present, but some may be blank):

HH_GUID|STB_GUID|ASSET_ID|ASSET_TITLE|TIME_AFTER_MIDNIGHT|STREAM_START_TIME|STREAM_END_TIME|STREAM_DURATION|CALENDER_ID|TIME_ID|LAST_ERROR_CODE|HAS_ERROR|IS_MENU_STREAM|LAST_ERROR_DESC|PAUSE_VIEWING_SECS|FF_VIEWING_SECS|RW_VIEWING_SECS|NBR_OF_PAUSES|NBR_OF_RW|NBR_OF_FF|NBR_SESSIONS|NBR_COMPLETE_VIEWS|LAUNCH_CATEGORY|TV_RATING|MOVIE_RATING|POSTED_COST|ACTUAL_COST|

The data elements may in one embodiment be represented in the data of Appendix DF of previously incorporated U.S. Provisional Patent Application Ser. No. 61/260,346.

The following rules may be utilized to determine what constitutes a VOD report:
1. A VOD Report is the total number of seconds that a subscriber took to view a VOD asset either to (1) completion or (2) abandonment—the lease period expired before the view was complete.
2. A VOD Report may consist of multiple actual VOD sessions (e.g. if a subscriber stopped the VOD play to watch something else and returned to it later).
3. A subscriber may have viewed a particular VOD more than one time during a VOD Report (e.g. a subscriber may have watched a movie two times in its entirety during the lease window for the particular VOD.

XVI. Network Architecture—

Figure 22:
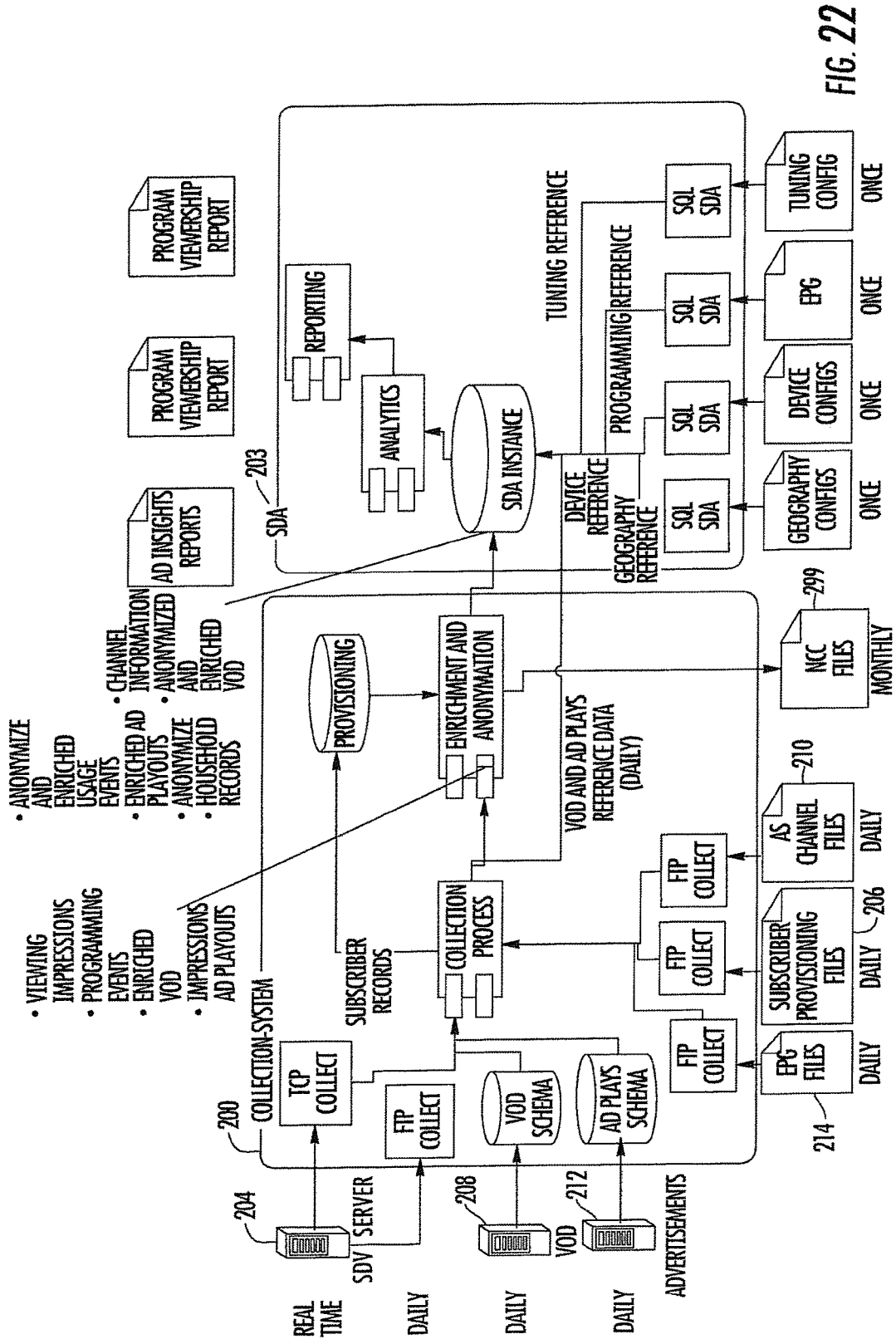
FIG. 22 is a block diagram illustrating a network architecture implementation for the data collection and data analysis systems.

Referring now to FIG. 22, another exemplary network architecture implementation for the data collection 200 and data analysis (SDA) systems 203 is given.

At the collection system 200, the collection measurements are based on the following attributes of the usage:
  Subscriber provisioned division
  Time spent in a particular stream.
  Service ID that identifies the channel being watched
  Advertisement spots that were played, detailing the Asset, Channel, date, start time and duration,
  Type of viewing (Picture in Picture, recording, live)

The customer/subscriber may perform the following usage scenarios:
  Watch a TV channel
  Watch a TV channel in which local advertisement is inserted.
  Record a TV show in an integrated DVR
  Watch a TV stream in a Picture in Picture window from two different sources
  Change Channels
  Turn the CPE on/off
  Disconnect the CPE
  CPE goes into a zombie status.
  Order and watch a video on demand
  Watch a TV advertisement In one embodiment, the record measurements are based on the following attributes of the usage as recorded by the SDA Instance:
  For each of above Use Cases, the user is able to constrain the output view via various elements. A constrained view is simply an aggregation of views based on a subset of the population that meets a particular set of constraints (e.g., number of people viewing between 4:00 PM and 6:00 PM with content that has an Advisory Rating of—TV-MA and a Star Rating of 4 stars). The list that follows specifies the various ways that a view must be constrainable (e.g., for July 2009). Note: Each Use Case may describe incremental constraint ability.

Video Regions
  Media Sales Regions
  Network(s)
  Daypart
  Program (irrespective of network)
  Length of program
  Advisory Rating(s)
  Mystro Rating
  Star Rating
  Genre(s)
  Zip Code (or groups thereof)
  DMA (or groups thereof)
  Ad Zone (or groups thereof)
  Anonymous Household
  Settop Type
  Settop Capability
  Settop Activities
    The program was being recorded on a DVR settop
    The program was being watched on multiple CPE in the household
  EPG Version
  Prizm Code
  CPE Authorization
  Household Service Mix
    Video Packages (e.g. has HBO, does not have Cinemax)
    HSD Packages
    Voice Packages
  Any Boolean combination of the above constraints Furthermore, the agency may perform the following usage scenarios:

Purchase an advertising window

Purchase targeted advertising spots for a specific demarcation zones.

Figure 23:
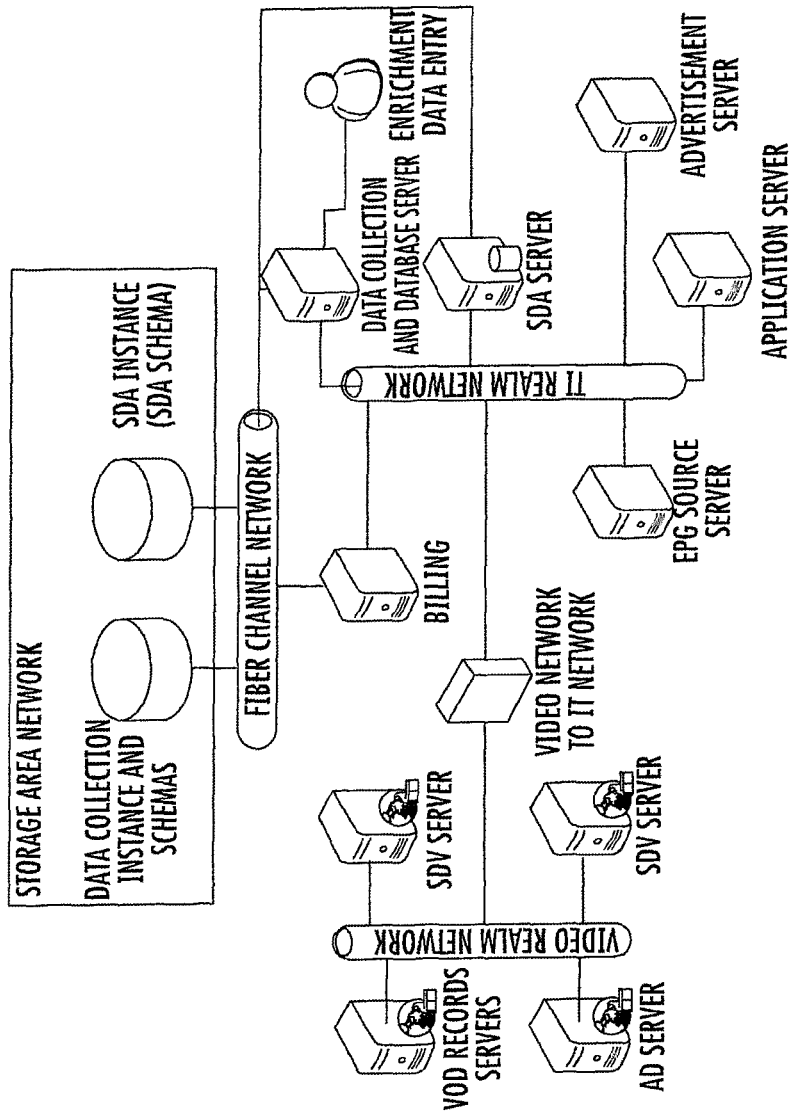
FIG. 23 is a block diagram illustrating another exemplary architecture for the collection and analysis of data.

FIG. 23 gives yet another exemplary architecture for the collection and analysis of data. The architecture generally comprises a server used to collect and modify the collected usage from the SDV, EPG and the advertisement data sources. The collected usage data is normalized, enriched and anonymized. There are two databases that are hosted at the second server (i) a mediation system and (ii) an SDA 203 system.

The SDV 203 server is used to collect tuning and streaming events. In one embodiment, the SDA 203 system comprises a Cisco SDV Server. These collected tuning and streaming events are used to, inter alia, identify user interactions with the network.

Advertisement data is collected from the network. In one embodiment, the advertisement data collector comprises an OpenTV Eclipse Logging Platform. The advertisement data collector is used to collect data about advertising spots that were successfully delivered, the time they were scheduled and the time they were aired. The collected advertisement data is correlated with the SDV server records and used to determine the number of users that watched in the reporting layer (SDA 203). The advertisement data collector delivers advertisement data through the network.

VOD records are also collected and delivered through the network. In one embodiment, the VOD records are collected from an Everstream collector. VOD records are correlated with the provisioning data in order to provide enriched records to the reporting layer (SDA 203).

The provisioning data is created from the billing systems for those divisions that are be handled by the system 200. In one embodiment, creation of the provisioning data occurs according to process similar to those used in digital phone or high speed data mediation.

The application server collects information including e.g., a master channel list and a description of the channel lineup.

The advertisement data source inserts advertisement into a television channel or program stream. Advertisement data records are collected by the advertisement data collector.

Appendix DG of previously incorporated U.S. Provisional Patent Application Ser. No. 61/260,346 illustrates exemplary collection interface which may be utilized with the present invention. Appendix DH thereof illustrates exemplary downstreams for use with the present invention.

XVII. SDV Collectors—

SDV collectors 204 are used for the collection of SDV data. In one embodiment, the SDV collector 204 comprises a Cisco SDV Collector. For example, there may be 8 instances of this server per cluster, 1 division to collect in total—7 are active, and 1 standby. Only tuner events are collected through the SDV collectors.

The instances naming convention is as follows:

<div>_SDV_<type>_<method>_<##>

In the above naming convention, they <div> symbol represents the division code, the _SDV_ is taken literally. The <type> symbol represents the type of collector (for example, TUN). The <method> represents the method of collection (for example, TCP) and the <##> symbol is a two digit identifier. A sample instance name is "B23_SDV_TUN_TCP_01".

Protocol—

The direct connection protocol is through a TCP/IP link. The system 200 acts as a TCP client that attaches to a SDV server port. In one embodiment, there are 5 server ports open per usage type, 15 in total per SDV. There is also a UDP multicast port available as well. Servers deliver records in Log 2 Format. Streamed content is collected in real time.

Collection—

Stream collection via the SDV collector 204 occurs according to the following steps:

Attach to the SDV server tuner event TCP port.

Read records that are being broadcasted at the TCP port.

Store stream in buffer if needed

Parse and process records from the stream.

Exception Handling—

The SDV TCP collector 204 maintains awareness of its connection status with the SDV server data source 207. If the connection between the SDV data source 207 and the SDV collector 204 is severed, the collector 204 records when the connection was severed and tries to reconnect with the SDV server 207. The collector 204 attempts a configurable number of times, defaulted to "infinity" in a configurable time interval. If the collector 204 reconnects, the collector 204 records the time in which it reconnected to the SDV data source 207 and continues processing.

Since the connection is unidirectional and the SDV server 207 does not have an internal buffer, it is assumed that the records that were not collected during the outage are lost. In one embodiment, the lost records are rebuilt later on using SDV logs.

Input Data Format and Archiving—

Collected files are encoded in plain text, comma separated value in Log 2 format. The record format is described in detail below. Streams are not archived.

Business Logic—

Figure 24:
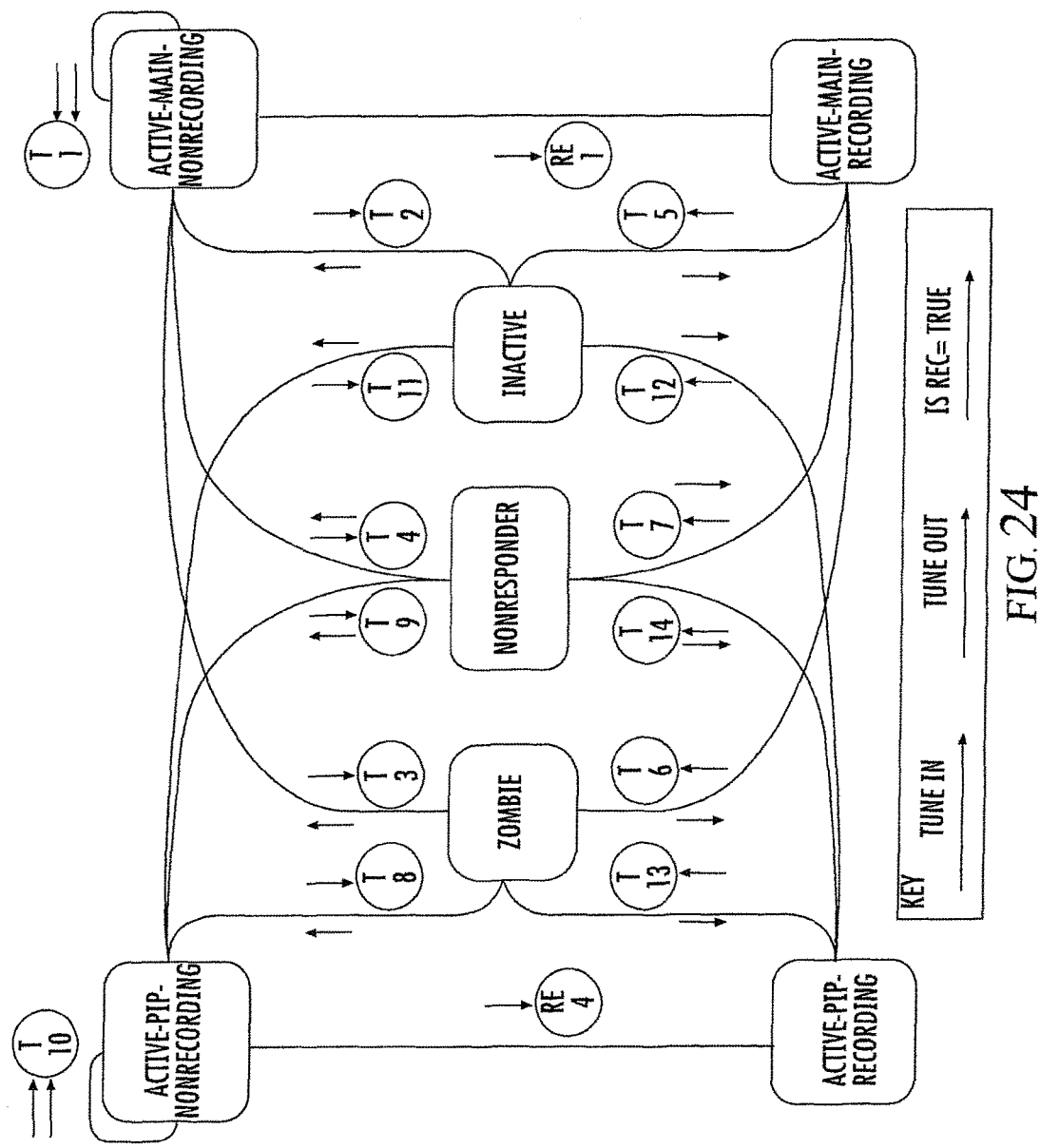
FIG. 24 is a state diagram illustrating the collected tuner events and state descriptions used to map viewing impression states.

The collected tuner events describe its state according to its "Event" and "Tuner Use" fields. These fields are used to map the viewing impression state as described in the state diagram of FIG. 24.

The tables of Appendix DI of previously incorporated U.S. Provisional Patent Application Ser. No. 61/260,346 illustrate exemplary tuning events interpretations.

Detecting Tuner Event States—

A method of detecting tuner event states according to the Log 2 specifications is now described.

Decoding

The system decodes the records based on the schema described herein below. Data from the tuner event feed is collected as received. Tuner events are decoded by interpreting the defined schema. SDV Sessions are created for each MAC Address, tuner identification number (tuner id) and tuner use combinations. Each of them is interpreted as an individual session. These SDV sessions provides the building blocks to create a viewing impression. The system supports tuning events from CPE having the ODN and the MDN firmware. The event field from the tuner event is used to determine the length and disposition of the tuning event.

One method for detecting an SDV session is discussed herein. TCP records are collected as they are streamed by the SDV server. For all collected tuner events. If the record is a SDV Event (Event Type=1) or Non SDV Event (Event Type=2) it is interpreted as the start of a SDV session for a specific CPE MAC Address, tuner number and tuner use. Continue traversing through the list until a terminating tuner event is found for the CPE MAC Address, tuner identification (tuner id) and tuner use initiated the tuner event. A tuner event that has one of these event types is considered to be a terminating event: Inactive (6), Program Not Found (7), Aged (3), Scheduled (4), Slated (5), Any Event Type but Tuner Use=Failure(128). If a terminating event has been found, the following information is stored for the purposes of completing the SDV session:

Previous Channel
Start Timestamp
End Timestamp
Duration between events.
Type of Event
Tuner Use Next, the SDV session is enriched with the provisioning data by e.g., using the MAC Address as a key. After the SDV session has been closed, continue creating SDV sessions for all incoming records as they are sent by the SDV server 207. The collection system 200 parses the tuner use bit flags according the Log 2 specifications. SDV sessions that are open but do not have a matching close impede the creation of a viewing impression, and thus are considered "zombies".

In one embodiment, the time that a given SDV session expires is configurable, and defaulted for 24 hours.

If an SDV session never finishes and a new SDV session starts for the same MAC Address, tuner identity (tuner id) and tuner use, the previous SDV session is closed with a potential zombie status. This situation can occur when a connection to the SDV server 207 is dropped and restored. SDV sessions are converted into viewing impressions that match the state diagram described in FIG. 24. These viewing impressions contain a field named "State Id" that is populated according to, for example, the conditions listed in the table of Appendix DJ of previously incorporated U.S. Provisional Patent Application Ser. No. 61/260,346.

Validation Logic

The system 200 validates that the usage follows the format described in elsewhere herein. In one embodiment, the same fields used for duplicate detection are validated.

Duplication Check Logic

The system 200 provides the ability to verify that SDV records are not a duplicate of any other raw usage records. The following records are used in one embodiment to detect duplicates: Date, Time, Event, UID/MAC, Source Id, and LUA.

Enrichment Logic

The system 200 enriches the provisioning data with the tuner events to obtain the household information. The system 200 anonymizes tuner records by converting the MAC address into a GUID according to the one or more anonymizing algorithms (discussed herein below).

The system 200 also enriches with the network data by selecting data from the master channel table. The result of the query is a unifying service identification number that is used to correlate the network information. The following steps are used in one embodiment to correlate a tuning event to the subscriber data:

Subscriber information is collected and stored for the purpose of determining the user demographics for a tuning event.

The system 200 uses the MAC address from the correlated viewing event, which was originally obtained from the tuner event, to search for a matching record in the collected provisioning feed.

If a match is found, the MAC address is anonymized and the enriched subscriber data is added to the viewing event. The following data items are added to the viewing event: Division, CPE ID, Zip Code, Anonymized MAC, and Anonymized User ID.

If a match is not found, the viewing impression is stored in an unguided table and reprocessed. When the record is reprocessed, the MAC address is anonymized and stored as a valid viewing impression. In one embodiment, Openet provides a configurable aging mechanism that is defaulted for 7 days.

Processed records are delivered to SDA according to the specifications described below.

The program name is obtained by correlating the source ID of the viewing event with the source ID of the programming event. The resultant correlation is the Service ID.

Filtering Logic

Records that the computed tuning duration is less than a configurable number of seconds, defaulted to one second are filtered. These records are processed and correlated with the programming and provisioning tables. At the end these records are anonymized. Records that were filtered because of a short duration have the ability to be reprocessed if needed. The duration criteria that is used for reprocessing is configurable and defaulted to one second.

Mapping Logic

Tuner, Programming and Stream events are staged in one embodiment. Viewing Impressions are mapped into a new table structure in the SDA-AM instance 203 that has the information used to describe for how long a subscriber has watched a program. These fields include:

Anonymized Customer Mac Address (CPE_GUID)
Anonymized Subscriber Account Number (CUSTOMER_GUID)
Tuner Number (From Mac Address, Tuner Number)
Start_Date ("Current Record Date/Time")
End_Date ("Last Record after all related tuning events have been added")
Total View Time (Duration)
Channel_ID (From Source ID correlating with Programming ID)
Division_ID (From correlation with subscriber data)
Previous Channel ID (Stored during process)
Is Recorded (From Tuner Use)
Is PIP (From Tuner Use)
Is PPV (From Tuner Use)
Source Id (From Source Id)
State Id (Computed)

Downstream

Downstreams will be discussed in greater detail subsequently herein.

XVIII. SDV Log Collectors—

The system 200 normally collects and processes SDV data from the TCP connection (discussed above). However, in case that the collector 204 disconnects, all records through that period will be lost. As a way of recovering these records, the collection system 200 also collects and processes SDV logs. The records collected from the SDV logs are used to rebuild lost TCP records. After the desired period has been recovered, the SDV log records can be disposed.

In one embodiment, The SDV collector 204 for log files comprises a Cisco SDV collector. In another embodiment, there are 8 instances of this server per division, 2 divisions to collect in total, 7 are active and 1 stand by.

The instances naming convention is as follows:
<div>_SDV_<type>_<method>_<##>

According to the above naming convention, the <div> symbol represents the division code, the _SDV_ is a literal, the <type> symbol represents the type of collector (such as e.g., TUN), the <method> represents the method of collection (such as LOG) and the <##> is a two-digit identifier. A sample instance name is "B23_SDV_PRO_LOG_01".

Collection Protocol—

In one embodiment, the log based collection protocol is FTP over TCP/IP link. Collection and delivery of the SDV Log files is handled by the collection system 200. The collection system 200 pulls those files from the SDV, and handles them internally by its collectors. Files are not compressed in the exemplary implementation.

Collection Frequency—

Log content is collected once every 24 hours. This is because log files at the SDV server close at the end of the day. The system 200 waits until the log files are closed before collecting them.

Collection File Naming Conventions—

The file naming convention on the remote host is as follows:

sdv_###.###.###.###_<type>YYYYMMDD

According to the given naming convention, the sdv_ symbol is a literal, ### symbols represent a number from 1-255, unpadded, the <type> symbol is the stream type (programs|streams|tuners) and the YYYYMMDD symbol represents the date by year, month and day. The following are examples of data filenames:

sdv_10.120.23.100_programs20091212
sdv_10.157.78.233 streams20081106
sdv_10.157.78.233_tuners20081109

Validation: Filename Duplication Check—

The period of time for duplicate check is a configurable parameter. Initially, in one embodiment, the system 200 may be configured to check duplicate files in the range of 1 to 5 days.

Collection Steps for File Collectors—

The following steps are performed by the system 200 once the files have been collected from the SDV data source 207:

Retrieve files from the SDV Server after they have been closed at midnight.
Files are moved to local AC directory
File duplicate check
Parse and process the files.
Raw records are stored.
Once a night a scheduled task determines if a TCP disconnect occurred during the day. This scheduled task reads the SDV server log records and re-creates the viewing events for the day.

Input Data Format—

File is encoded in plain text, comma separated value. It applies to both types of collectors. The record format is described in detail below.

Archiving—

In one embodiment, the system 200 maintains files in archive for a predetermined period (e.g., 7 days).

Business Logic—

The collected tuner events describe its state according to its Event and Tuner Use fields. These fields are used to map the viewing impression state as described in the state diagram of FIG. 25.

The tuning events are interpreted, in one embodiment, as illustrated in the tables of Appendix DK of previously incorporated U.S. Provisional Patent Application Ser. No. 61/260,346.

Detecting Tuner Event States—

A method of detecting tuner event states according to the Log 2 specifications is now described.

Decoding

The system 200 decodes the records based on the schema described below. Data from the tuner events is stored as read and not processed until a scheduled task executes to recreate any missing viewing events. These are sorted by user ID, tuner date and time. Tuner events are decoded according to the defined schema. Viewing impressions are created only for the records that were lost for the time that the collector was not receiving records from the SDV server 207. The connection lost may be more than once during the day. The system 200 recreates those records for each period.

The event field from the tuner event is used to determine the length and disposition of the viewing impression. These records are sorted in ascending order by date and time.

SDV sessions are created for each MAC address, tuner ID, and tuner use combinations. Each of them is interpreted as an individual session. These SDV sessions provide the building blocks to create a viewing impression.

The system supports tuning events from CPE having the ODN and the MDN firmware.

The method for determining viewing impressions in order to rebuild missing records is now discussed. First, the collected tuner events are sorted by user ID, Date and Time for the period that needs to be rebuilt. For all sorted tuner events. If the record is a SDV Event (Event Type=1) or Non SDV Event (Event Type=2) interpret it as the start of a viewing impression for a specific CPE GUID, Tuner Number and Tuner Use. Continue traversing through the list until a terminating tuner event is found for the CPE GUID, Tuner Id and Tuner Use that initiated the tuner event. A tuner event that has one of these event types is considered to be a terminating event: Inactive (6), Program Not Found (7), Aged (3), Scheduled (4), Slated (5), and Any Event Type but Tuner Use=Failure (128).

If a terminating event has been found the following information is computed for the SDV Session. This includes:
Previous Channel
Start Timestamp
End Timestamp
Duration between events.
Type of Event
Tuner Use After the SDV Session has been closed, continue traversing the list until a new SDV Event (Event Type=1) or Non SDV Event (Event Type=2) is found. This is repeated for all tuning events.

The system 200 parses the tuner use bit flags according the Log 2 specifications.

SDV Sessions that open but do not have a matching close for the period of the outage are terminated as inactive (6). This takes care of any inactive records that were disregarded during the TCP collection. The resultant records are the "raw" viewing impressions. All SDV sessions are stored and used for recovery purposes as explained below.

Figure 25:
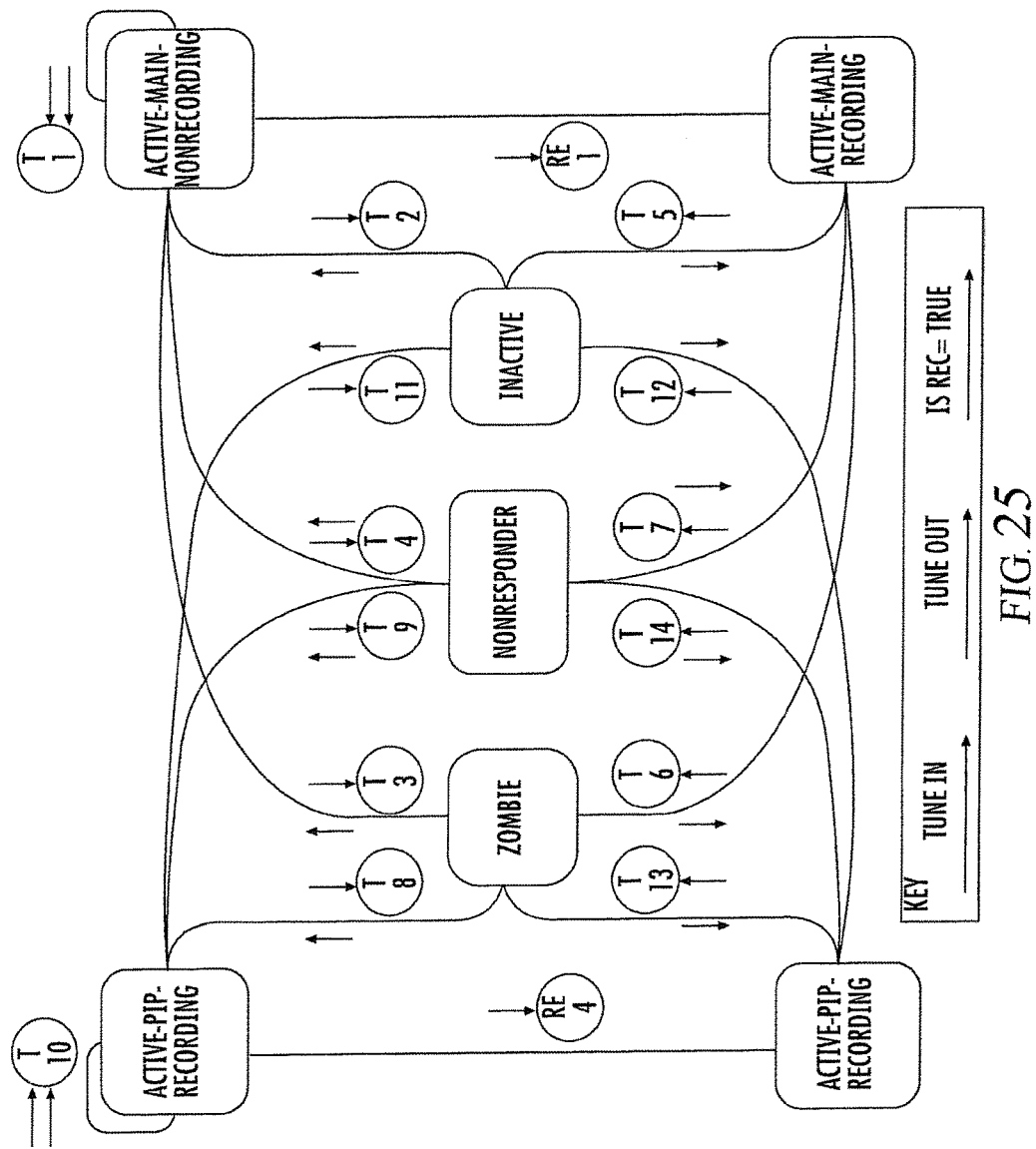
FIG. 25 is a second state diagram illustrating the collected tuner events and state descriptions used to map the viewing impressions states.

SDV sessions are converted into viewing impressions that match the state diagram of FIG. 25. These viewing impressions contain a State ID that is populated according to e.g., the conditions of Appendix DL of previously incorporated U.S. Provisional Patent Application Ser. No. 61/260,346.

Validation Logic

The system 200 stages the collected records. In one embodiment, the same fields used for duplicate detection are validated.

Duplication Check Logic

The system 200 provides the ability to verify that SDV records are not a duplicate of any other raw usage records. The following records are used to detect duplicates: Tuning Events, Date, Time, Event, UID/MAC, Source Id, LUA, Stream, Program Events, Date, Time, Event, Source, and Name.

Enrichment Logic

The tuning event is correlated with the master channel table to obtain the service. The network name and the service identity (Service ID) are appended to the viewing event.

While rebuilding viewing impressions, the user ID that was collected from the log is substituted by the one built by the TCP stream. The system 200 matches the viewing impressions that have been collected in both sources and maps the UID in the log with the GUID and provisioning data that was computed for the TCP feed and stored internally in a map. This map is used to enrich the GUID and provisioning data to those viewing impressions that are being rebuilt to fill in those that were missing when the connection was lost.

Filtering Logic

Tuning events are filtered; the filtering logic is discussed elsewhere herein.

Mapping Logic

Tuner, Programming and Stream events are staged. The correlated viewing events have a new table structure that has the relevant Tuner, Stream and Programming fields that are used to describe for how long a subscriber has watched a program. These fields include in the exemplary embodiment:

- Tuner Number (Tuner State)
- Start_Date ("Current Record Date/Time")
- End_Date ("Last Record after all related tuning events have been added")
- Total View Time (Duration)
- Channel_ID (From Source ID correlating with Programming ID)
- Division_ID (From correlation with subscriber data)
- Previous Channel ID (Stored during process)
- Is Recorded (From Tuner Use)
- Is PIP (From Tuner Use)
- Is PPV (From Tuner Use)

Subscriber related information is not collected because correlation is not possible until these records have been rebuilt. Rebuilt records are stored with the TCP collection tables.

Downstream

Records being collected through log are used for recreating records that were lost because the TCP stream was disconnected. See discussion below.

XIX. VOD Collectors—

VOD data is collected via one or more VOD collectors 208. In one embodiment, the VOD collector comprises an Everstream VOD collector. In another embodiment, there is 1 instance of the VOD collector 208.

The instances naming convention is as follows:
<div>_VOD_<type>_<##>

According to this naming convention, the <div> symbol represents the division code, the _VOD_ is a literal, the <type> symbol gives the type of file (e.g., ASSET|EVENT) and the <##> represents a two-digit identifier. A sample instance name is "B23_VOD_EVENT_01".

Collection—

The VOD data source (e.g., VOD server) 211 delivers usage through a database connection. The VOD server 211 inserts usage and data of interest in a database schema. The collection system 200 reads the usage and data of interest as delivered. VOD data may be delivered once a day.

The following steps are performed by the collection system 200 as part of VOD stream collection:

- Usage is delivered from the VOD server into a usage table in a specific schema.
- The data collection system 200 reads the data from the schema and manipulates the data according to these requirements.
- The manipulated data is stored for delivery to the SDA instance.

Input Data Format—

Collected data is stored at a storage entity (e.g., an Oracle table).

Protocol—

Collected data is delivered, in one embodiment, through SQL*NET.

Archiving—

The VOD data collector 208 follows archiving procedures and manages the schema used to deliver data to the collection system 200.

Business Logic—

Figure 26:
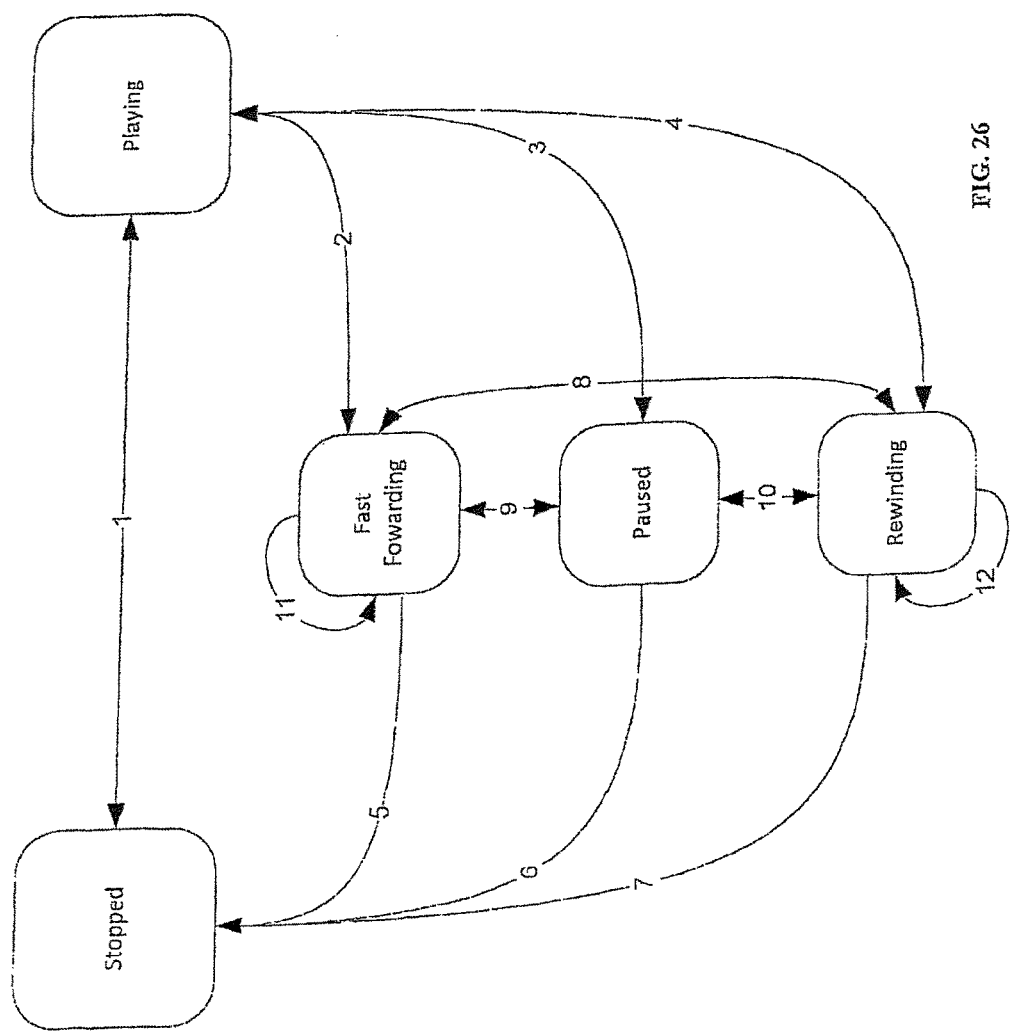
FIG. 26 is a state diagram illustrating the collected VOD events and state descriptions used to map the VOD state.

The collected VOD event describes its current state by its related trick mode fields. Exemplary trick modes include play, stop, fast forward, rewind and pause. These fields are used to map the VOD state as described in the state diagram of FIG. 26.

VOD Event Detection—

Exemplary VOD events are described in the table of Appendix DM of previously incorporated U.S. Provisional Patent Application Ser. No. 61/260,346.

A method discussing how the system 200 detects these states according to the values in their respective files is discussed herein.

Decoding

The system 200 decodes the records based VOD schema described herein below.

Validation Logic

The system 200 validates that the usage is based on the schema described below. The following tables are validated according to its data type definition:

- LOCATION
- ORGANIZATION
- EQUIPMENT
- VOD_LEASE
- VOD_STREAM
- VOD_ASSET
- VOD_ASSET_TITLE
- VOD_ASSET_TITLE_GENRE
- VOD_ASSET_COMP
- CALENDAR
- TIME_OF_DAY

Duplication Check Logic

The collection system 200 does not perform duplicate check logic. It is assumed that primary indexes have been already created for each of the tables that are delivered by the VOD collector 208.

Enrichment Logic

The collection system 200 reads the records from the collector 208 schema that is needed to create records into the SDA 203 VOD table. The system 200 is required to obtain records from the subscriber data to complete it.

The subscriber data is retrieved from the subscriber table by using the MAC address. It returns the subscriber account number that is used to create the delivery record. The MAC address and subscriber account number are anonymized by using the anonymization process described below. Records are mapped to match the SDA 203 VOD table. Processed records are delivered to SDA 203 according to the specifications described below.

Mapping Logic

VOD files are staged according to the layout as described below. Correlated VOD events have a new table structure that has the relevant VOD and subscriber fields. These are used to describe the viewing habits of a given VOD subscriber. The following fields are required to be mapped to the SDA VOD table:

Customer Guid (From Enrichment)
CPE Guid (From VOD Stream Table)
Division Id (From Enrichment)
Asset Id (From VOD Assets Table)
Asset Component Id (From Table)
Asset Component Num (From. Table)
Time After Midnight (From VOD Stream Table)
Stream Duration (From VOD Stream Table)
Lease Id (From VOD Lease Id)
Stream Start Date (From Calendar)
Stream Start Time (From VOD Stream Table)
Stream End Time (From VOD Stream Table)
Calendar Id (From VOD Stream Table)
Time Id From (From VOD Stream Table)
Last Error Code (From VOD Stream Table)
Has Error (From VOD Stream Table)
Is Menu Stream (From VOD Stream Table)
Last Error Description (From VOD Stream Table)
Pause Viewing Seconds (From VOD Stream Table)
Rewind Viewing Seconds (From VOD Stream Table)
Fast Forward Viewing Seconds (From VOD Stream Table)
Pause Count (From VOD Stream Table)
Rewind Count (From VOD Stream Table)
Fast Forward Count (From VOD Stream Table)
Service Group (From VOD Stream Table)
Launch Category (From VOD Stream Table)
Is Preview (From VOD Asset Title)

Downstream
  Downstreams are disclosed in greater detail subsequently herein.

XX. Advertisement Data—
  Advertisement data is collected from an advertisement data source 215 at an advertisement data collector 212. In one embodiment, the advertisement data collector 212 comprises an Eclipse server. In another embodiment, there is one instance of the advertisement data collector 212.

Collector Instance Naming Conventions—
  The instances naming convention is as follows:
    <div>_ADS_<##>
According to the given naming convention, the <div> symbol represents the division code, _ADS_ is a literal, and the <##> symbol is a two-digit identifier. A sample instance name is "B23ADS_01".

Collection—
  The advertisement data server 212 delivers usage through a database connection. The advertisement server 212 inserts usage and data of interest in a database schema. The collection system 200 reads the usage and data of interest as delivered. The advertisement data may be collected once a day.

Collection Steps for File Collectors—
  The following steps are performed by the collection system 200 once the files have been collected from the advertisement collector 212:
  Usage is delivered from the advertisement server into a usage table in a specific schema.
  The collection server reads the data from the schema and manipulates the data according to these requirements.
  The manipulated data is stored for delivery to the SDA instance.

Input Data Format—
  Advertisement data is stored in a storage entity. In one embodiment, the data is stored in an Oracle table.

Protocol—
  In one embodiment, data is delivered through SQL*NET.

Archiving—
  The advertisement collector follows its archiving procedures and manages the schema used to deliver data to the collection system 200.

Business Logic—
Decoding
  The collection system 200 decodes the records based on the schema described below.

Validation Logic
  The collection system 200 validates the collected records according to the schema described below. The following tables are validated according to its data type definition:
    INVOICE_DETAIL
    ADVERTISER
    CONTRACT
    COPY
    COPY_GROUP
    REGION
    HEADNET
    RETAIL_UNIT
    NETWORK
    PROGRAMS
    SPOT Duplication Check Logic
  The collection system 200 does not perform duplicate check logic. It is assumed that primary indexes have been already created for each table that is delivered by the advertisement data server 212.

Enrichment Logic
  The collection system 200 reads the records from that are needed to create records into the SDA 203 advertisement server usage tables. Records are mapped to match the SDA 203 advertisement server usage table.
  The advertisement records use the Network Id, Network Instance Id and the Head End to determine the channel in which a given advertisement was broadcasted from a mapping table.
  Processed records are delivered to SDA 203 according to the specifications described in below.

Mapping Logic
  The system 200 stages the collected records. In one embodiment, the records are staged according to the advertisement insertion event delivery format and advertisement insertion events reference data fields as described in below.

Downstream
  Downstreams are disclosed herein below.

XX. EPG Data—
  EPG data is collected from an EPG data source 217 at an EPG data collector 214. In one embodiment, the EPG data source 217 comprises one or more Tribune Media Systems servers. In another embodiment, there is one instance of delivery from the data source 217.
  The instances naming convention is as follows:
    <div>_TMB_<type>
According to the above-disclosed naming convention, the <div> symbol represents the division code, _TMB_ is a literal, and the <type> symbol represents the file type being managed by the collector (such as, PROGRAM|SCHEDULE|STATION). A sample instance name is "B23_TMS_SCHEDULE".

Collection—
  There is one type of collection for these devices; the collection of EPG data is file based. In one embodiment, the files-based collection protocol is FTP over TCP/IP link. EPG data files are compressed using gzip. The collection system 200 reads "National" files that correspond to the EPG data type.

EPG program and schedule data is collected once every 24 hours in one embodiment. If no files are available, the data is not collected. Collected data has e.g., 15 days worth of programming schedule.

The file naming convention on the remote host is as follows:

<tabletype>.txt.gz

In the above naming convention, the <table type> describes the table (for example, progrec, skedrec, statrec, progrec, etc.), the .txt.gz symbol is a literal which identifies a data file.

Nightly files contain data extract from the following tables of interest:

Schedule
Programming

The following is an exemplary data filename: progrec.txt.gz.

EPG data files are delivered as an MD5 summary file in one embodiment. The termination file indicates when a file has been written and closed. It indicates when all files are ready to be collected. The file naming convention on the remote host is as follows:

<tabletype>.txt.gz.sum

The <table type> symbol describes the table (for example, progrec, skedrec, statrec, progrec, etc.), the .txt.gz.sum symbol is a literal which identifies a data file summary with MD5 hash.

Nightly files contain data extract from the following tables of interest:

Schedule
Programming

The following is an exemplary data filename: progrec.txt.gz.

Filename Duplication Check—

The collection system 200 does not perform a duplicate check for the EPG data files because these files have fixed names. Old files are tagged as part of collection and archived.

Collection Steps for File Collectors—

The following steps are performed by the collection system 200 once the files have been collected from the EPG data source 217. First, the EPG data files are obtained as soon as they are available. Files are then moved to a local AC directory, parsed and processed.

Input Data Format

Files are encoded in plain text pipe separated value. The record format is described in detail herein below.

Archiving—

The collection system 200 maintains the data available online for 7 days in one embodiment. The data is then stored into a dedicated directory on the local file system.

Business Logic—
Decoding

The collection system 200 decodes the records based on the schema described below.

Validation Logic

The collection system 200 validates the collected records according to the schema described in below. The following fields are used for program validation: Tf_database_key, Tf_title, Tf_advisory_desc (all of them), and Tf_star_rating. The following fields are used for schedule validation: Tf_station_num, Tf_database_key, Tf_air-date, Tf_air_time, Tf_duration, Tf_tv_rating, Tf_sex_rating, Tf_language_rating, Tf_dialog_rating, and Tf_fv_rating. The following fields are used for station validation: Tf_station_number, Tf_station_timezone, Tf_station_name, and Tf_station_call_sign.

Duplication Check Logic

The collection system 200 provides the ability to verify that the EPG records are not a duplicate of any other raw usage records. The following fields are used for program duplicate detection: Tf_database_key and Tf_title. The following fields are used for schedule duplicate detection: Tf_station_num, Tf_database_key, Tf_air_date, Tf_airtime, and Tf_duration. The following fields are used for station duplicate detection: Tf_station_number, Tf_station_timezone, Tf_station_name, and Tf_station_call_sign.

Enrichment Logic

There is no enrichment to be performed for the EPG data feeds. The source identifier (Source Id) from the viewing impression is used to interrogate the MAS database. The result from the query has the guide service identification which maps to the station number. The station number is used as a means to obtain specific information on programming and scheduling. Program and Station records are collected but not enriched. These records are used to create reports.

Mapping Logic

The collection system 200 stages the collected records according to the schema described below.

Downstream

Downstreams are described in greater detail below.

Records collected from the EPG data files are stored in the SDA instance 203 as collected. Schedule records that are enriched are stored in the SDA instance 203 as collected and enriched.

XXI. Application Server Data—

Application server data is collected from the application server (AS) data source 213 by at least one AS database collector 210. In one embodiment, the AS 213 is a Mystro™ server device of the type utilized by the Assignee hereof (discussed in previously referenced co-owned, co-pending U.S. patent application Ser. No. 11/263,015 filed Oct. 2, 2002 and entitled "Network based digital information and entertainment storage and delivery system", now published as U.S. Patent Application Publication No. 2003/0208767, which claims priority under 35 U.S.C. 119(e) the benefit of U.S. Provisional Application No. 60/377,963 filed on May 3, 2002), although it will be appreciated that other configurations may be utilized with equal success.

In another embodiment, there are 16 instance of the data collector 210. The instances naming convention is as follows:

<div>_MAS_<type>_<##>

According to the above-disclosed naming convention, <div> represents the division code, _MAS_ is a literal, <type> is the file type being managed by the collector (such as e.g., SERVICE|PROGRAM|CHANNEL), and <##> is a two digit identifier. A sample instance name is "B23_MAS_SERVICE_01".

Collection—

The files based collection protocol is FTP over TCP/IP link. Collection and delivery of the AS data files is handled by the AS data collector 210 of the collection system 200. In one embodiment, there is one data extract from the AS data collector 210 every day.

The file naming convention on the remote host is as follows:

<fileid>.txt.gz

In the above naming convention, the <fileid> symbol is a file identifier which may identify "channels" "services" or "lineups" in lower case, the .txt.gz symbol is a literal and identifies a data file in text compressed using gzip. Nightly files contain data extract from the following tables:

Services
Lineup
Channel

The following are examples of data filenames: services.txt.gz, and channel.txt.gz Validation—

Filename Duplication Check

File duplication check cannot be performed because files do not have any distinguishing features. Collected files are moved, processed and archived. During the archive process, those files are renamed to include a timestamp.

Collection Steps for File Collectors

The following steps are performed by the collection system 200 once the files have been collected. First, the AS files are obtained after they have been closed at midnight. Files are then moved to local AC directory. A file duplicate check, parsing and processing are then performed. The files are archived.

Input Data Format

Files are encoded in plain text pipe separated value. The record format is described in detail elsewhere herein.

Protocol

AS data file collectors 210 use FTP over TCP to collect the files.

Archiving

In one embodiment, the collection system 200 maintains files for 7 days. The collected AS data files are stored into a dedicated directory on the local file system.

Business Logic—

Decoding

The system 200 decodes the records based on the schema described below.

Validation Logic

The collection system 200 validates the collected records according to the schema described herein.

Duplication Check Logic

The system 200 provides the ability to verify that AS data records are not a duplicate of any other raw usage records.

Enrichment Logic

Records collected from AS data source 213 are not enriched. These records are stored as collected and used for enrichment.

Filtering Logic

As records are filtered; the filtering logic is discussed elsewhere herein.

Mapping Logic

The system 200 stages the collected records according to an application server schema described below.

Records are mapped to the service table as follows:
Service Id (From Service Feed, Service Id)
Guide_Service_Id (From Service Feed, Guide Id)
Primary Source Id (From Service Feed, SD Source Id)
Secondary Source Id (From Service Feed, HD Source Id)
Call Letters (From Service Feed, Service Name)
Network Name (From Service Feed, Service Long Name)
Service Type (From Service Feed, Service Type)
Entitlement Id (From Lineup Feed, Entitlement id)
Switched Indicator (From Service Feed, SDV)
High Definition Indicator (From Service Feed, HS_SD)
Region Id (From Service Feed, Region Name)
Division Id (From Services Feed, Division Id)
Launch On Boot (To be finalized on the Technical Specifications)
Pre Load Catalogs Indicator (To be finalized on the Technical Specifications)
Network Express Indicator (To be finalized on the Technical Specifications)
Channel Transient Indicator (To be finalized on the Technical Specifications)
Immediate Audio Tune Indicator (To be finalized on the Technical Specifications)
Family Tier Indicator (To be finalized on the Technical Specifications)
Start Over Indicator (To be finalized on the Technical Specifications)

Records are mapped to the channel table as follows
Channel Id (From Channel Feed, Display Channel)
Region Id (From Channel Feed, Region Name)
Division Id (From Channel Feed, Division Name)
Division Code (From Channel Feed, Division Code)
Service Id (From Channel Feed, Service Id)

Records from the Lineup feed populate the region hub, hub and region. Regions are populated as follows
Region Id (From Lineup, Region Id)
Region Name (From Lineup, Region Name)
Division Id (From Lineup, Division Name)

Region Hub is populated as follows
Region Id (From Lineup, Region Id)
Hub Id (From Lineup, Hubs, it will be dissected into individual records)

Hub is populated as follows
Hub Id (From Lineup, Hubs, it will be dissected into individual records)
Hub Name (From Lineup, Hubs, it will be dissected into individual records)

Downstream

Downstreams are described in greater detail below.

Records that were collected from the AS data files are stored in the SDA instance 203 as collected. AS records are converted into the service table as defined in the Logical Data Model (LDM) and Data Dictionary. The LDM is a representation of the various data tables and the relationships between them.

XXI. Subscriber Reference Data—

Subscriber reference data files are received from a subscriber data source 209. In one embodiment, the subscriber data source 209 comprises a Convergys ICOMS server. In another embodiment, there is one instance for the subscriber data collector 206.

Collection—

Protocol

The collection protocol is SFTP over TCP/IP link. Collection and delivery of subscriber files is handled by the MSO, and pushed (SFTP) to the collection system 200.

Compression

Files are not compressed.

Frequency

Files are, in one embodiment, delivered once per day.

File Naming Conventions

The file naming convention for reference data files is as follows:
   <Div_ID>_<ref type>_YYYYMMDD.TXT In the given naming convention, Div_ID is the division identifier code, <ref type> is the reference type. The reference type may be e.g., VIDEO_SUB or VIDEO_ SERVICES. The YYYYMMDD symbolizes the year, month and day. The .TXT represents the file extension. The following is an example of a data filename: B411_VIDEO_SUB_20090211. TXT Filename Duplication Check Filename level duplication check is required. If the filename being collected already has been collected within a configurable period of time then the file is considered as duplicate. In case of duplicate file found an error message is generated and the file is stored to a duplicate file directory and processing continues with the next file.

The period of time for duplicate check is a parameter and is configurable. In one embodiment, for initial configuration the collection system 200 is configured to check in the range of 1 to 5 days.

Collection Process Steps

Once the system 200 collects the files, usage files are moved to local collector directory and usage files are checked for duplicates.

Input Data Format

The input data format is pipe separated variables (PSV). The files contain fields mapping to the table structures defined below.

Archiving

The system 200 maintains files for 7 days in one embodiment. They are stored into a dedicated directory on the local file system.

Business Logic—

Decoding

The collection system 200 decodes the records based on the schema described below. Subscriber feed has the day a subscriber was added or removed from service. The system 200 tracks those by using the connect date. If a subscriber is not available in the feed, it is assumed that it got disconnected from service. If a subscriber is disconnected from service all its equipment is assumed to be disconnected at the same date. If equipment is not available in the feed, it is assumed that it was disconnected from service. If a new equipment or subscriber is added to the feed, it is assumed that it was connected to service in the connect date that was delivered in the feed.

Validation Logic

The system 200 validates the collected records according to the schema described in below.

Duplication Check Logic

The system 200 provides the ability to verify that subscriber records are not a duplicate of any other raw usage records.

Mapping Logic

The collection system 200 stages the collected records according to the subscriber files schema described below.

Personally identifiable information (PII) identifying data that is used for correlation inside the data collection system 200 is, in one embodiment, not anonymized. This data is considered reference data and does not reflect any customer usage. However, subscriber data is anonymized upon delivery to the SDA instance 203 by using the anonymizing algorithm described below, or other anonymization processes, such as the cryptographic hash described in previously incorporated U.S. patent application Ser. No. 11/186,452 filed Jul. 20, 2005 and entitled "Method and Apparatus for Boundary-Based Network Operation".

The subscriber feed maps to the following fields for a subscriber:
Site ID
Division
Division ID
Customer Type
Subscriber Account (Anonymized)
Subscriber Zip Code
Subscriber Zip+4
HSD Household
Subscriber Connect Date
Video Services Household
Voice Service Household
Wireless Service Household
Company
Division Code
Franchise The subscriber feed maps to the following fields for a service:
Customer Guid (Anonymized)
Site ID
Division
Division ID
Subscriber Account
Service Category Code
Service Occurrence
Service Code
Service Description
Service Connect Date
Mac Address
STB Serial Number
Customer Channel Lineup Id
STE Vendor
STB Model Number
STB Description
Equipment Connect Date
Cable Card Vendor
Cable Card Id
Cable Card Name Downstream Downstreams are described in greater detail subsequently herein.

Records that were collected from the subscriber files are stored in the SDA instance 203 as collected after all records have been anonymized by using the algorithm described below.

Subscriber records are converted into the customer table as defined elsewhere herein.

XXII. Subscriber Reference Data—

FIG. 27 illustrates a matrix of the network elements and the downstream. As shown, the crossing cell of the network element and downstream represents the action to be performed by the collection system 200. The actions are as follows:

Yes The data from the network element is populated to the downstream

No The data from the network element is not populated to the downstream

Corr. The data from the network element is correlated and the correlation result is populated to the downstream P1 The data from the network element is populated to downstream in phase 1

P2 The data from the network element is populated to downstream in phase 2

Downstream Requirements—

The above requirements do not provide a product specific output. Rather, they provide a framework of general output requirements that products may rely on. The collection system 200 incorporates the ability to provide output via SFTP of delimited files in pre-defined formats. The system 200 also incorporates the ability to add pre-defined formats for output based on mutually agreed upon characteristics, including (i) appropriate query against data in the data dictionary, (ii) output format (comma delimited, pipe delimited, web-portal, etc.), and (iii) output frequency.

SDA—

In one embodiment, the SDA 203 comprises an Openet/Accenture subscriber data analysis system. In another variant, there is one (1) instance of the SDA 203.

Output Data Format—

In one embodiment, SDA 203 is an independent instance that is co-located with collection system 200. In another embodiment, the SDA system 203 is moved from the collection system 200 when the solution gets deployed in production.

The output data format maps to the SDA logical data module for the following inputs:

Services—Populated with data from AS data collector 210 and EPG data collector 214

Customer and STB Household—Populated with anonymized data from the subscriber table.

SDV Record—Populated with the correlated usage from tuner and program events.

Advertisement Spot Play—Populated with the data from advertisement data collector 212.

Video on Demand—Populated with from VOD data collector 208 after the data has been enriched with subscriber information that is anonymized.

The output schema matches the mapping schema described in the input section. Reference data that is only used for SDA 203 is inserted directly into SDA 203 and not managed by the collection system 200.

Delivery—

Protocol

Records that are destined to the SDA instance 203 are inserted using SQL*NET in one embodiment.

Frequency

The delivery frequency is configurable but in one embodiment, is defaulted to once every hour. If during technical specification it is decided to co-insert both records or use Oracle stream this may be done in real time and the frequency does not apply.

Delivery Process Steps

The collection system 200 processes, filters, enriches and maps usage records as described above. After all records have been processed, they are directly inserted into the SDA instance 203 (such as through SQL*NET) either directly or through, in one embodiment, an Oracle to Oracle connection. The following usage is propagated to SDA 203 from collected records.

Anonymized Subscriber Information

Tuning events that have been enriched with the programming and subscriber data and corresponds to a viewing event.

Program Schedule

Video on Demand

Programming Data

Advertisement Spot Data

Master Channel information (Services Table)

Archiving

Records delivered to SDA 203 are archived in SDA 203. Records in SDA 203 are retained, in one embodiment, for 90 days.

XXIII. National Cable Communications—

In one embodiment, there is one (1) instance of the NCC feed delivering data to the NCC.

Output Data Format—

In one variant, files are created in ASCII, Pipe Separated Value files (PSP). There are four files created for the NCC feed. These are (i) a universe data file, (ii) a household data file, (iii) a station data file, and (iv) a tuning data file.

Delivery—

Protocol

NCC Files are delivered using secured FTP (SFTP).

Frequency

The delivery frequency depends on the feed as follows:

Universe Data—Once a month

Household Data—Once a month

Station Data—Once a month

Tuning Data—Once a month

File Naming Conventions-Universe Data

The file naming convention for the universe data files is as follows:

Universe_<division>_<year>_<month>.dat

In the above, Universe_ is a literal, <division> represents the division name, <year> is the creation year in four digits (YYYY), <month> is the creation month in two digits (zero padded, MM). The .dat symbol is a literal.

The file naming convention for the household data files is as follows:

Household_<division>_<year>_<month>.dat in which

According to the given convention, Household_ is a literal, <division> is the division name, <year> is the four-digit creation year (YYYY), <month> is the two digit creation month (zero padded, (MM), and .dat is a literal The file naming convention for the station data files is as follows:

Station_<division>_<region>_<year>_<month>.dat in which

The Station_ symbol is a literal, <division> represents the division name, and <region> is the region name. The region name corresponds to the lineup being used to map the channel id. The <year> symbol represents the creation year in four digits (YYYY), <month> is the creation month in two digits (MM) and .dat is a literal.

The tuning data file naming convention is as follows:

Tune_<division>_<year>_<month>_<day>.dat in which

In the tuning data file naming convention, the Tune symbol is a literal, <division> is the division name, <year> is the creation year (four digits, YYYY), <month> is the creation month (two digits, zero padded, MM), <day> is the creation day (two digits, zero padded DD), and .dat is a literal.

Delivery Process Steps

The collection system 200 delivers the files to its destination via secure FTP (SFTP).

Archiving

Universe Data, Household Data and Station Data are, in one embodiment, archived for 7 days. If Tuning Data are created on a daily basis, and delivered at the end of the month, they are retained through the month until delivery day. After the files have been delivered, they are archived (in one example, for 7 days).

XXIV. Raw Record Store—

All records are stored in the raw record store before any validation or duplicate detection is applied. It serves as a reference for troubleshooting purposes where output data records or any record has been dropped from the processing stream (validation, duplicate detection or filtering) is matched to its (original) version.

In one embodiment, one or more of the following requirements are implemented: (i) retention policies dictate that all records remain available 7 days, and/or (ii) raw records are assumed to be "interim records".

XXV. System Administration—

In one embodiment, existing system administration facilities are used.

XXVI. Alarming—

The collection system 200 may provide the ability to log an error if connectivity is lost between elements in the collection system 200. The ability to log an error if data received from a given source does not comply with the expected format (Data Integrity Error) is also provided by the system 200.

XXVII. Reliability—

In one embodiment, the aforementioned collection system 200 and SDA 203 do not follow production reliability metrics.

XXVIII. Extensibility Requirements—

The collection system 200 and/or SDA 203 may be configured to be able to be expanded to do one or more of the following:

Increase the number of feeds being managed by the collection system 200/SDA 203

Add the ability to add other types of feeds to the collection system 200/SDA 203

Increase the number of reports in SDA 203

Increase the number of feeds from downstream

Change the number of regions being serviced

XXIX. Security Requirements—

Existing security facilities may be used for user and data control in one embodiment.

The collection system 200 ensures that collected turning records have been made anonymous. The collection system 200 also ensures that collected VOD records have been made anonymous.

XXX. Operating Environment—

Mediation Environment—

The mediation environment in one embodiment may include e.g., a production environment and a test environment. The production environment comprises two dedicated servers (such as those illustrated in FIG. 20). The first server comprises the various software and hardware components which collectively comprise the data collection system 200. The second server comprises at least two functions: (a) a management function for managing the system 200 running on the first server; and an analysis function (or SDA) 203 which analyzes collected data. The test environment is used to test patches, upgrades of the product or configuration changes and for troubleshooting production problems.

Hardware Requirements—

In one embodiment, the hardware platform is Sun™.

XXXI. Re-Processing—

In one embodiment, the system 200 provides the ability to locally retain tuning or VOD in any state between origination and landing in a data warehouse. In one variant, the data is kept for up to (7) days.

Log Reprocessing—

Records that were collected from the SDV log are used to recreate the lost records for the period. The collected records are compared with other records that were collected prior to the outage. This is needed to create a correlation between the log UID and the geographical information that was successfully correlated prior to the outage.

Using the established correlation, the subscriber information is populated for all the records that were lost during the outage. Insert the viewing impressions records in the table that is used to feed the SDA 203 data warehouse. If any record has more than two ID's that are correlated, one before and one after the outage, the one that matched after the outage is selected. If any log record does not have a matching TCP record, it is not rebuilt. Any viewing impression that was not terminated is terminated as an inactive session as part of reprocessing. An exemplary SDV log is illustrated in the table of Appendix DN of previously incorporated U.S. Provisional Patent Application Ser. No. 61/260,346.

After the process begins, the user identification (UID) in the log record is compared to the user identification (UID) in the TCP record to establish a basis; an example is illustrated in Appendix DO of previously incorporated U.S. Provisional Patent Application Ser. No. 61/260,346. The process reconstructs the records that were lost during the outage with the comparison basis. Exemplary reconstruction is illustrated in Appendix DP thereof as well.

SDV Filtered Record Reprocessing—

SDV Records that were filtered because of duration may be reprocessed if the duration parameters are changed to a smaller duration. However, in one embodiment, only those records that were successfully correlated are eligible for reprocessing.

Records are selected by time period. The records that correspond to the time period have their duration compared with a configurable filter duration parameter. Records in which its duration is larger than the filter parameter are stored for delivery to SDA 203; otherwise they remain as filtered.

XXXII. Sizing Requirements—

Exemplary sizing parameters are listed in the table of Appendix DQ of previously incorporated U.S. Provisional Patent Application Ser. No. 61/260,346 and are provided for sizing determination. In one embodiment, one or more of the following assumptions are taken into consideration:

1. Files are archived for 7 days.
2. Summarized data is archived for 7 days.
3. Operation tables are kept for 7 days.
4. Reporting tables are kept for 7 days.
5. Data sizing for the analytics database instance is essentially the same as the one used for the mediation server.
6. Disk utilization is expected to have a high water mark of 80%.
7. Data for SDA 203 is located in the same server as the collection management system 2006.

XXXIII. High Availability Requirements—

In one implementation, the collection system 200/SDA 203 is deployed in a high available environment.

XXXIV. Archiving Requirements—

The collection system 200 maintains files for 7 days in one embodiment. The files are stored into a dedicated directory on the local file system.

XXXV. Archiving Requirements—

The system 200 may provide the ability to log each action that a user takes, including date, time, action details, and success indication. Further, the ability to log each action that the collection system 200 takes, independent of user action, including date, time, action detail, reason and success may be provided as well. The collection system 200 facilities may be used for the creation and management of logs.

XXXVI. Reporting Requirements—

Obtain Second-by-Second View of Household Viewership—

The second-by-second view of household viewership includes a tabular report. In one embodiment, the report includes, at a minimum, the fields illustrated in Appendix DR of previously incorporated U.S. Provisional Patent Application Ser. No. 61/260,346.

In order to provide this view, the system 200 completes the following correlation:

1) Tuning records are obfuscated and correlated to anonymous households
2) Anonymous tuning records are correlated (via Source ID) to video services as defined on the application server (AS)

3) Based on anonymous tuning record time and service, programming information is mapped to tuning records Obtain Second-by-Second View of Household Commercial Viewership—

The second-by-second view of household commercial viewership includes a tabular report. In one embodiment, the report includes, at a minimum, the fields illustrated in Appendix DS of previously incorporated U.S. Provisional Patent Application Ser. No. 61/260,346. The reporting view also includes the ability to play the advertisement(s).

In order to provide this view, the system 200 completes the following correlation:
1) Tuning records are anonymized and correlated to anonymous households
2) Anonymous tuning records are correlated (via Source ID) to Video Services as defined on the AS
3) Based on anonymous tuning record time and service, programming information is mapped to tuning record
4) Match Ad Zone to SDV Service Group/SDV Server
5) Match Ad Zone "program identity" with Services, as defined in the AS
6) Match Ad Spot play (from Verification File) with network and program information (based on mappings in 4 and 5 above)
7) Match Ad Spot ID to Advertiser Obtain View of VOD Consumption—

The view of VOD consumption includes a tabular report. In one embodiment, the report includes, at a minimum, the fields illustrated in Appendix DT of previously incorporated U.S. Provisional Patent Application Ser. No. 61/260,346.

In order to provide this view, the system 200 completes the following correlation:
1) VOD records correlated to anonymous households XXXVII. Error Management—

In one embodiment, the collection system 200 facilities are used for error management.

XXXVI. SDA Data Warehouse—

After mediation, information comes to rest in SDA 203 the data warehouse. The data listed below is hosted in the data warehouse and managed outside the mediation scope. This data is inserted using database tools or by hand. In the instance the data is entered by hand, the data comes through a spreadsheet. The following data is hosted in the data warehouse for analysis:
a. Subscriber Region [1-DC1]
b. Media Sales Region [1-DC2]
c. Division [1-DC3]
d. DMA [1-DC4]
e. DMA Zip [1-DC5]
f. Narrow Cast Area [1-DC6]
g. Narrow Cast Types [1-DC7]
h. Household [1-DC25]
i. Household Packages [1-DC26]
j. Household Demos [1-DC27]
k. Household Demos Range [1-DC28]
L. STB Household [1-DC29]
m. Household STB EPG [1-DC30]
n. Household STB Agents [1-DC31]
o. Household Opt-In Data [1-DC33]
p. Household Opt-In Phone [1-DC34]
q. Household Opt-In Email [1-DC35]
r. Household Contact Type [1-DC36]
s. Household Hub Information [1-DC37]
t. SDV Server Config [1-DC38]
u. SDV Server Service Group [1-DC39]
v. VOD Server Config [1-DC40]
w. VOD Server Svc Group [1-DC41]
x. Ad Zone [1-DC42]
y. Ad Zone Zip Code [1-DC43]
z. Sources [1-DC44]
aa. Packages [1-DC45]
bb. Channel Map [1-DC46]
cc. Lineup [1-DC47]
dd. Service [1-DC48]
ee. Service Type [1-DC49]
ff. Program [1-DC50]
gg. Rating Code [1-DC51]
hh. Viewing Type [1-DC52]
ii. Program Genre [1-DC53]
jj. Genre [1-DC54]
kk. Program Event Flag [1-DC55]
ll. Event Flag [1-DC56]
mm. Program Adv Rating [1-DC57]
nn. Advanced Rating [1-DC58]
oo. Tuning Event [1-DC59]
pp. Tuning Event Types [1-DC60]
qq. VOD Assets [1-DC67]
rr. VOD Asset Metadata [1-DC68]
ss. VOD Event Type [1-DC70]
tt. VOD Stop Reason [1-DC71]
uu. VOD Segments [1-DC72]
vv. VOD Segment Type [1-DC73]
ww. VOD Trick Plays [1-DC74]
xx. VOD Trick Type [1-DC75]
yy. Local Ads [1-DC81]
zz. Advertiser [1-DC82]
aaa. Advertiser Type [1-DC83]
bbb. Agency [1-DC84]
ccc. Ad Status Code [1-DC86]
ddd. CPE [1-DC9]
eee. HD Resolutions [1-DC10]
fff. Cable Card [1-DC11]

The format of the SDA 203 is described below. Of the previous list, the following data items are, in one embodiment, delivered through mediation:
a. Tuning Event [1-DC59]
b. Sources [1-DC44]
c. Packages [1-DC45]
d. Channel Map [1-DC46]
e. Ad Spot [1-DC85]
f. VOD Event [1-DC69]

XXXVII. Assumptions—

General Assumptions—

All events are collected in the network elements' local time. Some of these network elements do collect data in UTC. All timestamps are normalized to UTC in one embodiment.

Events from an ETAG server may be collected and managed.

Inspection of content of High Speed Data requires a content inspection device which is, in one embodiment, placed in network.

In one embodiment, online data is retained for a period of 13 months and offline data is retained for a period of 18 months in archive. The retention period for all data in the SDA system 203 may be of 7 days in the collection system 200 and 90 days in the SDA instance 203.

A unifying identifier for all network services is provided by the AS. An identifier that maps the advertisement server head ends to specific demographic locations is provided by DNCS.

All direct database usage insertion from foreign systems may done on an hourly basis in one embodiment. Viewing impressions as collected from the SDV server 207 in one embodiment follow the transitions described in the state diagram illustrated at FIGS. 24 and/or 25. This may alter the way that viewing impressions are computed for multi-tuner environments, as discussed elsewhere herein.

SDV—

TCP connection does not require a bidirectional protocol. The TCP protocol echoes what is written in the log with the difference that the user ID being written at the log is already anonymized while the one being delivered through the TCP feed is the actual one.

SDV programming data may be correlated with the Service Id through the Source ID that is being delivered through the AS feed. If this is not possible, a translation table is built.

In embodiment, DVR playback events are not collected through the SDV, and only DVR recording events are collected.

In one embodiment, the TCP connection feed is in ASCII, CSV. If the TCP connection gets severed, the data is not buffered and is considered lost.

Traffic and Billing Feed for Ad's Play—

The network name is delivered in a way that can be enriched with a valid service Id. If this is not unique, the network name is enriched with the division ID to obtain a unique service Id. In one embodiment, a traffic and billing (T&B) entity is used to deliver data from the advertisement data source 215. The data from the T&B is written in lieu of the advertisement data collector 212 feed.

Subscriber Feed—

The subscriber feed may, in one embodiment, utilize methods similar to those used for digital phone and high speed data solutions. The subscriber feed data may comprise ASCII, Pipe Separated Value data delivered through FTP.

XXXVII. Data Formats—

SDV Data Formats, Input Format—

The SDV collection format is specified elsewhere herein.

VOD Data Replication, Input Format—

In one embodiment, the VOD collector comprises an Everstream VOD collector. According to this embodiment, the following tables will be replicated using the schema described in the Everstream Data Dictionary.

LOCATION
    ORGANIZATION
    EQUIPMENT
    VOD_LEASE
    VOD_STREAM
    VOD_ASSET
    VOD_ASSET_TITLE
    VOD_ASSET_TITLE_GENRE
    VOD_ASSET_COMP
    CALENDAR
    TIME_OF_DAY

VOD Asset SDA Delivery Format, Output Format—

VOD usage data is delivered to SDA 203 in a database table such as that illustrated in Appendix DU of previously incorporated U.S. Provisional Patent Application Ser. No. 61/260,346.

MAS—TWC Generated, Input Format—

Data from the AS is ASCII in which its records are separated using pipe (|).

Channel File

For each LineUpGroup/region, a display channel list is produced by the Digital Navigator (e.g., SARA, Passport, Mystro). An exemplary display channel list definition is shown in Appendix DV of previously incorporated U.S. Provisional Patent Application Ser. No. 61/260,346.

Services File

A service list is produced by the Digital Navigator (e.g., SARA, Passport, Mystro). All services are included, however for services which have a single parameter containing a sourceID (i.e., "watchtv") this parameter is put into the sourceID field, otherwise it is omitted. An exemplary service list definition is provided in Appendix DW of previously incorporated U.S. Provisional Patent Application Ser. No. 61/260,346.

Lineup File

The relationship of Lineup is produced by the Digital Navigator (e.g., SARA, Passport, Mystro). An exemplary Lineup definition is provided in Appendix DX of previously incorporated U.S. Provisional Patent Application Ser. No. 61/260,346.

EPG Data, Input Format—

In one embodiment, EPG data is delivered in compressed format using gzip. Uncompressed, the files are formatted in ASCII. The EPG data fields may have variable length and be pipe (0x7C) separated. Records may also be new line (0x0A) terminated. Date and time fields reflect Coordinated Universal Time (UTC).

Subscriber Detail Extract—

The subscriber detail extract contains the most granular information for subscribers, accounts and equipment. The subscriber detail files may contain fields mapping to the exemplary table of Appendix DY of previously incorporated U.S. Provisional Patent Application Ser. No. 61/260,346.

Subscriber Services Extract—

The subscriber services extract file contains the most granular information for equipment, services and packages. In one embodiment, the file contains fields mapping to the table of Appendix DZ of previously incorporated U.S. Provisional Patent Application Ser. No. 61/260,346.

Advertisement Data Format—

Eclipse Open TV Data Replication

In one embodiment, advertisement data is collected via an Eclipse server. According to this embodiment, the following tables are replicated using the schema described in the Eclipse EDA Data Dictionary:

INVOICE_DETAIL
    ADVERTISER
    CONTRACT
    COPY
    COPY_GROUP
    REGION
    HEADNET
    RETAIL_UNIT
    NETWORK
    PROGRAMS
    SPOT

Ad Insertion Events SDA Delivery Format

The table of Appendix EA of previously incorporated U.S. Provisional Patent Application Ser. No. 61/260,346 may, in one embodiment, be used to insert the advertisement insertions from the advertisement data collector 212 schema.

Ad Insertions Events Reference Data Fields

The table of Appendix EB of previously incorporated U.S. Provisional Patent Application Ser. No. 61/260,346 is, in one embodiment, merged by the collection system 200 with the data that is provided by the advertisement data collector 212. In one embodiment, the table is merged every day.

National Cable Companies, Output Format—

The delivery of records to the National Cable Companies (NCC) is specified above with respect to the Audience Measurement Interface.

Exemplary Advertisement Data Format—
In one embodiment, the advertisement data comprises 17 fields defined as follows:
Field #1—Event Type—Bytes 1-3.
Type of event defined by record
Additional acronyms to be determined.
Types—
  LOI=Local Originated Insertion
  REM=Remark, no action.
  END=Last record, lone field record. (Optional)
  NUL=Ignore Break Cue
Field #2—Scheduled Date—Bytes 5-8.
T&B's approximation of the date when the event will occur.
  Format—MMDD
  Ex. 1210
Field #3—Schedule Time—Bytes 10-15.
T&B's approximation of the time of day when the event will occur.
  Format—HHMMSS
  Ex. 020345
Field #4—Window Start Time—Bytes 17-20.
Time of day to open window of opportunity for event to occur.
  Format—HHMM
  Ex. 1535
Field #5—Window Duration Time—Bytes 22-25.
Length of time of window of opportunity for event to occur.
  Format—HHMM
  Ex. 0100
Field #6—Break Number Within Window—Bytes 27-29.
Break sequence number within window of opportunity for event to occur.
  Ex. 002
Field #7—Position Number Within Break—Bytes 31-33.
Position sequence number for event within break.
  Ex. 001
Field #8—Scheduled Length—Bytes 35-40.
Scheduled event (spot) length
  Format—HHMMSS
  Ex. 000030
Field #9—Actual Aired Time—Bytes 42-47.
Actual aired time of day.
  Format HHMMSS
  Ex. 012315
Field #10—Actual Aired Length—Bytes 49-56.
Actual aired length of spot
  Format—HHMMSSCC
  Ex. 00003000
Field #11—Actual Aired Position Within Break—Bytes 58-60.
Actual sequential position number that event occurred
  Ex. 002
Field #12—Spot Identification—Bytes 62-72.
T&B's spot identification code.
  EX. 00000132401
Field #13—Status Code—Bytes 74-77.
Completion Status Code
  Ex. 0001
Using the following table of definitions.
  0001=Aired Successfully
  0002=Generic Failed to Air
  0004=Failed, Bypass On
  0005=Failed, Logging Turned Off
  0006=Failed, Bad Video
  0008=Failed, User Abort
  0009=Failed, Inserter Abort
  0010=Failed, Device Not Ready
  0012=Failed, Unknown Error
  0013=Failed, Time Out
  0014=Failed, Device Time Out
  0015=Failed, System Error
  0016=Failed, Operator Error
  0017=Failed, Inserter Busy
  0018=Failed, Insertion Conflict
  0019=Failed, Directory Error
  0020=Failed, No Ad Copy in Inserter
  0021=Failed, Cued Late
  0022=Failed, Channel Collision
  0023=Failed, No Cue in Window
Field #14—Advertiser Name—Bytes 79-110
Advertiser's name as identified in T&B. This is not a required field and may be left out.
Field #15—Advertiser Spot Name—Bytes 112-131.
Advertiser's Spot Name as Identified in the T&B. This is not a required field and may be left out,
Field #16—Scheduler Fill—Bytes 133-136.
Identifies the spot as either being scheduled contractually or used as a filler in order to complete a commercial break. This is not a required field and may be left out.
  Options—
  Sch=Scheduled
  Fill=Filler spot
Field #17—User Defined—Bytes 138-NNN.
For use in tracking other data. This is not a required field and may be left out.

XXXVIII. Anonymizing Algorithms—

Customer identifiers (e.g., MAC, Subscriber Accounts, Customer Accounts) may, in one embodiment, be made anonymous after being is correlated with generic demographic information prior to its delivery to the SDA instance 203. The obfuscation of customer identifiers is done in the collection system 200, after the guiding of subscriber information has been completed.

Non obfuscated records may remain in the collection system 200 for the purposes of auditing and reconstruction. Non obfuscated records may be delivered to the SDA instance 203 in one instance, if they belong to customers that have "opt-in" as indicated in their provisioning record.

In one embodiment, the following fields are obfuscated as applicable:
  MAC ID
  Serial Numbers
  Account Numbers
  Telephone Numbers
  Customer Identifiers In another embodiment, the following fields are not obfuscated:
  Correlated Zip Code
  Correlated DMA
  Correlated Division ID
  Correlation Division Name In one embodiment, the anonymization occurs by inter alia, the use of a cryptographic hash as described in the previously incorporated U.S. patent application Ser. No. 11/186,452 filed Jul. 20, 2005 and entitled "Method and Apparatus for Boundary-Based Network Operation".

Alternatively, customer accounts may be obfuscated via the following algorithm:
  Collect the division ID (DI) from the billing system that was correlated with the provisioning data.
  Collect the Customer ID (MAC ID in this case) that was correlated with the provisioning data.
  Concatenate DI to the end of CI yielding UID (DI+CI=UID)

Using the Hexadecimal representation of the UID, divide the UID in DWORDS from "right to left" being a DWORD defined as a double word, 32 bits wide. Pad the least significant DWORD with zeroes up to 32 bits.

From the first converted DWORD, add third salt value. Carry any overflow bits to the adjacent DWORD, continue carrying if needed.

Subtract fourth salt value from the second DWORD.

Continue this process, adding the first value to odd DWORDS, subtracting the second value from the even DWORDS until all DWORDS have been processed.

Convert the series of DWORDS back to its ASCII character representation.

Perform an MD5 hash of the resultant string.

The output of this MD5 is the obfuscated Customer ID

MAC addresses may be then obfuscated.

Records collected from the SDV feeds may obfuscated using the following algorithm:

When a tuning record is collected the following fields may be obfuscated:
MAC Address from record
Division ID from correlation with provisioning
Customer ID from correlation with provisioning
To the Division and Customer ID apply the Customer ID obfuscation process
To the MAC address apply the MAC obfuscation process.
Replace the Division and MAC with its obfuscated counterparts.

Records collected from VOD are obfuscated, in one embodiment, using the following algorithm:

When VOD record is collected, obfuscate the following fields:
MAC address from record
Division ID from correlation with provisioning
Customer ID from correlation with provisioning
To the Division and Customer ID apply the Customer ID obfuscation process
To the MAC address apply the MAC obfuscation process.
Replace the Division and MAC with its obfuscated counterparts.

XXXIX. Logical Data Model—

The appended logical data model describes the way the input tables are mapped to the output in the SDA instance.

XL. Advertisement Insertion Events—

The SDA Audience Measurement platform 203 stores events relating to the confirmation of linear advertisement insertions. Such events provide the MSO with the ability to identify which advertisements were inserted, when they were inserted, on which channel the advertisement was inserted and the number of households that the ad was available to. Secondly, by analyzing this data alongside the SDA-AM 203 tuning events for the customers tuned in to that channel at the time of the advertisement play-out, a calculation of the number of customers watching the advertisement can be determined.

This document provides an overview of the business events which define the various instances of valid advertisement insertion events.

Advertisement insertion events stored in the SDA-AM 203 are defined in this document as being derived from logged events detailing the success or failure of a linear spot play-out confirmation received from an advertisement insertion server. The confirmation message contains at the minimum the time, date, universal channel reference, and the advertisement-asset description.

Ad Insertion—

Local advertisements are inserted into specific channels. These insertions are typically performed via inserting over the top (i.e. using MPEG splicing technology) of existing ads in broadcast signals. The MSO may utilize MPEG advertisement insertion devices to splice advertisement-assets into broadcast signals using advertisement servers to provide the advertisement-asset.

A channel in which an advertisement may be inserted provides an indication of when one may be inserted through the use of a data trigger (i.e. provided alongside the audio and video content using the SCTE-35 standard). The advertisement insertion system, on detecting the trigger, inserts an advertisement via the MPEG splicer—the advertisement is obtained from the advertisement-server, where the choice of advertisement asset is pre-determined according to the details of the various scheduled ad advertisement campaigns for that channel and time period.

Ad Server Generated Insertion Events and Reference Data Sources—

Each advertisement insertion server generates a log of events describing each advertisement insertion event. These events describe successful and failed insertion attempts, as well as the type of event (i.e. normal, filler bonus, or make-good).

There are three primary objectives in storing advertisement insertions within the SDA 203:
Provide an indication of all successful advertisement playouts.
Provide reference data by which the advertisement insertion events can be enriched for reporting purposes.
Provide the ability to determine how many customers viewed a given advertisement.

While the first two objectives are mostly straightforward, determining actual advertisement impressions is complicated by the fact that the systems responsible for delivering video content and advertisement content use different representations for key data elements. A means of normalizing advertisement playout data so that it can be cross-referenced against tuning data is therefore provided. Advertisement event attributes are not dependent on any particular underlying technology (e.g., are system agnostic), as the MSO may utilize different advertisement insertion solutions.

Ad Playout Information—

The advertisement event attributes associated with a play-out of an advertisement may be similar to those listed in Appendix EC of previously incorporated U.S. Provisional Patent Application Ser. No. 61/260,346.

Ad Reference Information—

A set of reference data which may be used by the mediation component within the SDA 203 to enrich the advertisement events may be utilized as provided in the example of Appendix ED of previously incorporated U.S. Provisional Patent Application Ser. No. 61/260,346.

Ad Normalization Information—

Appendix EE, of previously incorporated U.S. Provisional Patent Application Ser. No. 61/260,346, may be utilized to provide an ability to normalize an advertisement against tuning events to determine actual advertisement impressions. The data needed to perform this normalization relates to both 1) network and 2) location information.

Ad Event Normalization—

Specific terminology is used to describe the regions in which local ads are sold. Syscodes describe zones in which local advertising can be sold. Syscodes represent areas with geographic proximity and often demographic consistency. Syscodes often represent a collection of zip codes that change over time due to various advertisement industry drivers. While Syscodes are used in the advertisement industry to maximize advertisement sales effectiveness, other naming standards for defining video regions may be used. In one embodiment, customers receive service packages represented within a channel lineup, which is served to hubs located at geographically-strategic locations based on bandwidth and capacity considerations. In mapping customer viewership (tuning events) to advertisement sales (Advertisement Events), correlation between the video Hubs and Syscodes is used.

Once the data is acquired, processing is performed in two main areas: (i) geographic alignment and (ii) service alignment. Geographic alignment comprises steps to determine the exact geographic region the advertisement actually played in. Advertisement insertion servers are located at the headend, thus a conversion is necessary into a set of hubs and nodes which relates to the geographic reference in which the tuning events are stored. Service alignment comprises steps necessary to confirm the channel on which the ad was inserted. Multiple versions of a particular channel are present at the headend (i.e. insertion point)—these channels are sent across the served geographic region, and the channel instance used at each node/hub. The details of each processing step are provided below.

Geographic Alignment—

Geographic Alignment processing steps aim to identify where the channel in which the advertisement was inserted and/or was distributed. When an advertisement playout occurs, the only geographic information associated with the spot is a retail unit code.

From the retail unit code (e.g. CMC) provided in the advertisement playout, the Syscode(s) can be determined via reference data and stored in SDA 203.

From the advertisement Syscode(s), a collection of zip codes associated with the Syscode(s) can be determined. In one embodiment, this information is maintained in the CableTrack system, and verified for accuracy. The Syscode-zip code mapping is maintained in SDA 203.

In some instances, a Syscode does not align directly with a zip code (e.g. the zip code is split across two Syscodes). When a zip code is mapped to multiple Syscodes, the entire zip code is considered as within the Syscode of a given advertisement. This may lead to some over-counting of ad impressions, but this double-mapping occurs infrequently.

From the retail unit code, the Division ID (e.g. CLT) is associated with the advertisement playout. A Region represents a collection of related Syscodes. While the media sales-based region and video-based division are expected to align, a mapping is maintained within SDA 203 to ensure consistency.

The following information is written to the SDA 203 advertisement event: Division ID, Retail Unit Code.

The geography mapping table within SDA 203 may in one embodiment contain the fields listed in Appendix EF of previously incorporated U.S. Provisional Patent Application Ser. No. 61/260,346. This data is used in the advertisement impression reporting process discussed below.

Service Alignment—

Service Alignment is the process by which service-level information from advertisement playout records are correlated to standard video services. When an advertisement playout occurs, the only service information associated with the Spot is a network code.

From the network code (e.g. CNN-HD) in an advertisement playout, an alignment is performed to associate the network on which the advertisement aired to tuning events. The network code is a free-text 'friendly' identifier for a network within a region. While these network codes are often easily identifiable, they are not standardized and thus are not a reliable source for tuning event correlation. For example, CNN-HD may be referred to as CNN_HD, CNN High Def, CNN-HDTV, etc. Tuning events (as defined below) are normalized on unique Service ID from the Application Server (AS). In order to associate advertisement events to tuning events, the advertisement event is also normalized on the AS Service ID.

A Service ID-to-network code reference table is maintained by the SDA 203. This table maps a network code to a unique AS Service ID within each Division. There are certain occasions where a network code may map to multiple Service IDs within the same Division. This mostly occurs on local channels such as news or weather, where the channel could differ at the county level. In these cases, an additional retail unit field may be used to define a single Service ID for networks defined at sub-Division level.

The following information may be written to the SDA 203 advertisement event: Service ID.

The service mapping table within SDA 203 may in one embodiment contain the fields illustrated in Appendix EG of previously incorporated U.S. Provisional Patent Application Ser. No. 61/260,346. This data is used in the advertisement impression reporting process discussed below.

SDA-AM Ad-Insertion Events—

An advertisement campaign is defined as a single contract containing one or more advertisement assets (or Copys) which are inserted at specific times and on specific channels.

A Spot is defined as a specific insertion opportunity (indicated with the use of triggers on channels) on a specific channel. Generally, 2 minutes worth of advertising inventory are available per hour on each of the channels in which an advertisement insertion agreement exists. This advertising inventory is split up typically into four 30-second spots.

An advertisement insertion event is generated when an advertisement server inserts an advertisement (from a specific advertisement campaign) using an MPEG splicer on a linear channel after receiving a valid SCTE-35 trigger event generated on that particular channel.

Advertisements which are inserted according to the terms of the campaign contract are considered normal advertisement types.

Advertisement insertion events are generated on each insertion and relate to insertions occurring on a single channel and consist of a single advertisement asset.

Advertisement campaigns are typically owned by a particular advertiser, and purchased from an MSO by a particular advertising sales agency, and brokered using a particular account executive.

Regions in which advertisements are inserted are called Syscodes—each household in a Syscode receives the same linear channel, and hence the same advertisement if inserted on a channel for that Syscode.

Ad Impression Report Generation

Figure 28:
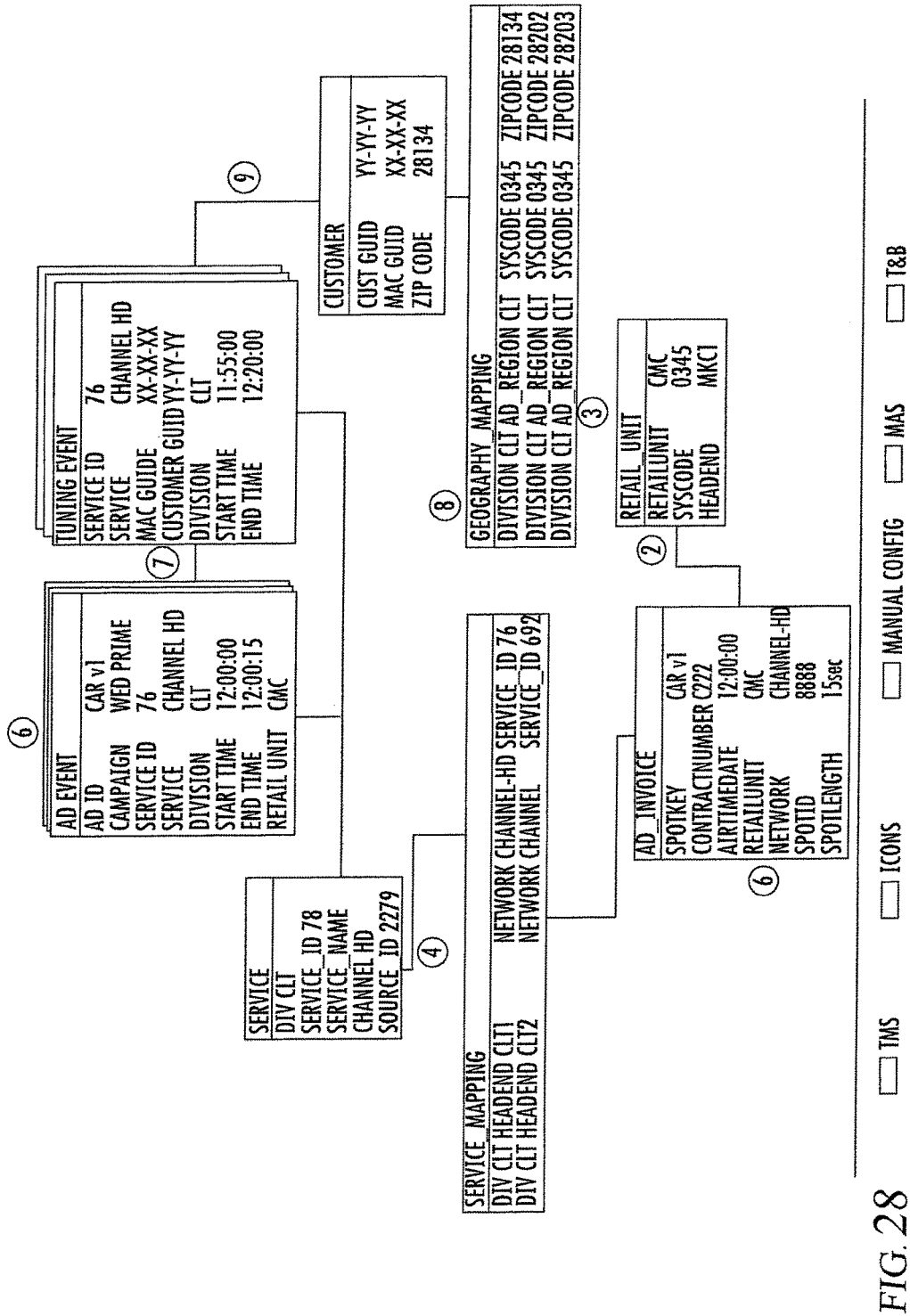
FIG. 28 is a block diagram illustrating how an advertisement insertion event is used to determine viewership when storing advertisement insertion events.

The diagram of FIG. 28 provides an example of how an advertisement insertion event is used to determine viewership when storing advertisement insertion events as defined herein.

Ad Event Creation—

The AD_INVOICE table (e.g., OpenTV's INVOICE_DETAIL) is obtained on a daily basis. The AD_INVOICE table contains key fields relating to the advertisements creative, network, and geographic location to where the advertisement was displayed.

The advertisement's retail unit is used to query the RETAIL_UNIT table to determine the collection of Syscodes associated with the Retail Unit where the advertisement was played.

The SDA's 203 GEOGRAPHY_MAPPING table may be used to determine the Division where the advertisement was played using market, retail unit, or Syscode information. The Division ID is written to the advertisement event.

After the Division ID is determined, the advertisement's network code is used to query the SDA's 203 SERVICE_MAPPING to determine the Service ID associated with that network code in the specified Division. The Service ID and Service Name are written to the advertisement event. If necessary, the retail unit code may be used to identify a Service ID where there might be multiple versions of a network (e.g. for News or Weather broadcasts)

The advertisement event's end rime can be deduced from the air time, date, and copy length information stored with the AD_INVOICE. Additional attributes are stored on the advertisement event for dimensioning/reporting purposes as well.

Ad Report Generation—

A query is made to determine how many customers watched a specific advertisement based on an advertisement identification (Ad ID).

The advertisement event associated with the Ad ID is retrieved from SDA 203. The Service ID, date, start time, and end time of the advertisement event are correlated against tuning events to determine how many tuning events exist which meet the following characteristics:

The Service ID of the tuning event matches the advertisement event's Service ID

The start/end times of the tuning event indicate that the tuning event has at least a one-second overlap with the advertisement event [this exact definition can be configured by different reporting mechanisms based on business requirements].

The advertisement event's retail unit is used to determine the Syscodes where the advertisement was displayed. SDA's 203 GEOGRAPHY_MAPPING table is used to determine the collection of zip codes associated with the Syscode(s).

Each tuning event has a customer GUID which uniquely identifies the customer who generated the tuning event. A cross-reference to the CUSTOMER table indicates which tuning events were generated in the collection of zip codes where the advertisement event was generated.

XLI. SDA Interactive Application Events—

Interactive applications introduce additional functionality to television viewers through the use of on-screen applications. Generally, there are two broad categories of interactive applications:

Bound applications: tied to television content and only displayed on the television or made available for invocation by the customer when explicitly triggered by the content owner Unbound applications: stand-alone applications which are agnostic to the programming being shown by the content owner. These are typically invoked through user action—i.e. invoked by the user through the on-screen menu or via a specific short-cut button on the remote control unit.

Interactive applications provide benefits to the MSO via the development of a differentiated video service offering to enhance customer's experiences allowing a multitude of interactive capabilities (i.e. advertising, promotions, games, etc). In addition interactive applications allow access to third party providers to host applications available through the television—while keeping the customer's focus on the television.

In order to fully capitalize on the delivery and use by customers of interactive applications, the collection system 200/SDA 203 ensure appropriate measurement of actual and potential reach of the applications, customer engagement with applications and on the success of applications.

Interactive application capable CPE 103 and regions are tracked within the SDA 203 as reference data, in addition to details around each interactive application (type of application, format and rating of application).

Customer usage of interactive applications is stored as interactive application events, which are analyzed for customer experience, marketing and advertisement sales revenue calculation purposes.

In order to ensure that the customer use of interactive application is appropriately captured for measurement purposes, it is important to ensure that the data collection methods, the events being captured, and usage metrics derived from the raw data are consistently defined, and that the manner in which metrics are stored are sufficient to support the business needs of the measurement.

An interactive application may exist in various states with respect to user engagement measurement Valid interactive application events may be stored within the SDA data store and subsequently used to create business metrics.

Interactive Applications Definition—

An interactive application is defined as a program which runs on a CPE 103 (and displayed on a television) when invoked by a customer. The interactive application can be called from a user menu (unbound) or invoked during a particular program or advertisement (bound).

Interactive application delivery involves a number of platform elements:

Interactive Application Streamer: provides a carousel in which the interactive application program is repeatedly transmitted and subsequently inserted in-band on the appropriate video multiplex.

MPEG-2 Transport Stream Multiplex: Equipment which sits in the path of the video signal, in which the interactive application is received from the Streamer and inserted into a downstream signal to the STB.

Interactive Application trigger: a SCTE-130 compliant message sent alongside the video signal to indicate when an interactive application prompt should be displayed to the viewer by the Interactive Application client—used for bound applications.

Interactive Application Client (User Agent): Program code which resides on the CPE, and performs two actions: (1) listens for interactive application triggers, (2) renders interactive application programs onto the television set once invoked, either by the trigger for bound apps, or by the user, through interaction with digital navigation software, for unbound apps.

CPE: the device on which the Interactive Application Client resides, and the platfotin used to render and run interactive applications once invoked.

Return Path: IP return path, in SA plants, currently enabled through the DAVIC protocol between the CPE and appropriate Demod card at the headend. In one embodiment, the return path is enabled through the Motorola ALOHA protocol between the CPE and appropriate return path demodulator (RPD) at the headend. In another embodiment the so-called Tru2Way path is used, this return path is enabled by the DOCSIS modem residing within Tru2Way CPE establishing a communication path with the Cable Modem Termination System (CMTS). This IP return path is used by the interactive application program to relay messages and commands to and from to the Interactive Application Server.

Interactive Application Server: performs server functions for interactive applications running on the CPE—typically, these are similar to web-servers and can provide data to applications if requested, and acts as the destination for interactive application events which indicate viewer engagement.

Figure 29:
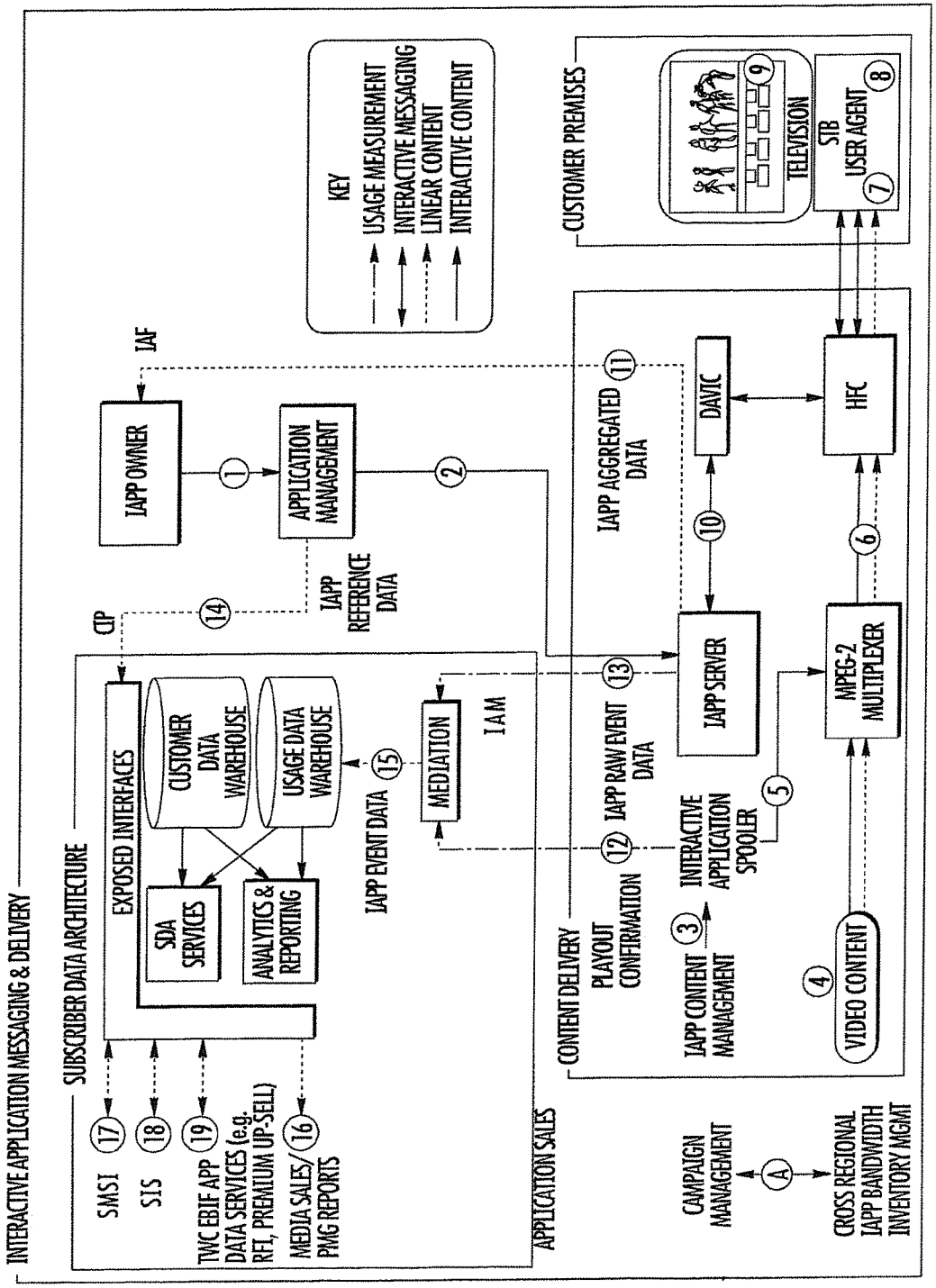
FIG. 29 is a block diagram illustrating how the platform elements are utilized to deliver interactive applications.

FIG. 29 describes how these platform elements are utilized to deliver interactive applications (iApps).

As illustrated in FIG. 29, an interactive application (iApp) is multiplexed with video content and invoked upon a request from a user CPE. This is accomplished by the following steps:

iApps are managed through a campaign manager, which confirms availability of bandwidth to stream the application.

iApp owner provides iApp reference data (e.g. metadata) and iApp content to an application management layer.

The application management system provisions the iApp Server with details of the iApps and the iApp content management system with the iApp content (not shown).

iApp content management systems send interactive content to iApp streamers for subsequent playout as instructed by the campaign details.

External content is typically included within the video stream (as in the case with cable network provided interactivity) along with standards-based triggers which are used to signal CPEs to invoke bound iApps on the user TV screen.

For interactive content which is stored internally iApp streamers insert iApp content for downstream transmission within linear broadcast stream.

iApp content is multiplexed with the video signals as MPEG-2 data packets inside the MPEG-2 Transport Stream (in-band)

Compliant CPE contain, in one embodiment, an EBIF User Agent which can invoke an iApp when initiated by customer (for unbound apps) or when triggered within the video feed (for bound apps).

For bound applications, one or more "overlays" may be presented to viewers watching specific programming. Depending on business rules, targeting considerations, and subscriber preferences, some viewers may not be presented with overlays even though they are viewing specific programming in which other viewers would be presented with an overlay A user utilizes their remote control units to interact with the application, if necessary; alternatively the CPE may comprise one or more buttons, a touch screen, etc. for interaction with the application.

The iApp, once invoked, utilizes the CPE return path to receive and transmit application messages to the iApp Server based on customer interaction.

The iApp Server, for some applications, aggregates specific user responses (e.g. Votes) and submit results via an TAF message (i.e. back to app owner).

The iApp content management system provides iApp playout confirmation/details to an SDA mediation layer.

The iApp Server provides iApp Usage Data to SDA Mediation Layer using IAM interface.

The iApp owner provides iApp reference data to SDA 203 via CTP interface.

The SDA 203 mediation layer normalizes and enriches iApp reference and usage data into a collection of anonymized interactive events.

The SDA 203 may generate and provides iApp usage reports.

In one embodiment, the SDA 203 formats iApp usage report for specific campaigns using the SMS format and submits them to authorized users via the SMSI (e.g. Canoe).

The SDA 203 exposes Subscriber Information Service to SCTE-130 systems in performing DAT, and or targeted advertising.

The SDA exposes Subscriber information, T-commerce, and other SOA services for use by iApp servers to fulfill customer app functions (T-Commerce, Premium Upsell, callerID, preferences, credit limits, etc).

Standards & Conventions—

The exemplary naming conventions for the components discussed above are listed in Appendix EH of previously incorporated U.S. Provisional Patent Application Ser. No. 61/260,346 and may be implemented.

The scope of the SDA program focuses, in one embodiment, around EBIF applications. These applications have been classified into one of three categories (device classes), and are examples of each are summarized in the table of Appendix EI of previously incorporated U.S. Provisional Patent Application Ser. No. 61/260,346. Each device class refers to the complexity of the type of EBIF application, in terms of STB computing power and runtime memory resources required to execute the application functionality. Consequently each class of application requires a minimum CPE specification. Generally, a higher device class number (1, 2, or 3) correlates to a more complex/robust device.

As defined in the table of Appendix EI, three types of devices are initially defined for Advanced Advertising Services. Any of the items within a comma separated list may be present. An ampersand is used to indicate when multiple options must be present.

Exemplary CPE makes and models which may support EBIF applications (if they have the correct version of middleware platform installed), and their relative EBIF class classification is described in the table of Appendix EJ of previously incorporated U.S. Provisional Patent Application Ser. No. 61/260,346.

Interactive Application Examples—

The composition of an interactive application may consist of a number of application classes which are presented to the customer as part of an application screen flow. Some examples of application classes that can exist, and any particular interactive application would potentially combine one or multiple classes depending on the creative requirements of the application owner can be found in the table of Appendix EK of previously incorporated U.S. Provisional Patent Application Ser. No. 61/260,346.

An example interactive application screens, and describes their use of the interactive application classes can be found in the table of Appendix EL of previously incorporated U.S. Provisional Patent Application Ser. No. 61/260,346.

Additional interactive applications are discussed in co-owned, co-pending U.S. patent application Ser. No. 12/582,653 filed on Oct. 20, 2009 and entitled "Methods and Apparatus for Enabling Media Functionality in a Content-Based Network", which is incorporated herein by reference in its entirety.

Customer Opt-Out—

Interactive applications may be considered an enhancement to basic services, and as such, in one embodiment a customer may opt-out of receiving these enhanced services.

When opted-out, a customer no longer receives any interactive application prompts, or is not able to invoke interactive applications, even if the CPE is capable of receiving them.

In one embodiment, the following Interactive Opt Out (100) requirements are supported:

A customer is able to indicate to the interactive application platform of their desire to opt out of receiving or invoking any bound and unbound applications.

When opted-out, the user agent is effectively provisioned with the opt-out setting (assuming default is Opt-in)—and as such the user agent does not respond to any interactive application triggers and/or receive any interactive streamed content.

The customer may also have the option to opt out of certain types of applications, in addition to being opted-out of all applications.

SDA Interactive Application Measurement Data—
  Overview

Two types of data sets are collected within the SDA 203 relating to interactive applications: reference data and event data.

In general, the SDA 203 measurement solution relates to the collection of data directly relating to customer activity with applications, then to enrich this data with information about the application in order to correlate usage activities to application functions. The following sections describe the sets of data to be collected, and the correlation activities to create the metrics used to support business needs.

Interactive Application Reference Data

Exemplary attributes in Appendix EM of previously incorporated U.S. Provisional Patent Application Ser. No. 61/260,346 describe the reference data required to describe an interactive application.

Interactive Application Event Data

Figure 30:
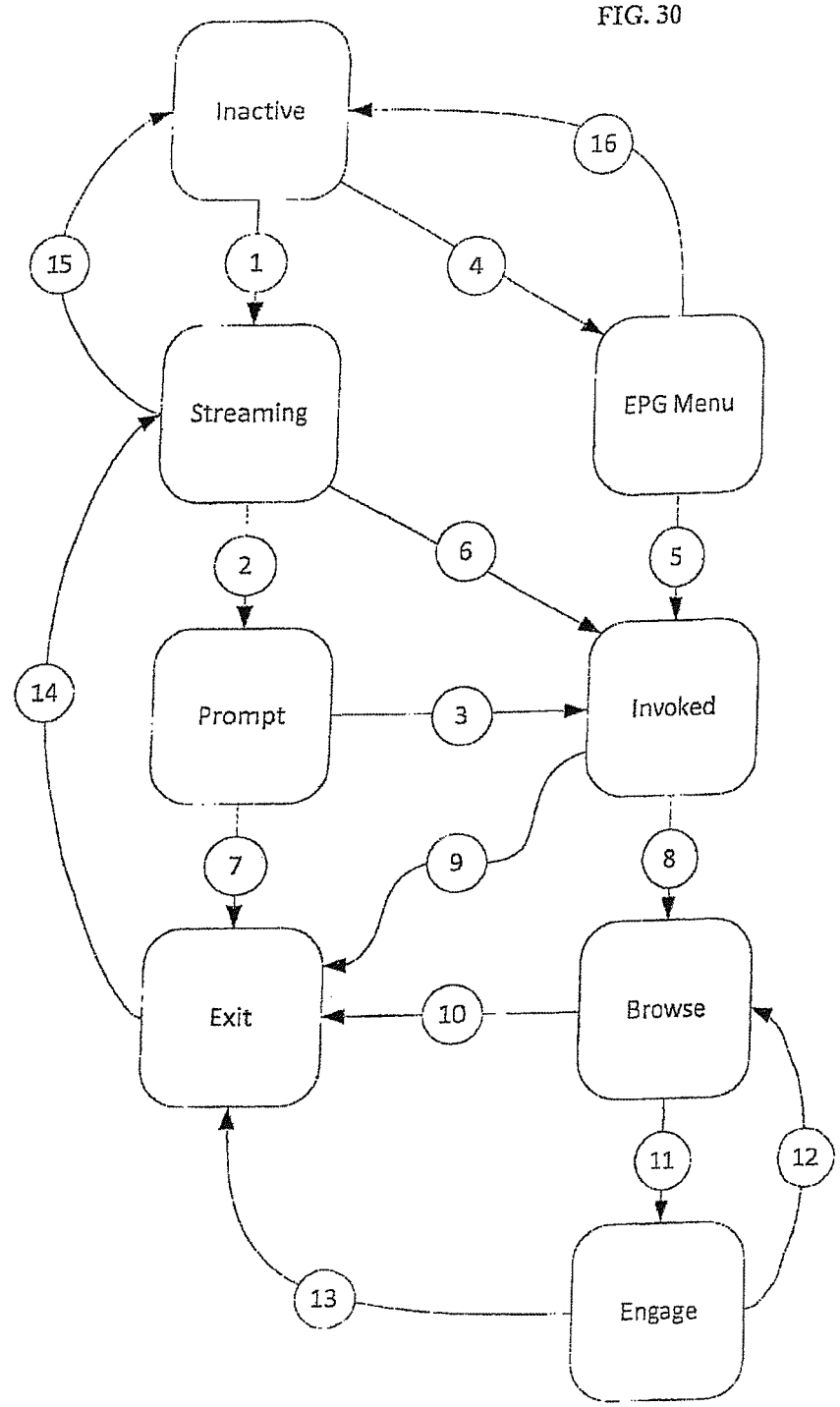
FIG. 30 is a state diagram illustrating various interactive application states and transitions between these states which lead to the generation of interactive application events.

The diagram illustrated in FIG. 30 shows the various interactive application states and transitions between these states which lead to the generation of interactive application events (stored in SDA-AM203).

Exemplary potential state transitions and the related actions that may be taken are described in the table of Appendix EN of previously incorporated U.S. Provisional Patent Application Ser. No. 61/260,346.

An Interactive Application event may be classified as one of the following types as described in Appendix EM of previously incorporated U.S. Provisional Patent Application Ser. No. 61/260,346:

Application Initiation
  User Prompt
  User Invocation via Prompt
  User Invocation via EPG
  Prompt Time Out
  Application Utilization
  User Interaction
  Application Exit
  Application Reset
  Auto-Application
  Application removal An "application initiation" interactive application event is generated when a particular interactive application begins spooling to any particular set of CPE and or published to an EPG.

A "User Prompt" interactive application event is generated when an interactive application is invoked by an SCTE trigger, and a prompt is displayed on a CPE (or device associated therewith).

A "User Invocation via Prompt" interactive application event is generated when a customer invokes an interactive application defined by the prompt.

A "User Invocation via EPG" interactive application event is generated when a customer selects an EPG menu item invoking a specific interactive application.

A "Prompt Time Out" interactive application event is generated by an interactive application for each instance where a prompt is not acted on by the user and is removed from the screen when the corresponding bound application is no longer presented.

An "Application Utilization" interactive application event is generated for each action representing a browse event by a user using an application.

A "User Interaction" interactive application event is generated each time a user submits a specific request to a back end server while using an interactive event.

An "Application Exit" interactive application event is generated when a currently running interactive application is closed due to inactivity time out, bound programming expiry, application error, and/or specific user command to exit the application.

An "Application Reset" interactive application event is generated when a CPE removes a previously running application from the run-time environment, as a specific result of an "Application Exit" event.

An "Auto-Application" interactive application event is generated when a particular application is automatically displayed on a user's CPE (or display device associated therewith) without the need for user invocation activities.

An "Application removal" event is generated when a particular interactive application stops being spooled to any particular set of CPE and or un-published on an EPG.

The data of Appendix EO of previously incorporated U.S. Provisional Patent Application Ser. No. 61/260,346 may be stored in SDA 203 for each interactive application event.

Use Case Examples

The diagram of Appendix EP of previously incorporated U.S. Provisional Patent Application Ser. No. 61/260,346 provides examples of how business use cases may be supported when storing tuning events as defined herein. In Appendix EQ thereof, one example of the Button/Screen reference is defined as part of the reference data relating to the specific interactive applications being measured.

Generation of Interactive Application Business Metrics

Metrics relating to viewership of interactive applications may, in one embodiment, be generated using the SDA 203 by correlating the reference data relating to customer QUID, against the tuning, advertisement and/or VOD events which are also stored.

The SDA-AM 203 stores four types of measurement data relating to customer usage:

Tuning Events: which CPE were tuned to which channels in a particular region and at what time
  Advertisement Events: which advertisements were played out on a particular channel, and the region in which that advertisement was presented
  VOD Events: which customers viewed which VOD asset and when
  Interactive application events: which CPE were triggered (either in a program stream or through subscriber action) to display an interactive application, and details and timing around successful/failed display and usage of that interactive application.

From these four measurement events, a number of business use cases can be determined by cross correlation of the events by STB GUIDs, Customer GUIDs, channel and/or date and time.

An example of this follows:

Tuning events inform the business who was watching a particular program in a particular region Advertisement events inform if an advertisement was played out, in that particular region, at the time being investigated Interactive events inform if the programming or advertisement was enabled with interactive content, and how subscribers interacted with/ignored the application It is also possible, using tuning events, to determine if the customer behavior changes from previous viewing habits due to the presence/use of the interactive application XLII. Tuning Events—

Introduction—

Measuring the audience for television channels at any particular time requires collection and analysis of tuning events. Tuning events are generated when a customer's CPE is connected to a particular television channel for a particular period of time.

In order to properly identify a valid tuning event, a series of definitions are needed to describe which CPE messages relate to tune-in and tune-out conditions which should be used to govern how tuning events are created and subsequently stored in the SDA 203 data stores. As the range of possible events generated from the CPE increases (as is the case with the ODN and MDN platforms), it is also important to define events which do not impact the generation of valid tuning events.

Tuning events are defined herein as being a qualified view by a customer's CPE of a particular television channel/program on their MAIN CPE output, or while viewing the television channel/program, using the PIP function. A qualified view in this case is defined as one in which there is a specific consecutive viewing duration on a single Channel, where the CPE tuner is not placed in standby, or deemed as being in a zombie or non-responding status. This data can be used to define impressions on a particular channel, program or advertisement which provides a specific industry metric around viewership data.

Tuning conditions relating to background events, such as second tuner recordings (Background Recording tunes), and/or recording events based on a PIP viewing shall also be generated and stored in the SDA Document Objectives—

The following definitions may be used in obtaining tuning events:

Definition of valid tuning events stored within the SDA 203 data store and subsequently used to create business metrics.

Definition of CPE events which are qualified as either a valid start and/or a valid end time of a particular tuning event.

Description of abnormal event conditions resulting from operational errors, which require additional processing to identify them and improve on accuracy of any resulting metrics.

Description of the events which impact the status of a viewing event but do not qualify as either a start or stop event.

STB Tuner State Definition—

Each CPE comprises at least one tuner. In the case of CPE running the ODN middleware platform, a number of virtual tuners are also present. Each tuner can exist in a number of states, and where multiple tuners exist, more than one tuning event may be registered by each CPE. The table of Appendix EQ of previously incorporated U.S. Provisional Patent Application Ser. No. 61/260,346 further illustrates represents exemplary ones of the various states that a tuner can exist in.

A tuning event is generated for a CPE on a tuner basis, in one embodiment, only if a valid event has been received indicating start of a tune event (i.e. registering a tune-in status) and an appropriate event has been received for the same tuner indicating a valid end of a tune event (i.e. registering a tune-out status).

Tuning Event Definition—

A tuning event starts when a CPE tuner (or other similar device) successfully completes a tune action and begins to stream a channel on the main CPE output. In one embodiment, it is only when the MAIN tuner on a CPE is tuned to the same channel for one or more seconds without interruption that a tuning event is considered to have started.

A tuning event ends when a CPE tuner successfully completes a tune action onto a different channel than the one which is currently streaming on the main CPE output.

A PIP tuning event starts when a CPE tuner successfully completes a tune action and begins to stream a channel as a PIP on the main CPE output. In one embodiment, only when the PIP tuner on a CPE is tuned to the same channel for one or more seconds without interruption is a PIP tuning event considered to have started.

A PIP tuning event ends when a CPE tuner successfully completes a tune action onto a different channel than the one which is currently streaming as a PIP on the main CPE output.

A background tuning event starts when a CPE tuner successfully completes a tune action and begins to stream a channel on the background tuner (i.e. not on Main or PIP outputs). In one embodiment, it is only when the background tuner on a CPE is tuned to the same channel for one or more seconds without interruption that a background tuning event is considered to have been started.

A background tuning event ends when a CPE tuner successfully completes a tune action onto a different channel than the one which is currently streaming on the background CPE output.

A tuning event and/or PIP tuning event and/or background tuning event can also end on a particular tuner when a CPE tuner enters a forced zombie state (i.e. when no events are received on an actively tuned CPE tuner within a configurable amount of time (for example, 4 hours of tuner inactivity). The tuning event is generated with the tune out time after the configurable amount of time after the tune-in time, and marked as a forced zombie tune-out event.

A tuning event and/or PIP tuning event and/or background tuning event ends when a CPE enters a standby state (i.e. an event is received that indicates the CPE is actively turned off—e.g. Inactive). In one embodiment, a tuning event is generated with the tune out time equal to the inactive event time only when the tune duration equals one or more seconds without interruption.

A tuning event and/or PIP tuning event and/or background tuning event ends on a particular tuner when a CPE tuner enters a non-responder state (i.e. if the SDV server is unable to reach the CPE, than a non-responder event is generated). The tuning event is generated with the tune out time equal to the inactive event time, and marked as an inactive tune-out event. (See the Audit Tracking section for additional details), in one embodiment, only when the tune duration equals one or more seconds without interruption.

A tuning event and/or PIP tuning event and/or background tuning event ends on a particular tuner when a CPE tuner enters a Measured Zombie state (i.e. when the SDV server does not receive a response to any keep-alive messages from the CPE). The tuning event is generated, in one embodiment, with the tune out time equal to the Aged or Slated event time, and marked as a Measured Zombie tune-out event, only when the Tune duration equals one or more seconds without interruption.

A tuning event and/or PIP tuning event and/or background tuning event ends on a particular tuner when an INIT message is received for that particular CPE (i.e. when the SDV server receives an INIT command from the CPE when it was in a TUNE_IN state). The tuning event is, in one embodiment, generated with the tune out time equal to the INIT event time, and marked as Error tune-out event, only when the tune duration equals one or more seconds without interruption.

A tuning event and/or PIP tuning event and/or background tuning event ends on a particular tuner when an SDV error is received for that particular tuner (i.e. when the SDV server records a specific error for that tuner). In one embodiment, the tuning event is generated with the tune out time equal to the error event time, and marked as an SDV Error tune-out event, only when the Tune duration equals one or more seconds without interruption.

In one embodiment, it is possible for a single CPE to register two concurrent tuning events if the box is in both MAIN and PIP mode, or in MAIN and background mode at the same time.

Impressions which describe the number of viewers of a particular channel (and which may be of configurable duration) may be measured as the number of valid tuning events (i.e. which are in excess of the impression duration) measured on that channel, (i.e. during the time interval in which the impressions are requested), and be further filtered for Main, PIP or background types.

A tuning event does not contain any Personally Identifiable Information (PII) that can be used to associate a tuning event to a customer. This includes the anonymization of both the MAC address of the CPE which generated the tuning event and the customer billing identifier associated with the MAC address. The algorithm used to anonymize PII information is described elsewhere herein.

The tuning event stored in the SDA-AM 203 data store may consist of the fields such as those illustrated in Appendix ER of previously incorporated U.S. Provisional Patent Application Ser. No. 61/260,346 (for all valid tuning events over 1 second in duration). In the table of Appendix ER the "TUNE_OUT_TYPE" values may comprise those listed in the table of Appendix ES of previously incorporated U.S. Provisional Patent Application Ser. No. 61/260,346.

Standby Status Definition—

Each CPE tuner is considered as being in standby status when it an event is received that provides an indication that it no longer requests a channel from the SDV Manager (i.e., only if the CPE has been turned off and an inactive state event is received.

When a standby status is reached, a tuning event (for each CPE tuner currently in a tune-in status) is generated for the period of time between the last valid channel request and the request to enter standby mode (from a tune request to the time the CPE was placed into standby mode).

Zombie Status Definition—

A CPE is in Zombie status when it provides a Last User Activity (LUA) message to the SDV Manager which exceeds the configurable amount by which the SDV Manager is required to provide an active stream to the CPE (for example, the CPE sends a LUA of 60 minutes to the SDV Manager, and the SDV Manager is configured to reclaim a stream if needed after 60 minutes).

In one embodiment, for example, in the event that a LUA message is not received by the CPE after 60 minutes of continuous viewing of a single channel, and a CPE tuner is in a valid tune-in status, a tune-out event is forced for that tuner. Hence a CPE tuner can enter a Zombie state if (Z1) a message is provided that the CPE tuner LUA exceeds 4 Hours, OR (as in the case that a LUA is not received), the tune-in state for a tuner exceeds 4 hours, in which case a Zombie state is forced.

When a Zombie status is reached, a tuning event is generated for each active tuner for the period of time between the last valid channel request and the LUA message (or the forced tune-out status) which indicates the reclamation threshold has been reached (i.e.: from the last valid request for a channel and the LUA message which indicates no activity from the CPE which exceeds the allowable limit for an active CPE for the specified SDV Manager).

If a CPE tuner is deemed to be in Zombie state, then any new tune messages coming from that CPE are treated as new tuning events.

Record Status Definition—

A record event is captured if a channel being actively watched starts to record the program in either MAIN or PIP mode (for example: if the tuner is not recording the source and then actively/passively begins to record the source while tuned).

A Record Event is not collected without an associated tune event. A tune event indicates (via a record flag) that the source was being recorded during the tune.

If a tuner is recording but the source is not actively being watched, the tuning event indicates (via background flag) that the source was tuned to in background mode.

A record event is indicated by setting the record flag on the associated tuning event to TRUE.

Pay Per View (PPV) Status Definition—

If a tuning event is for a PPV source, the tuning event indicates that the source was PPV by setting a flag on the tuning event.

CPE timers which are used to access PPV events (prior to PPV purchase) generate a regular tuning event which describes that the channel being viewed was the PPV barker channel (i.e. no PPV flag is set), in one embodiment if, the duration of the event was equal or greater than 1 second.

Once a PPV purchase is completed and the PPV event is being watched another tuning event is logged to indicate that the CPE tuner was watching a PPV event (i.e. a PPV flag will be set), in one embodiment, only if the duration of the event was equal or greater than 1 second.

Is the PPV event is being watched in PIP mode, then the tuning event is also marked as PIP, and the IS_PIP flag shall be marked as "TRUE"

Audit Tracking—

A number of operational conditions, resulting from the day-to-day usage of the above described service, are addressed by the tuning event definition in order to provide additional accuracy of tuning metrics as a result of such events. Appendix ET of previously incorporated U.S. Provisional Patent Application Ser. No. 61/260,346 illustrates exemplary operational conditions.

Tuning Event Definitions—

Figure 31:
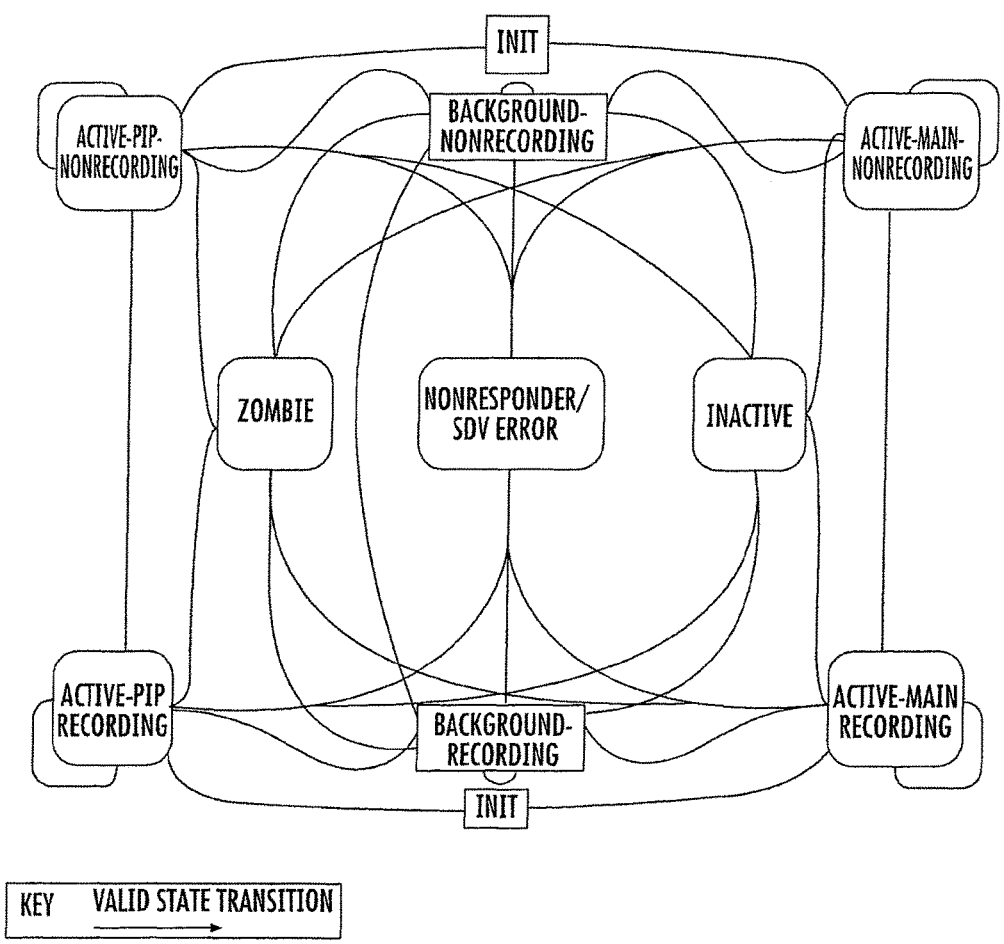
FIG. 31 is a state diagram illustrating various tuner states and a visualization of the valid transitions between these states.

Given the various CPE tuner states, it is contingent on the mediation platform to capture, analyze and use the states to generate valid tuning events and/or discard tuner events. The diagram of FIG. 31 illustrates the various tuner states and a visualization of the valid transitions between these states which would lead to the generation of TUNE IN or OUT events to be used in determining what data is to be stored in SDA-AM 203.

Generally, each valid TUNE OUT event generates the appropriate tuning event as described in the state transition matrix of FIG. 32.

In one embodiment, a tuning event is generated if and only if the duration between the registered tune-in and registered tune-out status is greater than or equal to 1 second.

A Forced Zombie may occur, in one variant, when a tune-in duration equals 240 minutes.

In another embodiment, a Measured Zombie tune-out occurs if and only if the duration between the Registered Tune In and the Measured Zombie events (i.e. Slated and/or Aged events) is greater than or equal to 1 second An Error tune-out event occurs when an INIT event is received for a STB while being in a valid tune-in state and the duration is greater than or equal to 1 second, in one embodiment.

In yet another embodiment, if a channel has been tuned into for at least 1 second (i.e. on either PIP, MAIN, or Background mode), and a recording is initiated on that channel, a tuning event is generated for the non-recorded part of the viewing, and another tuning event is generated, which contains the IS_REC flag set to TRUE.

If a channel has been tuned into and is recording for at least 1 second (i.e. on either PIP, MAIN, or Background mode), and the recording is stopped, in one embodiment, a tuning event is generated for the recorded part of the viewing, and another tuning event is generated, which contains the IS_REC flag set to FALSE.

Business Use Case Examples—

Examples of how various business use cases may be supported when storing tuning events as defined herein is provided in the diagram of Appendix of EU of previously incorporated U.S. Provisional Patent Application Ser. No. 61/260,346.

Anonymous Household—

The first element required for creating an anonymous household profile is the core household information. In one embodiment, the following algorithm is applied to arrive at the anonymous household view:

1) For each billing system within MSO footprint
   a. For each customer in the billing system
      i. Collect each household record, including the elements specified in the data dictionary
         1. Also include each CPE in the household, with the CPE type capabilities infoiniation as specified in the data dictionary
      ii. Collect the Division ID (DI) in the billing system associated with this customer
      iii. Collect the Customer ID (CI) for this customer
      iv. Concatenate DI to the end CI, yielding UID
      v. Break the UID into as many DWORDs as necessary, padding the least significant DWORD with zeros
      vi. From the first DWORD, add the third salt value. Carry any overflow to the adjacent DWORD.
      vii. Subtract from the second DWORD fourth salt value.
      viii. Continue this process, adding the first value to odd DWORDs, subtracting the second value from even DWORDs
      ix. Convert the series of DWORDs back into a string
      x. Perform an MD5 hash on the resultant string
      xi. The output of this MD5 hash is the GUID for this household Anonymous CPE Association—

Once an anonymous household record has been arrived at, each CPE in the household is associated to that anonymous record, again, in an anonymous way. This is achieved, in one embodiment, through the following process:

1) For each anonymous household record, a list of CPE associated with that household is pulled
   a. For each CPE
      i. Take each MAC address
      ii. Break the MAC address into two DWORDs, padding the second with zeros (e.g. 00:EE:EE:EE:EE would be: 0x00000000 and 0xEEEEEEEE)
      iii. To the first DWORD, add a first salt value. Carry any overflow to the second DWORD (e.g. the first DWORD (e.g., 0xEEEEEEEE) would be: 0xEEEEEEEE+first salt value=result, however, if this result has "overflowed" the DWORD limit, a carryover byte is created e.g., 0x00000001 and the DWORD is limited to 32 bits (e.g., 32 bits of result)
      iv. From the second DWORD, subtract a second salt value (e.g. in the previous example, since the second DWORD is now 0x00000001, thus 0x00000001−second salt value=result2)
      v. Re-assemble the resultant DWORDs into a String (e.g. extending the example we have been building: concatenate (result2:result))
      vi. Apply an MD5 hash to the String
      vii. The resultant HMAC is the GUID for that MAC Address Anonymous Tuning Records from CPE—

When tuning records are received in the collection system 200, those tuning records are made anonymous in such a way as to associate them to tuning records. In one embodiment, this is accomplished via the following algorithm:

1) When the tuning record is received, collect (Note: All this data, along with the tuning record itself MAY NOT be written to any form of persistent media until anonymization is complete)
   a. MAC Address from the tuning record
   b. Division ID from the billing system
   c. Query the billing system to determine the Customer ID for the customer associated with the MAC address
2) To the Division ID and Customer ID, apply the anonymization algorithm presented herein "Anonymous Household" (Household GUID)
3) To the MAC Address, apply the anonymization algorithm presented herein "Anonymous CPE Association" (CPE GUID)
4) Remove from the tuning record the MAC address
5) Add to the record the Household GUID and the CPE GUID It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. This description is in no way meant to be limiting, but rather should be taken as illustrative of the general principles of the invention. The scope of the invention should be determined with reference to the claims.

What is claimed is:

1. A method for collecting and analyzing of data relating to delivery of digital content via a digital network, said method comprising:
    collecting a plurality of user activity data from one or more user devices in data communication with said digital network, said user activity data comprising data relating to usage or interaction by a user with said digital content via said one or more user devices, said plurality of user activity data collected via a collection entity in data communication with said network, each of said plurality of user activity data comprising at least a tune-in time for a user session;
    receiving a plurality of digital reference data at said collection entity from a database in data communication with at least said collection entity, said digital reference data describing said digital content;
    identifying one or more of said plurality of user activity data which lack a tune-out time corresponding to said tune-in time for said user session;
    in response to said identification, excluding said identified one or more of said plurality of user activity data which lack said tune-out time;
    correlating, via mapping logic stored on a storage device in data communication with said collection entity, at least a remaining portion of said user activity data to said reference data to create a plurality of viewing impressions, each of said remaining portion of said plurality of user activity data comprising said tune-out time corresponding to said tune-in time for said user session; and
    transmitting said plurality of viewing impressions from said collection entity to an analysis entity for analysis thereof, said analysis entity in data communication with at least said collection entity.

2. The method of claim 1, wherein said plurality of user activity data comprises tuning event data.

3. The method of claim 1, further comprising:
    validating at least a portion of said plurality of user activity data;
    anonymizing at least a portion of said plurality of user activity data; and
    enriching at least a portion of said plurality of user activity data.

4. The method of claim 3, wherein said act of validating at least a portion of said data comprises ensuring a Media Access Control (MAC) address of a device associated with said plurality of user activity data comprises a MAC address of one of said one or more devices associated with said user.

5. The method of claim 4, wherein said act of anonymizing at least said portion of said plurality of user activity data comprises utilizing at least one obfuscation process to obfuscate said MAC address.

6. The method of claim 3, wherein said act of enriching at least said portion of said plurality of user activity data comprises adding non-identifiable user-specific information to said plurality of user activity data.

7. The method of claim 1, wherein said analysis entity comprises a third party entity.

8. The method of claim 1, wherein said network comprises a managed network, and said analysis entity comprises a billing entity within said managed network.

9. The method of claim 1, wherein each of said plurality of user activity data further comprises information regarding one or more of:
    a program viewed;
    a start/end date/time of said program;
    a tune-in event type;
    a tune-out event type; and
    an anonymized Media Access Control (MAC) address.

10. The method of claim 1, wherein said act of identifying said one or more of said plurality of user activity data which lack said tune-out time corresponding to said tune-in time for said user session comprises:
    calculating a duration of user inactivity after said start time; and
    determining said duration of user inactivity is equal to or greater than a pre-determined threshold.

11. The method of claim 10, wherein said act of identifying said one or more of said plurality of user activity data which lack said tune-out time corresponding to said tune-in time for said user session further comprises:
    in response to determining said duration of user activity is equal to or greater than said pre-determined threshold, generating a forced tune-out time corresponding to said tune-in time for said user session; and
    assigning an indicator of said forced tune-out time to each of said identified one or more of said plurality of user activity data which lack said tune-out time.

12. A method for managing digital data in an operator-managed digital content delivery network, said method comprising:
    receiving a first plurality data at a collection entity in data communication with said managed digital content delivery network, said first plurality of data comprising a plurality of fields comprising data relating to a subscriber's interaction with a plurality of content delivered thereto from at least one user device in data communication with said managed digital content delivery network;
    determining validity of at least a portion of said first plurality of data so as to ensure said at least one user device from which said first plurality of data is received is associated with said subscriber;
    in response to determining validity of said at least portion of said first plurality of data, parsing said validated portion of said first plurality of data to individual ones of said plurality of fields;
    receiving a second plurality of data from a database in data communication with said managed digital content delivery network, said second plurality of data comprising reference data describing said plurality of content; and
    processing said individual ones of said plurality of fields to generate a plurality of digital records correlating said individual ones of said plurality of fields to said reference data, said plurality of records correlating said individual ones of said plurality of fields to said reference data being utilized to describe a period of time in which said subscriber is presumed to be utilizing a particular one of said plurality of content at said at least one user device.

13. The method of claim 12, further comprising transmitting said plurality of records correlating said individual ones of said plurality of fields to said reference data to a computerized analysis entity configured to utilize information contained therein to derive viewing patterns.

14. The method of claim 12, further comprising transmitting said plurality of records correlating said individual ones of said plurality of fields to said reference data to an analysis entity of said managed network configured to create at least one report describing behavior of said subscriber or a plurality of subscribers.

15. The method of claim 14, wherein said at least one report comprises a report of viewership of primary content contained within said particular one of said plurality of content for a plurality of user devices as a function of time, said plurality of user devices each associated with at least said subscriber, said at least one user device being one of said plurality of user devices.

16. The method of claim 14, wherein said at least one report comprises a report of viewership of secondary content contained within said particular one of said plurality of content for a plurality of user devices as a function of time, said plurality of user devices each associated with at least said subscriber, said at least one user device being one of said plurality of user devices.

17. The method of claim 14, wherein said at least one report comprises a report of video on demand (VOD) usage for a plurality of user devices, said plurality of user devices each associated with at least said subscriber, said at least one user device being one of said plurality of user devices.

18. The method of claim 14, wherein said at least one report comprises a report of trick mode operation of said at least one user device during playback of at least one of: (i) primary content contained within said particular one of said plurality of content, and/or (ii) secondary content contained within said particular one of said plurality of content.

19. The method of claim 12, further comprising implementing at least one error recovery mechanism in an instance where at least one other portion of said first plurality of data is determined to be not valid.

20. Apparatus for collection and analysis of data relating to delivery of content in a network, said apparatus comprising at least one collection entity comprising:
  a first processor; and
  a first non-transitory computer readable storage medium having a first computer program stored thereon, said first computer program configured to, when executed, cause said processor to:
    collect a first plurality of data relating to a plurality of primary and secondary digital content delivered to a plurality of subscriber devices via said network; and
    collect a second plurality of data relating to individual ones of a plurality of tuning events which occur at said plurality of subscriber devices, said plurality of subscriber devices each being associated with one or more of a plurality of subscribers, said second plurality of data comprising a plurality of fields;
    determine validity of said second plurality of data;
    in response to validation of at least a portion of said second plurality of data, parse said validated portion of said second plurality of data into individual ones of said plurality of fields; and
    in response to invalidation of at least one other portion of said plurality of data relating to said individual ones of said plurality of tuning events, store said invalidated portion of said plurality of data relating to said individual ones of said plurality of tuning events in an error table.

21. The apparatus of claim 20, further comprising at least one analysis entity in data communication with said at least one collection entity, said at least one analysis entity comprising:
  a second processor; and
  a second non-transitory computer readable storage medium having a second computer program stored thereon, said second computer program configured to, when executed, cause said second processor to:
    utilize said first plurality of data and said second plurality of data to correlate said plurality of tuning events to individual ones of said plurality of primary and secondary content; and
    generate one or more reports configured to illustrate behaviors of said plurality of subscriber devices with respect to said primary and secondary content.

22. The apparatus of claim 20, wherein said first computer program is further configured to, when executed, cause said processor to:
  anonymize said second plurality of data in order to obfuscate an identity of said plurality of subscriber devices from which said data is received.

23. Network apparatus for use in a network, comprising:
  an interface configured to communicate with said network;
  processing apparatus in communication with said interface; and
  at least one storage device in communication with said processing apparatus, said storage device comprising a computer program which is configured to, when executed, cause said processing apparatus to:
    obtain data relating to at least one of each primary and secondary content elements delivered to a plurality of client apparatus via said network;
    collect a plurality of data relating to individual ones of a plurality of tuning events which occur at said plurality of client apparatus;
    validate said plurality of collected data to identify one or more of a valid portion of said collected plurality of data and an invalid portion of said collected plurality of data;
    in response to identification of said invalid portion of said collected plurality of data, implement at least one recovery mechanism to recycle said invalid portion of said collected plurality of data; and
    in response to identification of said valid portion of said collected plurality of data, process said obtained data and said valid portion of said collected plurality of data so as to identify one or more correlations between said tuning events and said delivered primary and secondary content elements.

* * * * *